US 7,035,404 B2

(12) United States Patent
Furukawa

(10) Patent No.: US 7,035,404 B2
(45) Date of Patent: Apr. 25, 2006

(54) METHOD AND APPARATUS FOR SHUFFLE WITH PROOF, METHOD AND APPARATUS FOR SHUFFLE VERIFICATION, METHOD AND APPARATUS FOR GENERATING INPUT MESSAGE SEQUENCE AND PROGRAM FOR SAME

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 875 days.

(21) Appl. No.: 09/796,458

(22) Filed: Mar. 2, 2001

(65) Prior Publication Data

US 2001/0024501 A1 Sep. 27, 2001

(30) Foreign Application Priority Data

Mar. 3, 2000 (JP) .............................. 2000-059091

(51) Int. Cl.
*H04K 1/00* (2006.01)
*H04K 9/00* (2006.01)
(52) U.S. Cl. .............................. 380/28; 380/37; 705/12
(58) Field of Classification Search ................. 380/28, 380/215, 37; 705/12
See application file for complete search history.

(56) References Cited

U.S. PATENT DOCUMENTS

| | | | | |
|---|---|---|---|---|
| 4,331,864 A | * | 5/1982 | Nakajima et al. ........... 250/204 |
| 5,682,430 A | | 10/1997 | Kilian et al. ................... 380/30 |
| 6,076,163 A | * | 6/2000 | Hoffstein et al. ........... 713/168 |
| 6,092,051 A | * | 7/2000 | Kilian et al. .................. 705/12 |
| 2002/0007457 A1 | * | 1/2002 | Neff ............................ 713/180 |

FOREIGN PATENT DOCUMENTS

JP 8-263575 10/1996

OTHER PUBLICATIONS

Chaum, David L., "Untraceable Electronic Mail, Return Addresses, and Digital Pseudonyms", Feb. 1981, pp. 84-88.*
Schneier, Bruce, "Applied Cryptography", 1996, p. 527.*
Park, Choonsik et al, "Efficient Anonymous Channel and All/Nothing Election Scheme", 1998, pp. 248-259.*

(Continued)

*Primary Examiner*—Emmanuel Moise
*Assistant Examiner*—Michael Pyzocha
(74) *Attorney, Agent, or Firm*—Foley & Lardner LLP

(57) ABSTRACT

A shuffle with proof having a method for proof generating with small computational resources proportionate to the number of input encrypted messages and a corresponding method for verification. Shuffle is represented by a generalized transformation. Combining a proof that the transformation information is retained and a proof of a condition under which the transformation is met constitute the proof for shuffle. The two proofs are short proportional to the number of input encrypted messages. Transformation information retention is proved in such a manner that, since the response is generated from challenge value in dependency upon transformation, the condition under which the transformation is met is reflected in the response-challenge value relation. If the condition under which the transformation corresponding to the shuffle is selected as the condition for proof, the two proofs may constitute the proof for shuffle.

18 Claims, 20 Drawing Sheets

OTHER PUBLICATIONS

Algorithms, "Divide and Conquer," Jun. 2, 1997, p. 1.*

Michael Ben-or, Oded Goldreich, Shafi Glodwasser, Johan Hasted, Joe Kilian, Silvio Micali, and Phillip Rogaway: "Everything Provable is Provable in Zero-Knowledge" CRYPTO 1988, 37-56.

K. Sako and J. Kilian: Receipt-free mix-type voting scheme—A practical solution to the implementation of voting booth. Eurocrypt '95, LNCS 921, pp. 393-403 (1995).

S. Brands, "An Efficient Off-line Electronic Cash System Based on the Representation Problem", CWI Technical Report CS-R9323, (1993).

S. Brands, *Untraceable Off-line Cash in Wallet with Observers*, Crypto '93, LNCS 773, Springer-Verlag, Berlin 1994, 302-318.

* cited by examiner

METHOD AND APPARATUS FOR SHUFFLE WITH PROOF, METHOD AND APPARATUS FOR SHUFFLE VERIFICATION, METHOD AND APPARATUS FOR GENERATING INPUT MESSAGE SEQUENCE AND PROGRAM FOR SAME

FIELD OF THE INVENTION

This invention relates to a technique for shuffle for guaranteeing the presence of one-to-one correspondence between input and output encrypted messages, such as is used in constructing an anonymous communication path, as the one-to-one correspondence is kept confidential, and to a technique of verifying the shuffle.

BACKGROUND OF THE INVENTION

Background Art (1)

As for the background art for shuffle with proof, reference is had to e.g., the JP Patent Kokai JP-A-08-263575 (publication 1). FIG. 1 shows the structure described in this publication 1. Meanwhile, in the drawings of the present application, confluent arrows indicate that the information corresponding to the originating point of the arrows are all collected and sent to a location corresponding to the points of the respective arrows, whilst diverging arrows indicate that all or part of the information at the originating points of the arrows are sent to a location corresponding to the points of the arrows. On the other hand, broken lines indicate that these depend on the input message generating method used.

In FIG. 1, 160 pseudo output encrypted messages 103 represent commitment for zero-knowledge proving. Challenge values are generated from the input/output encrypted messages and the commitment, whilst the response (reply) represents designation of the mapping, responsive to bit values of the challenge values, from the input encrypted message or the output encrypted message, indicated by solid or arrows, to the pseudo output encrypted message.

Referring to FIG. 1, there is introduced a technique of permuting (re-arranging) plural ElGamal input cipher-texts 100 followed by re-encryption and for outputting the re-encrypted cipher-texts. This technique is termed "shuffle". For guaranteeing that this processing is authentic, the above publication introduces the following technique: That is, secret random numbers for permuting and re-encryption are made to be different each time and an operation similar to the shuffle is repeated a number of times equal to the number of safe variables (about 160) to output pseudo output encrypted messages so as to be used as commitment for proving the authenticity. As challenge values 105, Hash values of the commitments and the input/output encrypted messages are output.

The bit sequences of these challenge values are read sequentially from the upper side and designation of permutation (mapping representing the permutation) from the encrypted input message for the bit "0" and that from the encrypted output message for the bit "1" and the re-encryption (the random number used in re-encryption) is made into the response 106.

The aforementioned commitment, challenge values and response are output as a proof text of the shuffling. The method for designating the relation of correspondence responsive to the bit values of the Hash values is termed a Cut and Choose method.

Background Art (2)

As another prior-art technique, reference is had to "A mix-network on permutation networks", termed[Publication 2], publicized by Abe in Paper of Asiacrypt' 99 (LNCS 1716 258–273 Springer 1999), herein termed the Publication 2. In this Publication 2, permutation of a pair of encrypted input message is repeated to realize the permutation of plural encrypted input messages, in their entirety, as shown for example in FIG. 2. In this Publication 2, permutation of a pair of encrypted input message is repeated to realize the permutation of plural encrypted input messages, in their entirety, as shown for example in FIG. 2. By constructing the proving of the permutations of the respective encrypted input messages by a method other than the cut-and-choose method, the shuffling with proof may be improved in efficiency when the number of the encrypted input messages is smaller than a preset number. That is, the sequence of the encrypted input messages is re-arranged (permuted) in its entirety by permutation of individual encrypted input messages. Although the proving of the individual permutations is efficient, it is necessary to provide a large number of permutations.

SUMMARY OF THE DISCLOSURE

The above-described background arts suffer from the following deficiencies:

In the background art (1), shuffling needs to be performed a number of times corresponding to the safety variable (about 160) for commitment generation. Each shuffling is in need of computation which consume large amount of computational resource involving modular exponentiation twice as many as the number of re-encrypted input messages.

On the other hand, verification is in need of computation which consume large amount of computational resource involving modular exponentiation twice as many as the number of re-encrypted input messages.

Moreover, in the background art (2), the commitment of permutation of a pair of encrypted input messages and its proof is in need of a sum total of 16 modular-exponentiation computations.

The computational resources per permutation is small as compared to the computational resources per two encrypted input messages of the background art (1) (=320), permutation of paired encrypted input messages is retained to be performed a number of times which enables permutation of any sort of the entire encrypted input messages, this number being n logn-n+1, where n is the number of encrypted input messages.

So, the computational resources is increased with the increasing number of the encrypted input messages.

It is therefore an object of the present invention to provide a method and a system in which the required computational resources for proving can be diminished without dependency on the number of encrypted input messages, and a program product.

It is another object of the present invention to provide a method and a system for reducing the required computational resources for verification as in the case of proving. Other objects, advantages and features of the present invention will be apparent from the entire disclosure including the following description.

According to a first aspect of the invention, there is provided a method for shuffle with proof in which an input message sequence which is comprised of encrypted messages and one or more public-keys, and shuffle information are input, and in which an encrypted output message sequence obtained by processing permutation of the encrypted messages and re-encryption by the public key or keys, and a shuffle proof text as a proof text for the processing, are output.

The method comprises:

(a) a transformation information retention commitment generating step of generating an output encrypted message sequence from an input message sequence and generating a commitment pertinent to retention of the transformation information from the input message sequence to the output encrypted message sequence, termed as "transformation information retention commitment";

(b) a transformation condition commitment generating step of generating a commitment pertinent to a condition to be met by the transformation, termed as "transformation condition commitment"; and (c) a response generating step of generating a response from the shuffle information and challenge value;

wherein (d) the transformation information retention commitment, the transformation condition commitment and the response are output as the shuffle proof text; and wherein (e) the shuffle information includes the manner of permuting the input encrypted message, variables used for permuting and random numbers.

According to a second aspect of the invention, there is provided a shuffle verifying method in which an input message sequence, an output encrypted message sequence and a shuffle proof text are input, and a result of verification indicating acceptance or non-acceptance is output.

The method comprises:

(a) a transformation information retention verifying step of verifying the retention of the transformation information on transformation from an input message sequence to an output encrypted message sequence from the input message sequence, output encrypted message sequence, transformation information retention commitment pertinent to retention of the transformation information from the input message sequence to the output encrypted message sequence, a response and challenge value; and (b) a transformation condition verifying step of verifying the condition to be met by transformation from the input message sequence to the output encrypted message sequence, by the transformation condition commitment pertinent to the condition to be met by the transformation, the response and the challenge value; wherein (c) acceptance is output as the result of the shuffle verification if both the verification of the transformation information retention verifying step and the verification of the transformation condition verifying step are accepted, and non-acceptance is output otherwise.

According to a third aspect of the invention, there is provided an apparatus for shuffle with proof in which input message sequence, which is including a plurality of input encrypted messages and one or more public keys, and the shuffle information including the manner of permuting the input encrypted messages, variables used for re-encryption and random numbers is input, and an output encrypted message sequence obtained on permutation of the encrypted message and re-encryption by the public key and a shuffle proof text are output.

The apparatus comprises:

(a) a transformation information retention commitment generating unit for generating the output encrypted message sequences from the input message sequence and for generating a commitment pertinent to retention of the transformation information from the input message sequence to the output encrypted message sequences, termed as "transformation information retention commitment";

(b) a transformation condition commitment generating unit for generating a commitment pertinent to a condition to be met by the transformation, termed as "transformation condition commitment"; and (c) a response generating unit for generating a response from the shuffle information and challenge value;

wherein (d) the transformation information retention commitment, the transformation condition commitment and the response are output as the shuffle proof text.

According to a fourth aspect, there is provided a shuffle verification apparatus which (a) receives inputs, and in which (b) the result of verification, i.e., acceptance or non-acceptance is output;

the inputs (a) comprising:

(a1) an input message sequence, made up of a plurality of encrypted messages and one or more public keys, input to a device for shuffle with proof, which is fed with the input message sequence and a shuffle information as input, and which outputs an encrypted output message sequence obtained on permutation of the encrypted messages and re-encryption by the public key or keys, and a shuffle proof text, (a2) the output encrypted message sequence output from the device for shuffle with proof, and (a3) a shuffle proof text output from the device for shuffle with proof, the shuffle proof text including the transformation information retention commitment pertinent to retention of the transformation information from the input message sequence to the output encrypted message, a transformation condition commitment pertinent to a condition to be met by the transformation, and the response.

The apparatus further comprises:

(c) a transformation information retention verifying unit for testifying retention of the transformation information on transformation from the input message sequence to the output encrypted message sequence based on the input message sequence, output encrypted message sequence, transformation information retention commitment, response and challenge value; and (d) a transformation condition verifying unit for verifying the condition to be met by transformation from the input message sequence to the output encrypted message sequence based on the transformation condition commitment, the response and the challenge value;

wherein (e) acceptance is output as the result of the shuffle verification if the verification by the transformation information retention verifying unit and the transformation condition verifying unit are both accepted and non-acceptance is output otherwise.

According to a fifth aspect of the present invention, there is provided an input message sequence generating method. The method generates an input message sequence, input to a device for shuffle with proof, in such a manner that a portion of the generated input message sequence is in the form of numerical values corresponding to the public key and the input encrypted message sequence transformed by the pseudo random numbers. According to the present invention, the input encrypted message sequence; public key and the pseudo random numbers may be combined into one input message sequence.

According to a sixth aspect, there is provided a machine readable program so formulated that a computer, as a shuffle apparatus, in which an input message sequence, which is including a plurality of input encrypted messages and one or more public keys, and the shuffle information, including the manner of permuting the input encrypted message, variables used for re-encryption and random numbers, are input, and in which an encrypted output message sequence obtained on permutation of said encrypted messages and re-encryption by said public key or keys, and a shuffle proof text, are output, is caused to perform the processing comprising:

(a) transformation information retention commitment generating processing of generating said output encrypted message sequences from said input message sequence and generating a commitment pertinent to retention of the transformation information from said input message sequence to said output encrypted message sequences, termed as "transformation information retention commitment";

(b) transformation condition commitment generating processing of generating a commitment pertinent to a condition to be met by said transformation, termed as "transformation condition commitment"; and (c) response generating processing of generating a response from said shuffle information and challenge value; and (d) processing of outputting said transformation information retention commitment, transformation condition commitment and said response as said shuffle proof text.

According to a seventh aspect, there is provided a machine readable program so formulated that a computer, as a shuffle verifying apparatus, in which an input message sequence, an output encrypted message sequence output by a device for shuffle verifying with proof, the transformation information retention commitment, output from a device for shuffle with proof, pertinent to retention of the transformation information from said input message sequence to said output encrypted message sequence, a transformation condition commitment, pertinent to the condition to be met by said transformation, and a shuffle proof text including a response, are input, and a result of verification indicating acceptance or non-acceptance is output, to perform the processing comprising:

(a) transformation information retention verifying processing of verifying the retention of the transformation information from said input message sequence to said output encrypted message sequence from the input message sequence, output encrypted message sequence, transformation information retention commitment pertinent to retention of the transformation information from said input message sequence to said output encrypted message sequence, a response and challenge value;

(b) transformation condition verifying processing of verifying the condition to be met by transformation from said input message sequence to said output encrypted message sequence from the transformation condition commitment pertinent to the condition to be met by said transformation, said response and the challenge value; and (c) processing of outputting acceptance as the result of the shuffle verification if both the verification of the transformation information retention verifying processing and the verification of the transformation condition verifying processing are accepted, and of outputting non-acceptance if otherwise.

According to a eighth aspect, there is provided a method for generating a public key sequence with proof comprising:

generating a public key sequence having a pseudo random number sequence uniquely determined from a given input as generators, having a public key, corresponding to the same secret key, as generators, and generating a proof text proving the correspondence to the same secret key;

wherein the generations of said public key sequence and the proof text are performed in cooperation by provers owning the secret key in a scattered fashion.

According to a ninth aspect, there is provided an apparatus for generating a public key sequence with proof wherein a public key sequence having a pseudo random number sequence uniquely determined from a given input as generators, corresponding to the same secret key and having the public key as the element, and a proof text proving the correspondence to the same secret key are generated in cooperation by provers owning the secret key in a scattered fashion.

According to a tenth aspect, there is provided a machine readable program for allowing a computer to perform the processings of:

generating a public key sequence having a pseudo random number sequence uniquely determined from a given input as generators, said public key sequence corresponding to the same secret key and having a public key as element, and generating a proof text proving the correspondence to the same secret key by cooperation of provers owning the secret key in a scattered fashion.

In the following, the basic concept of the invention will be explained.

According to the present invention, the proof that the shuffle is represented by a sort of more general transformation and the information on this transformation is retained, and the proof for the condition to be met by the transformation are combined together to constitute the proof for shuffle.

These two proofs are each simpler than the proof of the conventional shuffle such that the computational resources is diminished without dependency on the number of the input encrypted messages. This asset is not lost in the proof of the shuffle consisting in the combination of the two proofs.

The proof that the information on transformation is retained is acquired by generating a response from the challenge value, after generation of the output encrypted message sequence and the transformation information retention commitment, depending upon the aforementioned transformation and upon the random numbers used in generating the transformation information retention commitment.

Since the transformation is reflected on the relation between the response and the challenge value, the relation, in terms of equation(s), to be met, based on the condition met by the transformation, by the response and the challenge value exists without dependency on the challenge value. This relation (equation) is committed to prove the condition to be met by the transformation.

If the condition to be met by the transformation representing the shuffle is selected as the condition to be met by the transformation to be proved, the proof of the shuffle can be constituted by the two proofs.

PREFERRED EMBODIMENTS OF THE INVENTION

Figure 1:
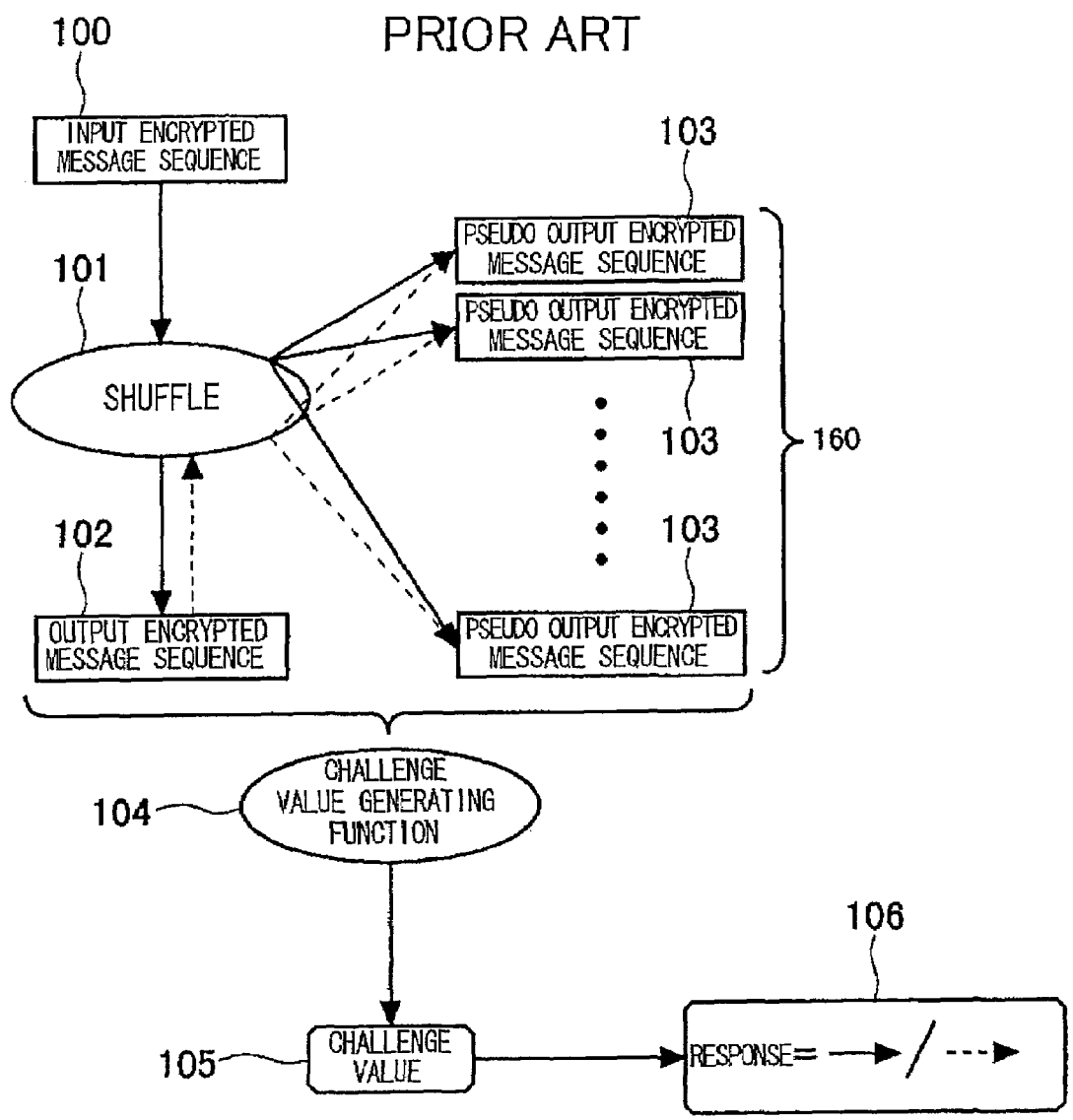
FIG. 1 shows the structure of the prior-art technique 1.
Figure 2:
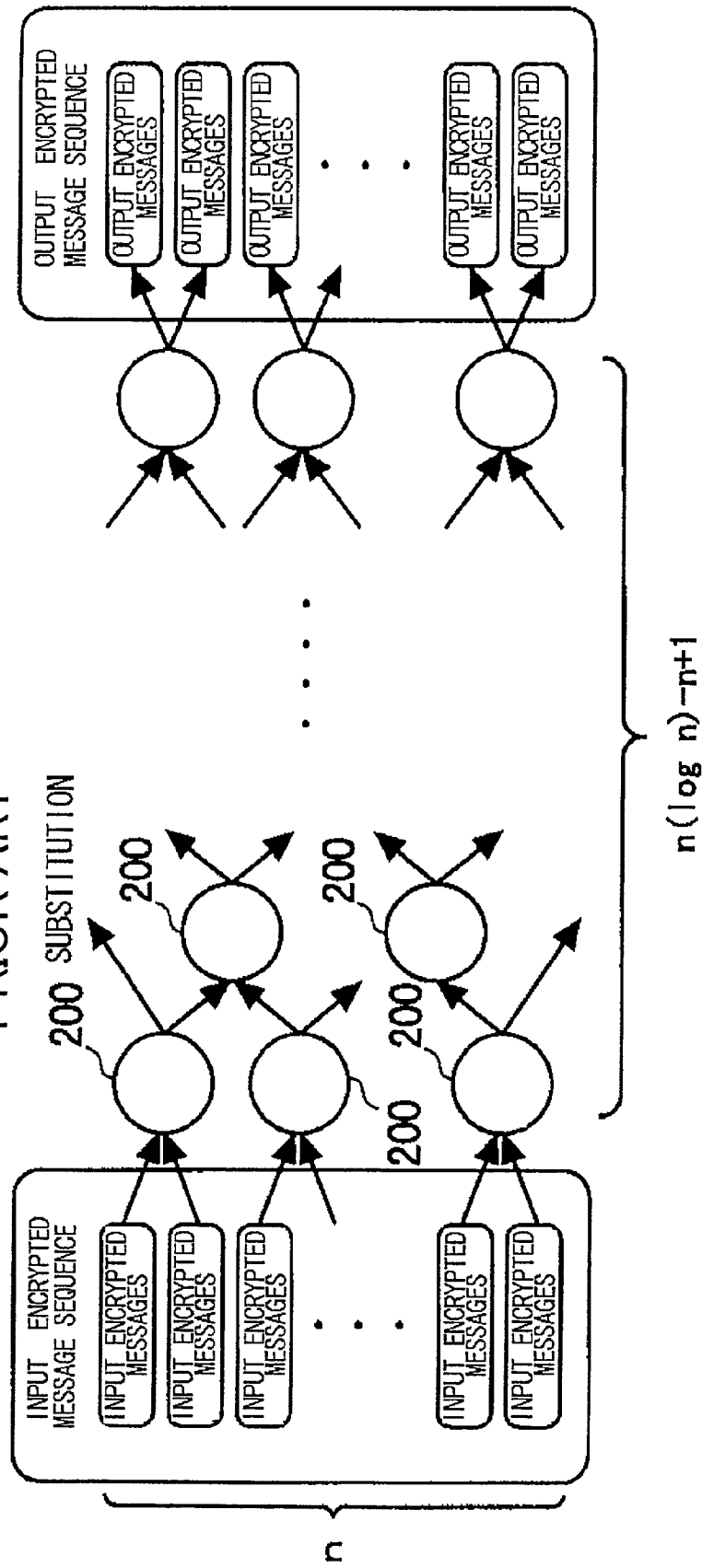
FIG. 2 shows the structure of the prior-art technique 2.

For clarifying the above and other objects, features and advantages of the present invention, preferred embodiments of the present invention are now explained in detail with reference to the drawings.

First, the matter, which forms the premises underlying the present invention, is explained. The encryption method used in the present invention is a method belonging to the public key crypt-system which also belongs to a probabilistic crypto-system, such as ElGamal crypto-system.

In the method for shuffle with proof, according to the present invention, a prover performing the shuffle with proof cannot falsify or disguise the proof message for shuffling unless all of the formulators of the encrypted input messages divulge the secret variables used for creating the encrypted input messages to the prover. By using the input message sequence generating method according to the present invention, in combination, it is similarly possible to prevent falsification or disguise of the proof message even if the formulators of the encrypted input messages would act in collusion with the prover.

The method for shuffle with proof, according to the present invention, is comprised of a transformation information retention (holding) commitment generating processing, for generating the transformation information retention commitment, a transformation condition commitment processing for generating the transformation condition commitment, and response generating processing for generating the response and sub-response. The proof text (verifying text) is made up of the commitment generated by the above three sort of processings and the response (response and sub-response).

The method for shuffle and verification according to the present invention is comprised of a transformation information retention verification processing for verifying the retention of the transformation information from the input message sequence, encrypted output message sequence, transformation information retention commitment and the response, and a transformation condition verification processing for verifying the condition satisfied by the transformation from the transformation condition commitment, response and the sub-response.

[Transformation Information Retention Commitment Generating Processing]

The transformation information retention commitment generating processing, forming the method for shuffle with proving is now explained.

The transformation information retention commitment generating processing performs transformation corresponding to shuffle from the input message sequence to generate an encrypted output message sequence, while performing general transformation using random numbers to generate a transformation information retention commitment.

If any other component than the encrypted input message sequence and the public key is contained in the input message sequence, this component transformed in association with the shuffle is also regarded as the transformation information retention commitment.

If plural responses are to be generated, general transformation by different random numbers is executed a number of times to generate a number of sets of the transformation information retention commitments.

In this transformation, the output encrypted message sequence and the transformation information retention commitment can be generated as a representation of the variables and random numbers used for re-encryption and values associated with the permutation with respect to a basis comprised of the input message sequence.

This representation associates the basis with a represented value, and the method needs to be such as to render the computation of the representation from the basis and the value of representation difficult with respect to the computational resources. For this representation method, modular exponentiation may be used.

For example, let the encrypted input message sequence $g[i, \lceil\,]; i=1, \ldots, n; \lceil=0, \ldots, 1$, the public key being $g[i, \lceil\,]; i=n+1, \ldots, n+m; \lceil=0, \ldots, 1$, other components of the input message sequence being $g[i, \lceil\,]; i=1, \ldots, n+m; \lceil=l+1, \ldots, l'$, random numbers associated with general transformation, referred to below as the information hiding factor, being $A[\mu, j]; \mu=1, \ldots, n+m, j=n+1, \ldots, n+m'$, the variable for re-encryption being $A[i, j]; i=n+1, \ldots, n+m, j=1, \ldots, n$, the variable for transformation corresponding to permutation being $A[i, j]; i, j=1, \ldots, n$, and output encrypted message sequence being $g''[i, \lceil\,]; i=1, \ldots, n; \lceil=1, \ldots, l$, it is possible to generate an output encrypted message sequence $g''[i, \lceil\,]; i=1, \ldots, n; \lceil=1, \ldots, l$ as $g''[i, \lceil\,]=\prod_{j=1}^{n}g[j, \lceil\,]^{A[j, i]}\prod_{j=n+1}^{n+m}g[j, \lceil\,]^{A[j, i]}/F^*_p$ $i=1, \ldots, n \lceil=1, \ldots, l$, the transformation information retention commitment as $g''[i, []=\Pi_{j=1}^{n}g[j, []^{A[j, i]}\Pi_{j=n+1}^{n+m}g[j, []^{A[j, i]}/F^*_p$ $i=n+1, \ldots, n+m'$ $[=1, \ldots, l$, and the transformation information retention commitment, in case $g[i, []; i=1, \ldots, n+m; [=l+1, \ldots, l'$ is included in the input message sequence, as $g''[i, []=\Pi_{j=1}^{n}g[j, []^{A[j, i]}\Pi_{j=n+1}^{n+m}g[j, []^{A[j, i]}/F^*_p$ $i=1, \ldots, n+m'$ $[=l+1, \ldots, l'$.

The above can collectively be represented by $g''[i, []=\Pi_{j=1}^{n+m}g[j, []^{A[j, i]}/F^*_p$ $i=1, \ldots, n+m'$ $[=1, \ldots, l'$.

Here, $g''[i, []; i=1, \ldots, n+m; [=1, \ldots, l$ is termed as "output message sequence", where $g''[\mu, []; \mu=1, \ldots, n+m'; [=1, \ldots, l'$ is the represented value, $A[\mu, v]; \mu=1, \ldots, n+m; v=1, \ldots, n+m'$ is the representation and $g[\mu, []; \mu=1, \ldots, n+m; [=1, \ldots, l'$ is the basis.

If plural sets of the transformation information retention commitments are to be generated depending on the number of the responses, plural different $A[\mu, j]; \mu=1, \ldots, n+m, j=n+1, \ldots, n+m'$ are provided and generated.

The fact that a prover is able to generate the transformation information retention commitment, input message sequence, and response corresponding to the output encrypted message sequence and challenge value, in such a manner as to satisfy the verification formulas, presents a proof that the knowledge of transformation from the input message sequence to the output encrypted message sequences is possessed.

[Transformation Condition Commitment Generating Processing]

The processing for generating the transformation condition commitments forming the shuffle method with proving is now explained.

The condition met by the transformation from the input message sequence to the output message sequence and the transformation information retention commitment is reflected on the relation between the response and the challenge value. So, there exists the relation (correlative equation) between the response and the challenge value, which holds without dependency on the challenge value. The transformation condition commitment is the commitment of this relation, which serves for representing the condition met by the transformation.

If plural responses are to be generated, the difference in the knowledge-hiding factor is reflected in the relation. For example, it is possible that this relation is determined as an identity as a polynomial of the responses and challenge values and the coefficients are committed. Alternatively, certain terms of the polynomial may be regarded as sub-responses, and coefficients of the sub-response may be committed to serve as transformation condition commitments. It is sufficient if a response and a sub-response are generated after determination of the challenge values.

The respective components of the response are polynomials of challenge values. The embodiments employ identities intending the relation that the square sums of certain terms of certain polynomials and square sums of certain components of the challenge values become equal to each other without dependency on (i.e., irrespective of) the challenge values, or identities intending the relation that the cubic sums of certain terms of certain polynomials and cubic sums of certain components of the challenge values become equal to each other without dependency on the challenge values.

The corresponding identities used in the embodiments are those which intend the relation $$\Sigma_{i=1}^{n}(\Sigma_{j=1}^{n}A[i, j]c[j])^2 = \Sigma_{i=1}^{n}c[i]^2/F_q$$

or the relation $$\Sigma_{i=1}^{n}(\Sigma_{j=1}^{n}A[i, j]c[j])^3 = \Sigma_{i=1}^{n}c[i]^3/F_q$$

using the challenge values c[i] and the response r[i].

Meanwhile, $$\Sigma_{j=1}^{n}A[i, j]c[j]/F_q i=1, \ldots, n$$

is a portion of a polynomial $$\Sigma_{j=1}^{n+m'}A[i, j]c[j]/F_q i=1, \ldots, n$$

of the challenge value forming r[i].

For example, these relations reflect the properties that A[i, j]; i, j=0, \ldots, n in the variables $A[\mu, v]; \mu=0, \ldots, n+m; v=0, \ldots, n+m'$ defining the transformation from the input message sequence to the output encrypted message sequences and to the transformation information retention commitment is an orthonormal matrix or a quasi-permutation matrix.

The "permutation matrix" is such a square matrix in each column and in each row of which only one nonzero element exists which is of a value of 1. A matrix, which is simultaneously an orthonormal matrix and a sub-permuted matrix, is a permutation matrix.

The "quasi-permutation matrix" is the above-mentioned permutation matrix, whose element equal to "1" is replaced by one of cubic roots of 1. It is also possible to replace the respective components by different cubic roots of 1. In such case, the transformation corresponding to the permutation matrix corresponds to the shuffle. That is, the transformation can be proved to be the shuffle by proving the condition met by the transformation by the transformation condition commitment generating processing.

Examples of the identities intending the above relation include $$\Sigma_{i=1}^{n}r[i]r[i]+\Sigma_{\mu=1}^{n+m}\rho'[\mu]r[\mu]/F_q = \Sigma_{i=1}^{n}c[i]c[i]+\Sigma_{\mu=1}^{n+m'}\phi[\mu]c[\mu]/F_q$$

and $$\Sigma_{i=1}^{n}r[i]r[i]r[i]+\rho''r'+\Sigma_{\mu=1}^{n+m}\rho'[\mu]r[\mu]/F_q = \Sigma_{i=1}^{n}r[i][i]r[i]r[i]+\rho''(\lambda[0]+\Sigma_{i=1}^{n}\lambda[i]r[i]r[i])+\Sigma_{\mu=1}^{n+m}\rho'[\mu]r[\mu]/F_q = \Sigma_{i=1}^{n}c[i]c[i]c[i]+\Sigma_{i=1}^{n}\psi[i]c[i]c[i]+\Sigma_{\mu=1}^{n+m'}\phi[\mu]c[\mu]/F_q.$$

Here, the coefficients of the identity $\rho''$, $\rho'[i]$, $\phi[\mu]$, $\psi[i]$ need to be determined so that the relation corresponding to the conditions to be met by the transformation.

There are also occasions wherein sub-equation coefficients $\lambda[\mu]; \mu=0, \ldots, n$ are committed, with a portion of the identity $$r'=\lambda[0]+\Sigma_{i=1}^{n}\lambda[i]r[i]r[i]/F_q$$

as a sub-response.

As transformation condition commitments, coefficients of identities or those coefficients partly or entirely committed, and sub-equation coefficients or these coefficients partly or entirely committed, are generated, are generated. In an embodiment, a portion of an identity is committed to $$v, v^{\phi[0]}/F^*_p$$

for example, and the sub-equation coefficients are committed to $$u, u^{\lambda[\mu]}/F^*_p \mu=0, \ldots, n$$

Committing the coefficients of the identity and using the sub-response are effective for diminishing the information for a verifier to identify the shuffle from the response and the commitment.

[Response Generating Processing]

The response generating processing of constructing the shuffle method with proving is hereinafter explained.

In the response generating processing, the transformation information retention commitment, transformation condition commitment, an input message sequence and an output encrypted message sequences are input to a challenge value generating function (unit) to acquire a challenge value.

It is noted that the "challenge value generating function" is such a function in which it is computationally difficult to find input from an output or to determine input with the relation among different output components in mind. This assures that a challenge value has been generated after determination of the input, commitment and the output, without taking the intention of the prover into account.

If the challenge value generating function is not used, the challenge value is acquired by arbitrary selection by a verifier after the input, output and the commitment have been shown.

From the challenge value, the response or the sub-response, reflecting the shuffle method and the information-hiding factor is generated.

If plural responses and sub-responses are generated, the respective responses need to reflect different information hiding factors.

For example, it suffices to generate an response such that the value having represented by the challenge value with respect to the basis comprising of the output encrypted message sequences and the transformation information retention commitment will be equal to the value having represented by the response value with respect to the basis comprising of the input message sequence.

For example, the response $r[\mu]$; $\mu=1, n+m$ is generated such as $$r[\mu]=\Sigma_{\nu=1}^{n+m'}A[\mu,\nu]c[\nu]/F_q \mu=1,\ldots,n+m$$

with sub-response, $$r'=\lambda[0]+\Sigma_{i=1}^{n}\lambda[i]r[i]r[i]/F_q,$$

using the challenge value $c[\mu]$; $\mu=1, \ldots, n+m'$.

[Transformation Information Retention Verification Processing]

The transformation information retention verification processing, forming the shuffle verification method, is hereinafter explained.

It is verified that the relation among the input message sequence, output encrypted message sequences and the transformation information retention commitment is reflected by the relation between the response and the challenge value. For example, it is confirmed that there exists the relationship between the response and the challenge value such that a represented value represented by the challenge value with respect to the basis of the output encrypted message sequences and the transformation information retention commitment is equal to a represented value represented by the response with respect to the basis of an input message sequence.

For example, it is confirmed that the challenge value $c[i]$; $i=1, \ldots, n+m'$ and the response $r[i]$; $i=1, \ldots, n+m$ satisfy the relation:

$$\Pi_{i=1}^{n+m'}g''[i,j]^{c[i]}=\Pi_{i=1}^{n+m}g[i,j]^{r[i]}/F^*_p[=1,\ldots,l'.$$

The same value of the challenge value as that used in formulating a proof message is used. This is possible because, in using a challenge value generating function, an input to the challenge value generating function exists in the proof message, input message sequence and the output encrypted message sequence.

[Transformation Condition Verification Processing]

The transformation condition verification processing, forming the shuffle verification method, is now explained.

From the transformation condition commitment, it is verified that the challenge value and the response meet the relation reflecting the condition met by the transformation.

For example, the response and the challenge value or the response, challenge value and the sub-response is substituted into an identity connoting the condition to be met by the transformation to confirm that the identity holds. In case where there is a sub-response, the authenticity of the sub-response is also confirmed based on the committed response, sub-response and sub-equation coefficients.

For coefficients, e.g., $\rho''$, $\rho'[\mu]$, $\phi[\mu]$, $\psi[i]$, as the transformation condition commitment, the challenge value $c[i]$; $i=1, \ldots, n+m'$ and the response $r[i]$; $i=1, \ldots, n+m$ are confirmed from the fact that the identity $$\Sigma_{i=1}^{n}r[i]r[i]+\Sigma_{\mu=1}^{n+m}\rho'[\mu]r[\mu]=\Sigma_{i=1}^{n}c[i]c[i]+\Sigma_{\mu=1}^{n+m'}\phi[\mu]c[\mu]/F_q$$

or the identity $$\Sigma_{i=1}^{n}r[i]r[i]r[i]+\rho''r'+\Sigma_{\mu=1}^{n+m}\rho'[\mu]r[\mu]/F_q=\Sigma_{i=1}^{n}r[i]r[i]r[i]+\rho''(\lambda[0]+\Sigma_{i=1}^{n}\lambda[i]r[i]r[i])+\Sigma_{\mu=1}^{n+m}\rho'[\mu]r[\mu]/F_q=\Sigma_{i=1}^{n}c[i]c[i]c[i]+\Sigma_{i=1}^{n}\psi[i]c[i]c[i]+\Sigma_{\mu=1}^{n+m'}\phi[\mu]c[\mu]/F_q$$

hold, while the authenticity of the sub-response is confirmed from the fact that the equation of verification $$u^{r'}=u[0]\Pi_{i=1}^{n}u[i]^{r[i]r[i]}/F^*_p$$

holds.

If the coefficients of the identity are partially committed, it is confirmed that, instead, $$v^{\{\Sigma_{i=1}^{n}r[i]r[i]+\Sigma_{\mu=1}^{n+m}\rho'[\mu]r[\mu]\}}/F^*_p=v^{\{\Sigma_{i=1}^{n}c[i]c[i]+\Sigma_{\mu=1}^{n+m'}\phi[\mu]c[\mu]\}}/F^*_p$$

or $$v^{\{\Sigma_{i=1}^{n}r[i]r[i]r[i]+\rho''r'+\Sigma_{\mu=1}^{n+m}\rho'[\mu]r[\mu]\}}/F^*_p=v^{\{\Sigma_{i=1}^{n}r[i]r[i]r[i]+\rho''(\lambda[0]+\Sigma_{i=1}^{n}\lambda[i]r[i]r[i])+\Sigma_{\mu=1}^{n+m}\rho'[\mu]r[\mu]\}}/F^*_p=v^{\{\Sigma_{i=1}^{n}c[i]c[i]c[i]+\Sigma_{i=1}^{n}\psi[i]c[i]c[i]+\Sigma_{\mu=1}^{n+m'}\phi[\mu]c[\mu]\}}/F^*_p$$

holds. In the above equations, [^] denotes exponential processing.

[Input Message Sequence Generating Method]

In the shuffle method with proving, according to the present invention, the transformation from the input message sequence to the output encrypted message sequences and the transformation information retention commitment needs to be reflected in the relation between the response and the challenge value. To this end, the response that can be generated given a challenge value needs to be limited. However, if the prover knows the generating information of the input encrypted message, there is a risk that this limitation be violated. The method to obstruct this risk is the input message sequence (string) generating method.

The input message sequence generating method according to the present invention generates pseudo random numbers to transform the input message sequence, or the pseudo random number is added to the input message sequence to generate an input message sequence which cannot be determined even by the formulator of the input encrypted message.

[Input Message Sequence Generating Method (1)]

Pseudo random numbers are generated and added to the encrypted input message sequence and to the public key to serve as an encrypted input message sequence. The pseudo random numbers are determined from a preset input to assure reproducibility.

For example, if the encrypted input message sequence is g[i, []]; i=1, . . . , n; []=0, . . . , 1 and the public key is g[i, []]; i=n+1, . . . , n+m; []=0, . . . , 1, pseudo random numbers of (n+m)×(l'−1), where l'−1≧1, are generated from the preset input such that $$g[i, []]; i=1, \ldots, n+m; []=l+1, \ldots, l'$$

whilst the input message sequence is set to $$g[i, []]; i=1, \ldots, n+m; []=1, \ldots, l'.$$

[Input Message Sequence Generating Method (2)]

The respective encrypted messages, forming an encrypted input message sequence, and the public key, are re-encrypted by respective public keys forming a public key sequence generated from the input message sequence and the public key as inputs, and are combined together to form an input message sequence.

The "public key sequence" are prepared by uniquely generating a number of pseudo random numbers from an input which is the same as the number of the public keys forming the public key sequence so that the any of the random numbers represents certain element of the respective public keys.

For example, if the public key sequence is g'[i, []]; i=1, . . . , n+m; []=1, . . . , 1, the input encrypted message sequence is η[i, []]; i=1, . . . , n; []=0, . . . , 1, and the public key is η[i, []]; i=n+1, . . . , n+m; []=0, . . . , 1, an input message sequence g[i, []]; i=1, . . . , n+m; []=l+1, . . . , 1 is represented by g[i, []]=η[i, []]g'[i, []]$^{s[l]}$/F$^*_p$ using an optional positive integer s[i]; i=1, . . . , n+m which is apparent for a verifier. As s[i], e.g., s[n+m]=0, s[j]=1; j=1, . . . , n+m−1 is selected.

[Input Message Sequence Generating Method (3)]

Each input plain message (text) is encrypted using each associated public key forming a public key sequence, and proof is made of the fact that this public key has been used for encryption.

The encrypted message, which has received this proof, and the public key, are combined to an input message sequence.

If, for example, the public key sequence is g'[i, []]; i=1, . . . , n+m; []=0, 1, and the plain text is m[i]; i=1, . . . , n; []=0, 1, the input encrypted message $$\eta[i, 0]=g'[i, 0]^{s[i]}/F^*_p; i=1, \ldots, n$$

$$\eta[i, 1]=m[i]g'[i, 1]^{s[l]}/F^*_p; i=1, \ldots n$$

is generated, at the same time as the knowledge of s[i] such that $$\eta[i, 0]=g'[i, 0]^{s[l]}/F^*_p$$

is proved to give a proof message encrypted using g'[i, 0].

From the encrypted message for which the proof error message is verified, the input message sequence is made into $$g[i, []]=\eta[i, []]; i=1, \ldots, n; []=0, 1$$

$$g[i, []]=g'[i, []]; i=n+1, \ldots, n+m; []=0, 1.$$

[Method for Generating Public Key Sequence with Proof]

From a given input, a pseudo random number sequence is uniquely generated, and plural public keys which includes values created by a given procedure from respective random numbers as components and which have the same secret key are generated in a plurality of numbers in association with the respective random numbers. Simultaneously, a proof message that all the public keys have the same secret key is produced.

If the secret key is owned discretely by plural persons, each person prepares the public key sequence with each secret key and combines them together to generate a public key sequence.

For example, a pseudo random number generator Hash (*) is accorded and an output is prepared from an input *. An output is fed to input. This process is repeated to generate a pseudo random number recursively. A number of public keys g'[i, []]; i=1, . . . , n+m; []=0, . . , 1, having, as generators, each value of a number sequence g'[i, 0]; i=1, . . . , n+m made up of n+m generators obtained on removing 0 and 1 from a number sequence resulting from raising respective generators of the number sequence to the k'th power, and having the same secret key, are generated in association with the respective random numbers.

If the secret key is x[[]]; []=1, . . . , 1, the public key sequence may be represented by $$g'[i, 0]=g'[i, 0]$$

$$g'[i, []]=g'[i, 0]^{x[l]}/F^*_p; i=1, \ldots, n+m; []=1, \ldots, l.$$

A proof message that the above public key sequence has correctly been generated is generated.

If the secret key is owned in scattered state, each person creates a public key sequence corresponding to the discrete secret key, and the respective public key sequences are finally combined together to create a public key sequence associated with the secret key.

DETAILED DESCRIPTION OF THE EMBODIMENTS

Referring to the drawings, the present invention is explained with reference to Examples employing the ElGamal cipher-texts. In the drawings, abbreviations are used. For example, "retention commit" is the transformation information retention commitment, "condition commit" is the transformation condition commitment, "identity commit" is the commitment of the identity coefficients, "sub-response commit" is the commitment of the coefficients of the sub-response, "retention processing" is the processing for generating the transformation information retention commitment, "condition processing" is the processing for generating the transformation condition commitment, "response processing" is the processing for generating the response, "retention verification processing" is the transformation information retention verification processing, and "condition verification processing" is the transformation condition verification processing.

Figure 3:
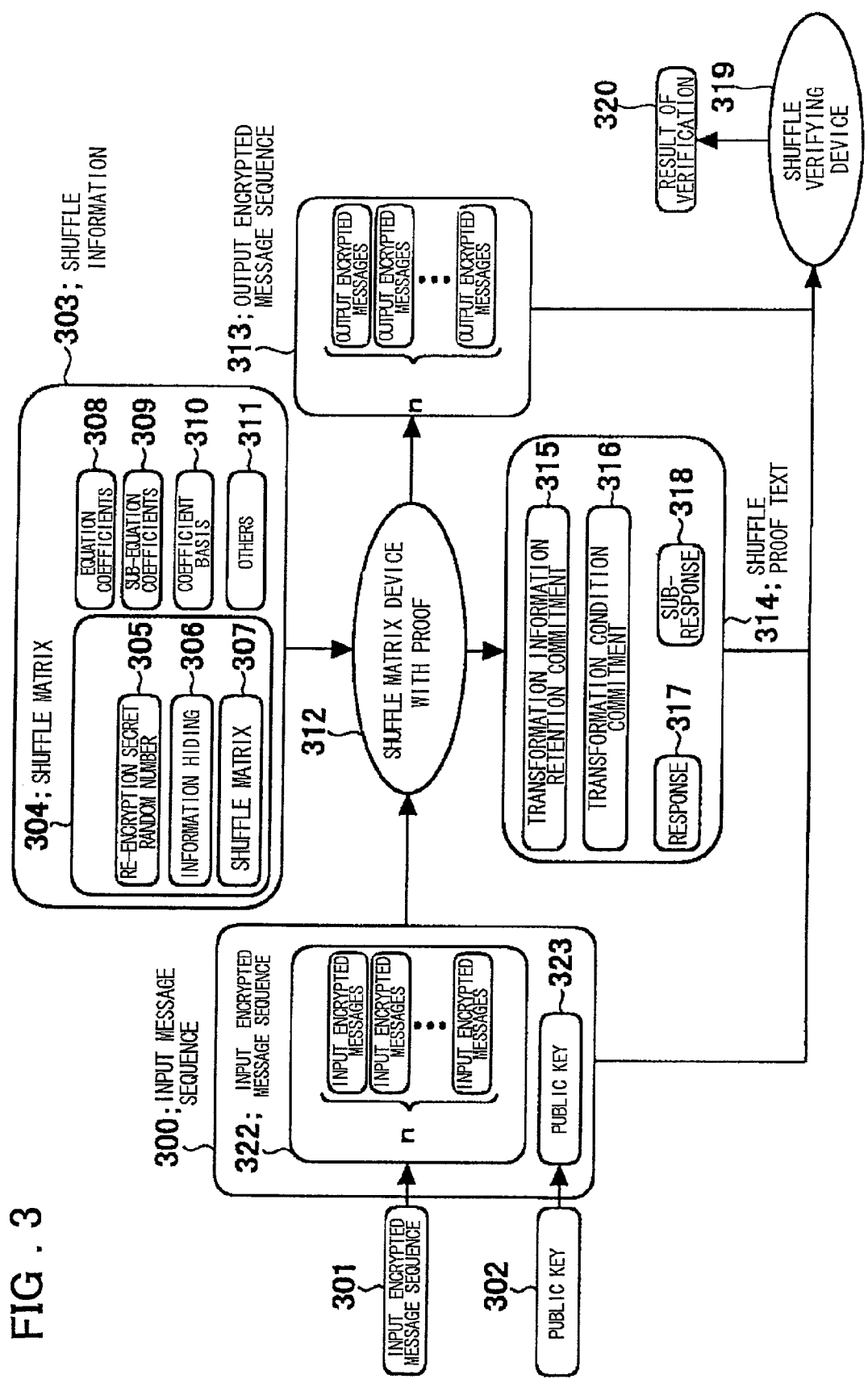
FIG. 3 shows information input/output between the structure of a device for shuffle with proof and a shuffle verifying device in an Embodiment of the present invention.

FIG. 3 shows input/output in the embodiment of the present invention for the shuffle device and a shuffle verification device.

In a preferred embodiment of the present invention, shown in FIG. 3, an input message sequence 300, made up of plural input message sequences 322 and the public key 323, a shuffle matrix 304, made up of a shuffle matrix 307, determining the permuting method, a re-encryption secret random number 305, as a variable for re-encryption, and an information hiding factor 306 as random numbers for generating the transformation information retention commitment, and a shuffle information 303, comprehending element (generator) coefficients 308 as seeds of coefficients of the identity, quasi-equation coefficients 309 as coefficients of the equation determining sub-response 319 as part of the identity and various constants for generating the transformation condition commitment made up of coefficients basis 310 for committing the coefficients, are input to a shuffle device with proof 312, and an output encrypted message sequence 313 and a shuffle proof message 314 are issued as output.

The shuffle proof message 314 comprehends a transformation condition commitment 316, including coefficients of the identity, committed coefficients of the identity and committed coefficients of the sub-response, a transformation information retention commitment 315, a response 317 and a sub-response 318.

The input message sequence 300, output encrypted message sequence 313 and the shuffle proof message 314 are input to a shuffle verification device 319, which then outputs the result of verification 322 in the form of acceptance or non-acceptance.

The shuffle device with proof is unable to falsify the shuffle proof message if and only if the prover is unaware of the input encrypted message generating information. The method added for inhibiting this falsification under any condition is the input message sequence generating method. Three sorts of the input message sequence generating methods are hereinafter explained along with the method for generating the public key sequence with proof used in two of these three input message sequence-generating methods.

In the following, the matter to be premised as a presupposition in common for the shuffle method with proof, an input message sequence generating method and an individual public key sequence generating method with proof, is explained in order.

First, the ElGamal domain parameters are explained.

These variables are two prime numbers (generators) p, q satisfying the relation $$p = kq + 1$$

where k is an integer.

[Challenge Value Generating Function and Basis Generating Function]

The challenge value generating function and basis generating function are explained. These are $$\text{Hash}[\mu; \mu=0, \ldots, nJ(*)], \text{Hash}'[\mu; \mu=0, \ldots, nJ(*)].$$

The Greek letter $\mu$, as suffix of each function, is a value from 0 to $\mu$. If an argument[*] is input, (n+1) element vector is output.

An output of the challenge value generating function is (n+1) integers other than 1 and 0 not larger than q, whilst an output of the basis generating function is (n+1) integers other than 1 and 0 not larger than p, and is an integer which is the generator (element) of $F^*_p$ of orders q (generator of the sub-group whose order being q of the multiplication group of orders p−1).

These functions are those for which the argument cannot be determined by number-theoretically intending the relation between input and output and between different components of the output.

As an illustrative method for constructing the basis generating function, one Hash function Hash (*) outputting |p| bits is provided to compute $$\text{Hash}(*)$$

with the computed result being input to the argument of the Hash function to derive the computed results. This operation is repeated to recursively generate the number sequence h[0], h[1], h[2], ... to find number sequence $h[0]^k, h[1]^k, h[2]^k, \ldots$ by raising each numerical value to the k'th power. Among these, (n+1) generators other than 1, 0 are sequentially selected.

As for the challenge value generating function, a number sequence is found using the Hash function outputting |q| bits and, among the generators of this sequence, those which are other than 1, 0 are selected. In this case, the operation of raising the values to the k'th power is unnecessary.

[Public Key]

The public key is explained. The public key is two values $\eta[0, 0], \eta[0, 1]$, with $\eta[0, 0]$ being an generator of $F^*_p$ having the number of order of q. As for the $\eta[0, 1]$, it is computed using a secret key x by $$\eta[0, 1] = \eta[0, 0]^x / F^*_p.$$

[Input Encrypted Message]

The input encrypted message is explained. The plain message is selected from generators of the $F^*_p$ not more P, whose order equal to q, and is termed M. Using a secret random number r, generated by a pseudo random number generator, the input encrypted message is computed as being $$(\eta[0, 0]^r, M\,\eta[0, 1]^r)/F^*_p.$$

[Re-encryption]

The re-encryption is explained. Given the ElGamal cipher-texts text $(\eta[0, 0]^r, M\,\eta[0, 1]^r)/F^*_p$, an optional random number s is selected and transform is carried out such that $$(\eta[0, 0]^r, M\eta[0, 1]^r) \rightarrow (\eta[0, 0]^r \eta[0, 0]^s, M\eta[0, 1]^r\eta[0, 1]^s)/F^*_p = (\eta[0, 0]^{r+s}, M\eta[0, 1]^{r+s})/F^*_p.$$

This processing is called "re-encryption". The above transform can be executed without knowing the value of r. The decoded result of the cipher-texts text, re-encoded by this transformation, remains unchanged. The random number s at this time is called "re-encryption secret random number".

[Permutation Matrix]

The permutation matrix is explained. In the permutation matrix, there exists only one non-zero component in any row or column and assumes the value of 1, provided that it is on Fq in the preferred embodiment. The following is given as an example.

$$0\ 0\ 0\ 1\ 0$$

$$1\ 0\ 0\ 0\ 0$$

$$0\ 0\ 0\ 0\ 1$$

$$0\ 0\ 1\ 0\ 0\ /F_q.$$

[Quasi-permutation Matrix]

The quasi-permutation matrix is hereinafter explained. The [quasi-permutation matrix] is defined as being ones resulting from permutation of one of the permutation matrix by one of three cubic roots of 1 on $F^*_p$. These being w, $w^2$, 1, an example of the quasi-permutation matrix is given as follows:

$$0\ 0\ 0\ w^2\ 0$$

$$w\ 0\ 0\ 0\ 0$$

$$0\ w^2\ 0\ 0\ 0$$

$$0\ 0\ 0\ 0\ 1$$

$$0\ 0\ w\ 0\ 0\ /F_q.$$

[Shuffle]

The shuffle is explained. The input encrypted message sequence $\eta[i, 0], \eta[i, 1]; i=1, \ldots, n$ is shuffled in sequence to generate an encrypted message sequence $\eta'[i, 0], \eta'[i, 1]; i=1, \ldots, n$. Then, using n secret random number $s[i]$: $i=1, \ldots, n$ and public keys $\eta[0, 0]$ and $\eta[0, 1]$, an output encrypted message sequence $g''[i, \lceil\ \rceil]; i=1, \ldots, n, \lceil=0, 1$ are computed by $$g''[i, \lceil\ ] = \eta'[i, \lceil\ ] \eta[0, \lceil\ ]^{s[i]}/F^*_p i=1, \ldots, n, \lceil=0, 1.$$

This is an output result of the shuffle, and is termed [output encrypted message sequence].

[Shuffle matrix]

The shuffle matrix is explained. The [shuffle matrix] is a n+1 row by n+1 column matrix with the generators $A[\mu, \nu]$; $\mu, \nu=0, \ldots, n$ being such that $$A[\mu, \nu]=$$

$A[i, j] i, j=1, \ldots, n$ "permutation matrix" 307

$A[0, j] \in_R j=1, \ldots, n$ re-encryption secret random number 305

$A[i, 0] \in_R i=1, \ldots, n$ information hiding factor 306

$A[0, 0] \in R$ information hiding factor 306

[Shuffle Matrix Transformation]

The shuffle matrix transformation is explained. This acts on the input message sequence $g[\mu, \lceil\ ]$ in the following manner to output an output message sequence $g''[\mu, \lceil\ ]$.

$$g''[\mu, \lceil\ ] = \prod_{\nu=0}^{n} g[\nu, \lceil\ ]^{A[\nu, \mu]}/F^*_p \mu=0, \ldots, n, \lceil=0, 1.$$

If the "shuffle matrix" is a permutation matrix, the output encrypted message sequence is $g''[i, 0], g''[i, 1]; i=1, \ldots, n$, and expanded, $$g''[j, 0] = g[i, 0]\eta[0, 0]^{A[0, j]}/F^*_p$$

$$g''[j, 1] = g[i, 1]\eta[0, 1]^{A[0, j]}/F^*_p$$

is obtained for a permutation $(i, j|\pi(i)=j)$. This represents an output of the shuffle.

If the "permutation matrix" is a quasi-permutation matrix, $$g''[j, 0] = g[i, 0]^{w[i]}\eta[0, 0]^{A[0, j]}/F^*_p$$

$$g''[j, 1] = g[i, 1]^{w[i]}\eta[0, 1]^{A[0, j]}/F^*_p$$

is output as a result of quasi-shuffle (the quasi-shuffle is defined as giving shuffle on raising each output encrypted message to the first, wth or to the $w^2$th power). Here, $w[i]$; $i=1, \ldots, n$ assumes any one of cubic roots of 1 on Fq.

EMBODIMENT 1

Figure 4:
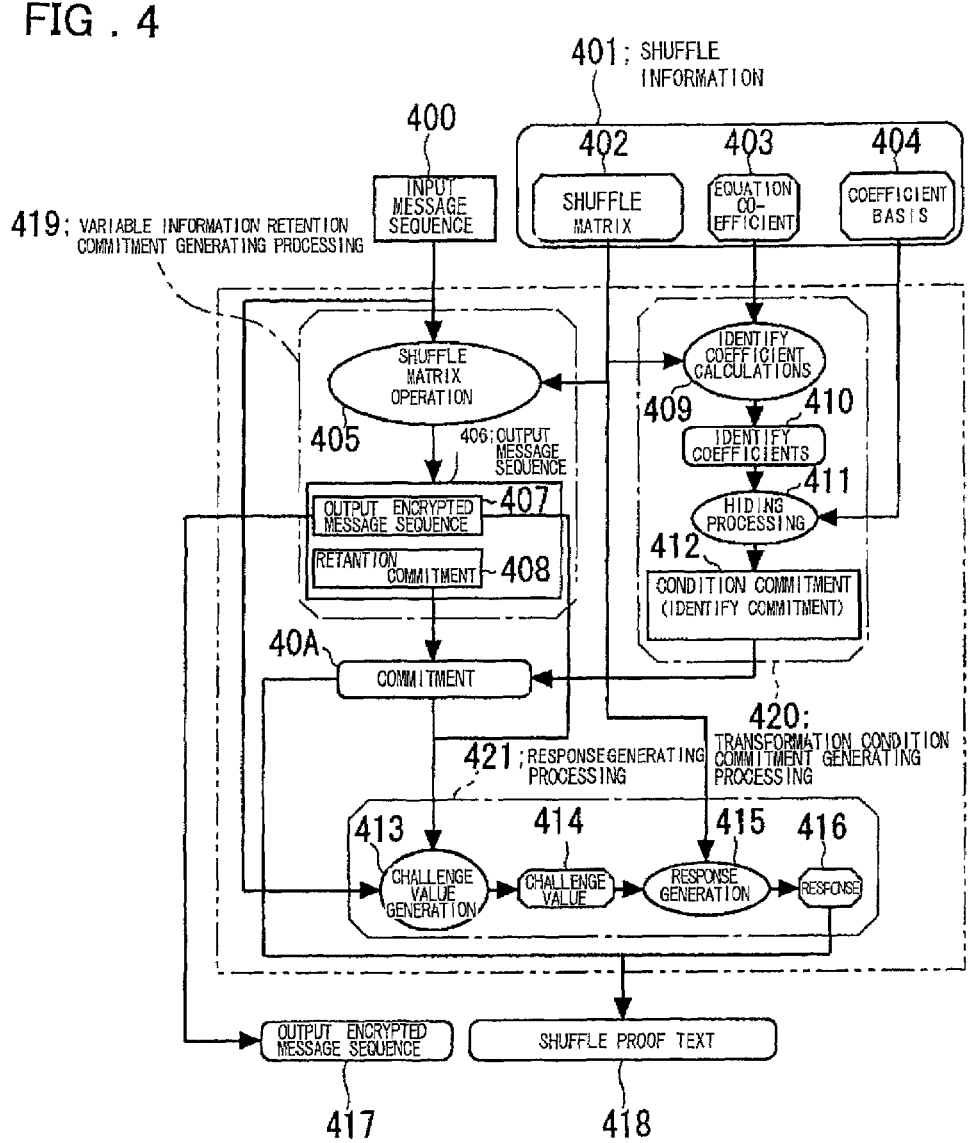
FIG. 4 shows details of the device for shuffle with proof of Embodiment 1 of the present invention.
Figure 5:
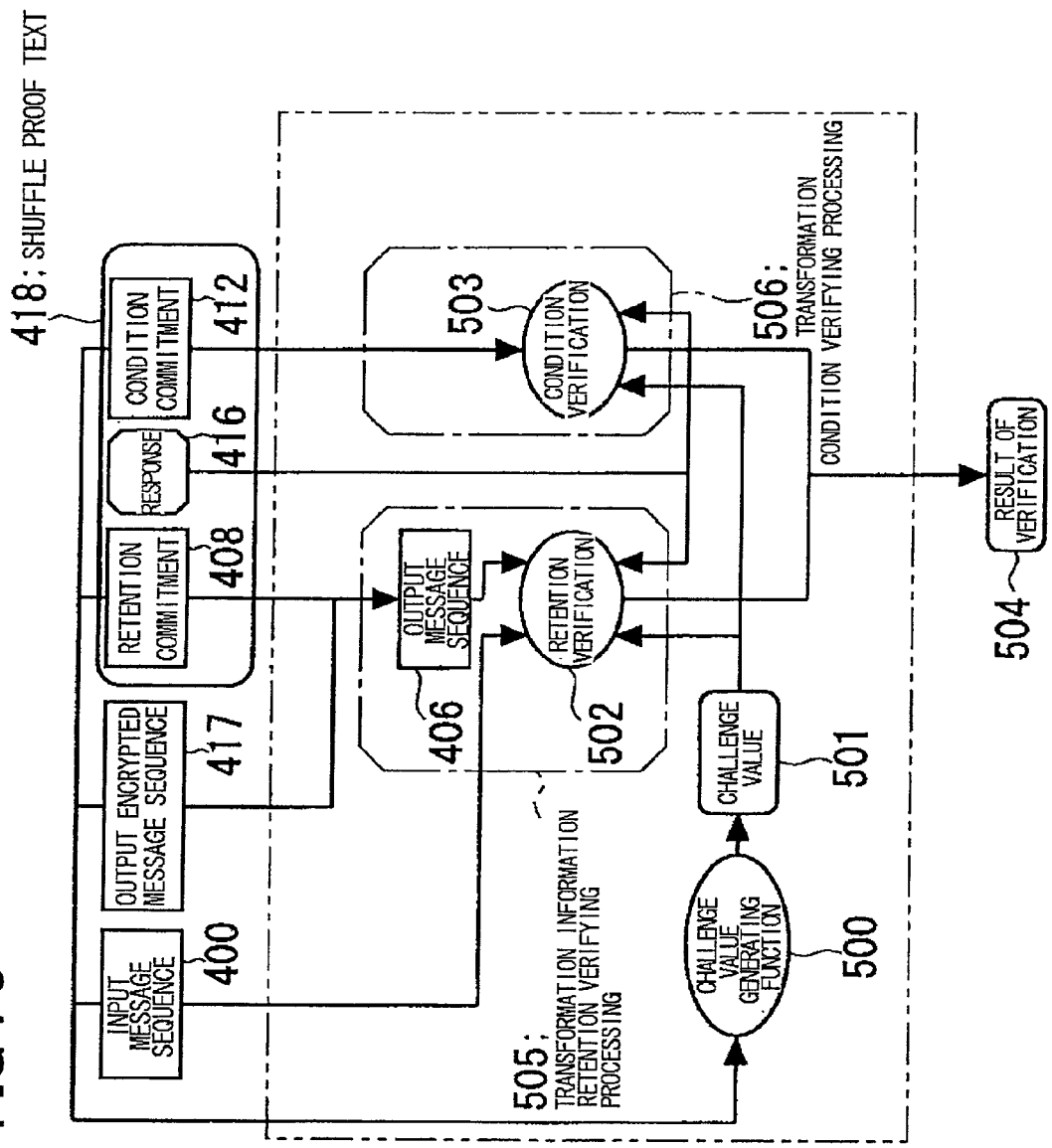
FIG. 5 shows details of the shuffle verifying device of Embodiment 1 of the present invention.

Referring to FIGS. 4 and 5, the shuffle method with proof, and a verification method, according to Embodiment 1 embodying the Present invention, are explained. Meanwhile, $\lceil$ is assumed to be 0, 1.

As the shuffle information 401, the permutation matrix 402, coefficient basis 404 and the generator coefficient 403 are prepared as follows:

As for the permutation matrix 402, numbers of 1 to n are arrayed in order. A Pseudo random number generator, not shown, is used n times to generate n sequences of numbers and an ith number of each number sequence is divided by n−i+1 to find a remainder which is set to $\pi'(i)$.

It is noted that i is in the order from 1 to n, with the $\pi'(i)$ th number counted from the lower side of the number sequence being set to $\pi(i)$. The operation of removing this number from the number sequence is executed to determine $\pi(i); i=1, \ldots, n$. The ith row of the shuffle matrix is 1 only for the component of the $\pi(i)$ column with the remaining values being 0. In this manner, the permutation matrix is generated.

The components of the shuffle matrix other than the permutation matrix are generated as follows: First, 2n+1 numbers on $F_q$ are generated by the pseudo random number generator and allocated to $A[i, 0], A[0, j], A[0, 0]$; i, $j=1, \ldots, n$. The above numbers are combined to a shuffle matrix.

As for the generation of the coefficient basis 404 v, generator coefficient 403 r'[0], numbers on $F_q$ other than 1, 0 are generated by a pseudo random number generator and set as r'[0]. By the pseudo random number generator, generators of $/F^*_p$ are generated and are raised to the power of k on $F^*_p$ to select numbers other than 1, 0, to generate generators of $F^*_p$ having the number of orders q. These generators are set to v.

From $$r'[0] \in_R F_q, \neq 0, 1$$

$$v \in_R F^*_p, \neq 1, \text{ s.t. } v^q = 1/F^*_p$$

and from the input encrypted message sequence $\eta[i, 0], \eta[i, 1]; i=1, \ldots, n$, and the public key $\eta[0,0], \eta[0, 1]$, an input message sequence 400

$$g[\mu, \lceil\ ]; \mu=0, \ldots, n; \lceil=0, 1 \text{ is set to:}$$

$$g[0, \lceil\ ] = \eta[0, \lceil\ ] \lceil=0, 1$$

$$g[i, \lceil\ ] = \eta[i, \lceil\ ], [\lceil/F^*_p i=1, \ldots, n, \lceil=0, 1.$$

In the following, the shuffle method with proof is used.

By a shuffle matrix operation 405 in the transformation information retention commitment generating processing 419, the shuffle matrix 402 is caused to act on the input message sequence 400 in the following manner to generate an output message sequence 406 $g''[\mu, \lceil\ ]; \mu=0, \ldots, n; \lceil=0, 1$, by $$g''[\mu, \lceil\ ] = \prod_{\nu=0}^{n} g[\nu, \lceil\ ]^{A[\nu, \mu]}/F^*_p \mu=0, \ldots, n, \lceil=0, 1.$$

It is noted that $g''[i, \lceil\ ]; i=1, \ldots, n; \lceil=0, 1$ is an output encrypted message sequence, and $g''[0, \lceil\ ]; \lceil=0, 1$ is the transformation information retention commitment 408.

By the identity coefficient calculation 409 in the transformation information retention commitment generating processing 420, an identity coefficients 410 $\phi[\mu]$, r'[0] is generated, using the generator (element) coefficient 403 r'[0] and a shuffle matrix 402, to $r'[0]=r'[0]$ $\phi[0]=\Sigma_{j=1}{}^n A[j, 0]A[j, 0]+r'[0]A[0, 0]/F_q$ $\phi[i]=2\Sigma_{j=1}{}^n A[j, 0]A[j, i]+r'[0]A[0, i]/F_q i=1, \ldots, n.$ Using the coefficient basis 404 v, the identity coefficient 410 $r'[0]$, $\phi[0]$ are committed to $v^1 = v'^{[0]}/F^*_p$ $\omega = v^{\phi[0]}/F^*_p$ by the hiding processing 411. $\phi[i], \ldots$ might be hidden as $v^\wedge\phi[i], \ldots$ also.

By the above, $\phi[i]$, $\omega$, $v^1$, v constitute the transformation condition commitment 412.

Here, the commitment 40 A is the transformation information retention commitment 408 and the transformation condition commitment 412.

By the response generating processing 421, the aforementioned input message sequence 400, output encrypted message sequence 417 and the commitment 409 are arguments of the challenge value generating function 413 to generate a challenge value 414 as $c[0]=1,$ $c[i]=\text{Hash}[i](g[v, 0], g[v, 1], g''[v, 0], g''[v, 1], v, \phi[v], \omega, v'; v=0, \ldots, n)i=1, \ldots, n$ from which a response 416 is generated at 415 as $r[\mu]=\Sigma_{v=0}{}^n A[\mu, v]c[v]/F_q \mu=0, \ldots, n$ using shuffle matrix 02.

The above commitment 40 A and the response 416 are output as a shuffle proof 418 to output an output encrypted message sequence 417 as a result of the shuffle.

The verifying method is explained with reference to FIG. 5.

By the shuffle verifying method, an input message sequence 400 $g[\mu, []; \mu=0, \ldots, n; \lceil=0, 1,$ an output encrypted message sequence 417 $g''[i, []; i=1, \ldots, n; \lceil=0, 1,$ a transformation information retention commitment 408 $g''[0, []; \lceil=0, 1$ which is a commitment 409 in the shuffle proof message 418, and a transformation condition commitment 412 $\phi[v]$, $\omega$, v', v; $v=0, \ldots, n; \lceil=0, 1$ are substituted into a challenge value generating function 500 to generate a challenge value 501 as $c[0]=1$ $c[i]=\text{Hash}[i](g[v, []], g''[v, []], \phi[v], \omega, v', v; v=0, \ldots, n; \lceil=0, 1)i=1, \ldots, n.$ By the transformation information retention verifying processing 505, it is verified 502 that the verifying equation $\prod_{\mu=0}{}^n g[\mu, []^{r[\mu]} = \prod_{\mu=0}{}^n g''[\mu, []^{c[\mu]}/F^*_p \lceil=0, 1$ holds using this challenge value 501, input message sequence 400, transformation information retention commitment 408, an output message sequence 406 which is the output encrypted message sequence 417, and the response 416.

By the transformation condition verifying processing 506, it is verified 503 that, using the challenge value 501, response 416 and the transformation condition commitment 412, the verifying equation $v^{r[0]}v^{\wedge\{\Sigma_{i=1}{}^n r[i]r[i]\}} = \omega v^{\wedge\{\Sigma_{i=1}{}^n (c[i]c[i]+\phi[i]c[i])\}}/F^*_p$ holds.

If the above verifying equations hold in their entirety, the proof message is accepted 504.

The above-described shuffle method with proof has the effect of assuring that the shuffle matrix transformation for the input message sequence has been carried out by a shuffle matrix at least having the "permutation matrix" belonging to the orthonormal matrix.

On the input encrypted message and on the output encrypted message, there are imposed limitations, so that, if this effect is able to assure the authenticity of the shuffle, the preferred embodiment is able to construct the shuffle with proof.

It is assumed, for example, that the input encrypted message has been proved to have been selected from a limited number of candidates, and that these candidates cannot be expressed using others as basis. If, after shuffle and decoding of the input encrypted message, any (or each) decoded message has been selected from correct candidates, it may be said from the proof message of the present embodiment that the shuffle is authenticated.

Meanwhile, the processing and the function of the transformation information retention commitment 419, transformation condition commitment processing 420 and the response generating processing 421 are realized by a program executed on a computer. The transformation information retention verifying processing 505, transformation condition verifying processing 506 in FIG. 5 are realized by the program executed on a computer. In this case, the present invention can be executed by loading the program on a main memory of the computer from the recording medium which has recorded the program, such as CD-ROM, DVD (digital versatile disc), floppy disk medium, a hard disk medium, magnetic tape medium or a semiconductor memory etc.

EMBODIMENT 2

Figure 6:
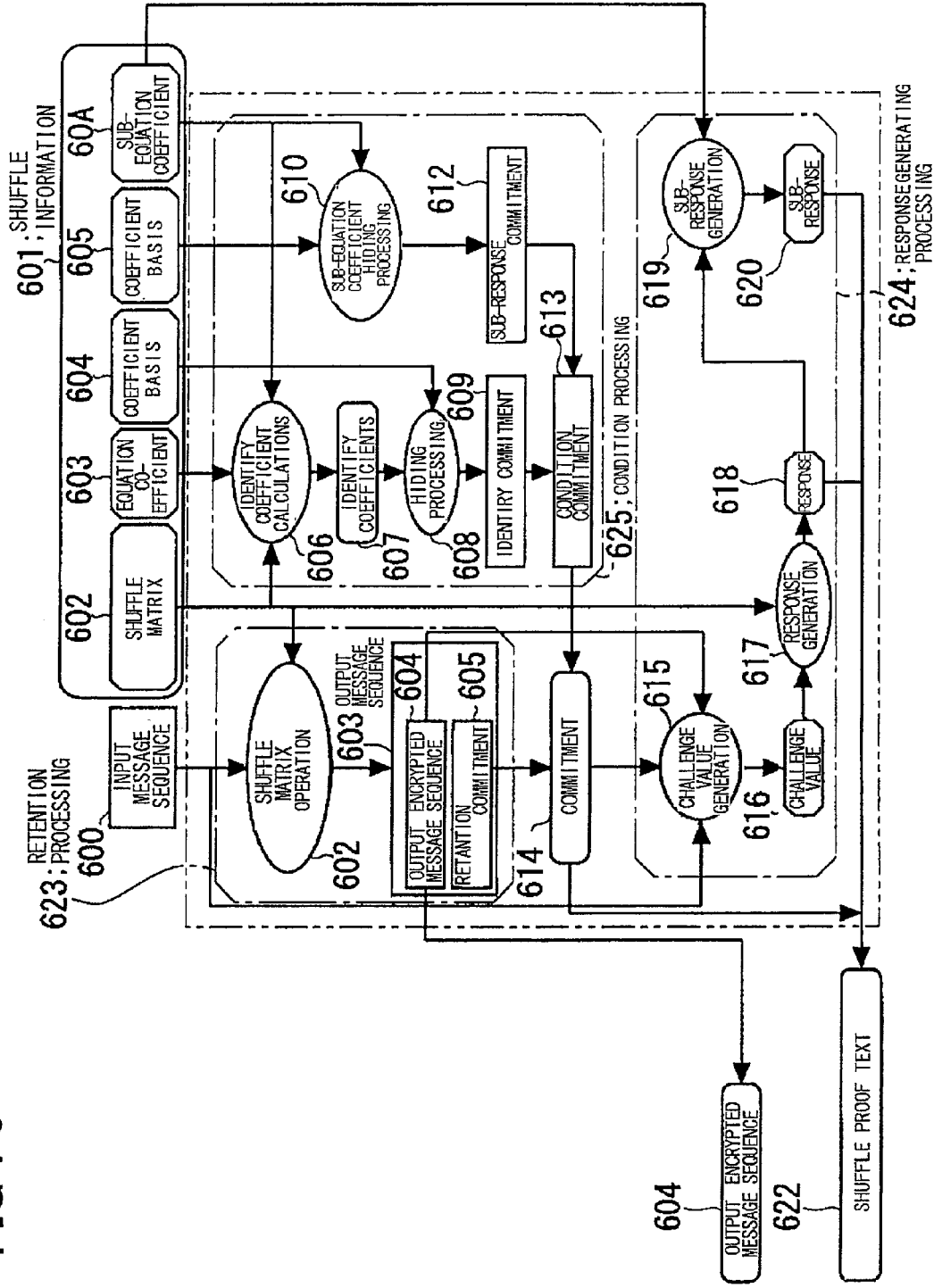
FIG. 6 shows details of the device for shuffle with proof of Embodiment 2 of the present invention.
Figure 7:
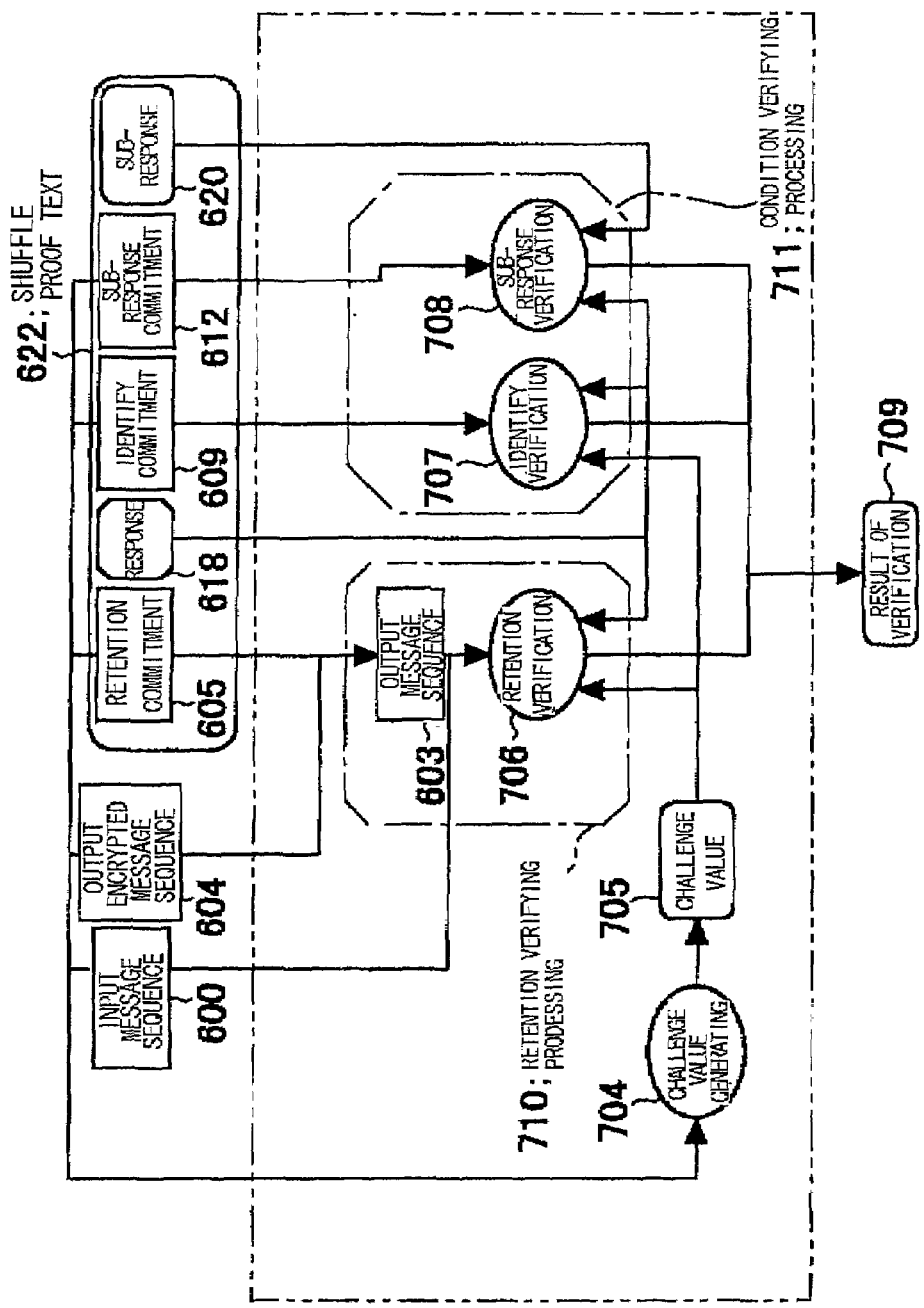
FIG. 7 shows details of the shuffle verifying device of Embodiment 2 of the present invention.

Referring to FIGS. 6 and 7, the shuffle method with proof and the verifying method therefor according to Embodiment (2) of the present invention are explained. In the following, it is assumed that $\lceil=0, 1$.

As the shuffle information 601, the shuffle matrix 602, element coefficients 603, coefficient basis 604, 605 and sub-equation coefficient 606 are prepared as follows:

As for the shuffle matrix 602, it is generated in the same way as in the Embodiment (1) described above.

As for the element coefficient 603 $\rho'$, $\rho''$, coefficient basis 604 v, coefficient basis 605 v, sub-equation coefficient 606, $\lambda[\mu]; \mu=0, \ldots, n$, a number other than 1, 0 on $F_q$ is generated for $\rho'$, $\rho''\lambda[\mu]; \mu=0, \ldots, n$. while an element of $F_p$ of an order number q is generated for the coefficient basis u, v:

$\rho' \in_R F_q, \neq 0, 1$ $\rho'' \in_R F_q, \neq 0, 1$ $v \in_R F^*_p, \neq 1, s.t.\ v^q=1/F^*_p$ $\lambda[\mu] \in_R F_q, \neq 0, 1, \mu=0, \ldots, n$ $u \in_R F^*_p \neq 1, s.t.\ u^q=1/F^*_p$ From the input encrypted message sequence and from the public key, an input message sequence 600 $g[\mu[]; \mu=0, \ldots, n; \lceil=0, 1$ are generated in the same way as in Embodiment (1).

In the following, the shuffle method with proof is used.

The transformation information retention commitment processing 623 is performed, as in Embodiment (1), to generate an output message sequence 603 g"[$\mu$, []; $\mu$=0, ..., n; [=0, 1, where g"[i, []; i=1, ..., n; [=0, 1 is an output encrypted message sequence 604, and g"[0, []; [=0, 1 is a transformation information retention commitment 605.

By the identity coefficient computation in the transformation condition commitment generating processing 625, the element coefficient 603 $\rho'$, $\rho''$ and the identity coefficient 607 $\psi[i]$, $\phi[i]$, $\phi[0]$, $\rho'$, $\rho''$; i=1, ..., n are generated as $$\rho' = \rho'$$

$$\rho'' = \rho''$$

$$\psi[i] = \Sigma_{j=1}^{n}(3A[j, 0] + \rho''\lambda[j])A[j, i]/F_q \, i=1, \ldots, n$$

$$\phi[i] = \Sigma_{j=1}^{n}(3A[j, 0]A[j, 0]A[j, i] + 2\rho''\lambda[j]A[j, 0]A[j, i]) + \rho'A[0, i]/F_q \, i=1, \ldots n$$

$$\phi[0] = \Sigma_{j=1}^{n}(A[j, 0]A[j, 0]A[j, 0] + \rho''\lambda[j]A[j, 0]A[j, 0]) + \rho''\lambda[0] + \rho'A[0, 0]/F_q$$

using the element coefficients 603 $\rho'$, $\rho''$ and the shuffle matrix 602.

Moreover, using the coefficient basis 604 v. the identity coefficient 607 $\rho'$, $\rho''$, $\phi[0]$ is committed 609 to $$\omega = v^{\phi[0]}/F^*_p$$

$$v'' = v^{\rho''}/F^*_p$$

$$v' = v^{\rho'}/F^*_p$$

by the hiding processing 608. $\phi[i]$, ... might be hidden as v^ $\phi[i]$, ... also. In addition, using the coefficient basis 605 u, the quasi-element coefficients 606 $\lambda[\mu]$; $\mu$=0, ..., n, are committed 612 to $$u[0] = u^{\lambda[0]}/F^*_p$$

$$u[i] = u^{\lambda[i]}/F^*_p \, i=1, \ldots, n.$$

From the foregoing, $\psi[i]$, $\phi[i]$, $\omega$, v", v', v, u, u[0], u[i]; i=1, ..., n, are the transformation condition commitment 613.

Here, the commitment 614 is set to transformation information retention commitment 605 and to transformation condition commitment 613.

By the response generating processing 624, the above input message sequence 600, output encrypted message sequence 604 and the commitment 614 are set as an argument of the challenge value generating function 615 to generate a challenge value 616 as $$c[0]=1$$

$$c[i]=\text{Hash}[i](g[v, [], g''[v, [], u, u[v], v, \phi[j], \psi[j], \omega, v', v''; [=0, 1, 2; v=0, \ldots, n; j=1, \ldots, n) i=1, \ldots, n$$

and, from this challenge value 616, the response 618 is generated 617 as $$r[\mu] = \Sigma_{v=0}^{n} A[\mu, v]c[v]/F_q \mu=0, \ldots, n$$

using th shuffle matrix 602.

Moreover, from the sub-equation coefficient 606 $\lambda[\mu]$; $\mu$=0, ..., n, and from the response 618, the sub-response 620 is generated 619 as $$r' = \lambda[0] + \Sigma_{i=1}^{n} \lambda[i]r[i]r[i]/F_q.$$

The commitment 614, response 618 and the sub-response 620 are output as the shuffle proof message 622 and, as a result of the shuffle, an output encrypted message sequence 604 is output. The verifying method is explained hereinafter with reference to FIGS. 6 and 7.

By the shuffle verifying method, the input message sequence 600 g[$\mu$, []; $\mu$=0, ..., n; [=0, 1, the output encrypted message sequence 604 g"[i, []; i=1, ..., n; [=0, 1, the transformation information retention commitment 605 as the commitment 614 in the shuffle proof message (text) 622 g"[0, []; [=0, 1 and the transformation condition commitment 609, 912 $\psi[i]$, $\phi[i]$, $\omega$, v", v', v, u, u[0], u[i]; i=1, ..., n are substituted into the challenge value generating function 704 to generate the challenge value 705 as $$c[0]=1$$

$$c[i]=\text{Hash}[i](g[v, [], g''[v, [], u, u[v], v, \phi[j], \psi[j], \omega, v', v''; [=0, 1, 2; v=0, \ldots, n; j=1, \ldots, n) i=1, \ldots, n.$$

By using this challenge value 705, input message sequence 600, transformation information retention commitment 605, output message sequence 603 as the output encrypted message sequence 604 and the response 618, it is verified 706, by the transformation information retention commitment processing 710, that the verification equation $$\Pi_{\mu=0}^{n} g[\mu, []^{r[\mu]} = \Pi_{\mu=0}^{n} g''[\mu, []^{c[\mu]}/F^*_p [=0, 1$$

holds.

Using the challenge value 705, response 618 and the transformation condition commitments 609, 612, it is verified 708 from the transformation condition verifying processing 711 that the verifying equation $$v''^{r'} v^{r[0]} v^{\{\Sigma_{i=1}^{n} r[i]r[i]r[i]\}} = \omega v^{\{\Sigma_{i=1}^{n} (c[i]c[i]c[i] + \psi[i]c[i]c[i] + \phi[i]c[i])\}}/F^*_p$$

and the verifying equation 707

$$u^{r'} = \Pi_{i=1}^{n} u[i]^{r[i]r[i]}/F^*_p$$

hold.

If all of the above verifying equations hold, the proof message is accented 709.

The above-described shuffle method with proof has the effect of assuring that the shuffle matrix transformation for the input message sequence has been carried out by the shuffle matrix having a "permutation matrix" at least belonging to the quasi-permutation matrix. At this time, the possibility that the output encrypted message sequence g"[i []; i=1, ..., n; [=0, 1 has output $$g''[j, 0] = g[i, 0]^{w[i]} g[0, 0]^{A[0, j]}/F^*_p$$

$$g''[j, 1] = g[i, 1]^{w[i]} g[0, 1]^{A[0, j]}/F^*_p$$

cannot be excluded. If w[i] is all 1, the shuffle holds. If w[i]; i=1, ..., n assumes one of the cubic roots of 1 on $F_q$.

If the degree of freedom equal to the cubic root power of 1 on $F_q$ is allowed as a decoded message, or if the symbol as set on the plain text is entered to cancel the degree of freedom of the cubic root power, the shuffle with proof can be established by this embodiment.

Meanwhile, the processing and the function of the transformation information retention commitment processing 623, the transformation condition commitment generating processing 625 and the response generating processing 624 of the shuffle device with proof are realized by a program executed on the computer. Also, the processing and the function of the transformation information retention verifying processing 710 and the transformation condition verifying processing 711 of the shuffle device with proof are realized by a program executed on the computer. In this case the present invention can be executed by loading the program to the main memory of the computer from a recording medium having recorded the program, such as a CD-ROM, DVD (digital versatile disc), floppy disc, magnetic tape medium or a semiconductor memory, and by executing the so-loaded program.

EMBODIMENT 3

Figure 8:
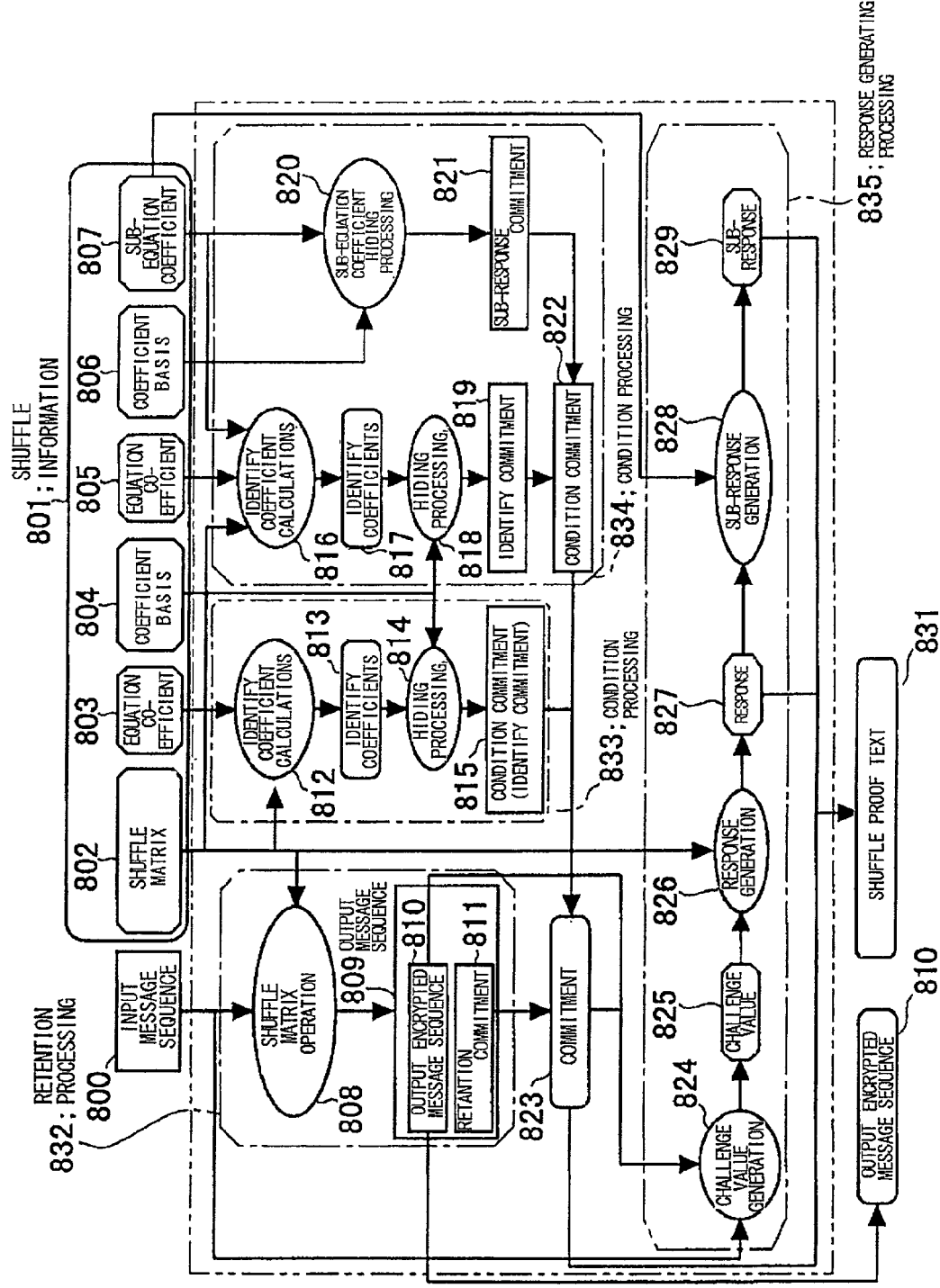
FIG. 8 shows details of the device for shuffle with proof of Embodiment 3 of the present invention.
Figure 9:
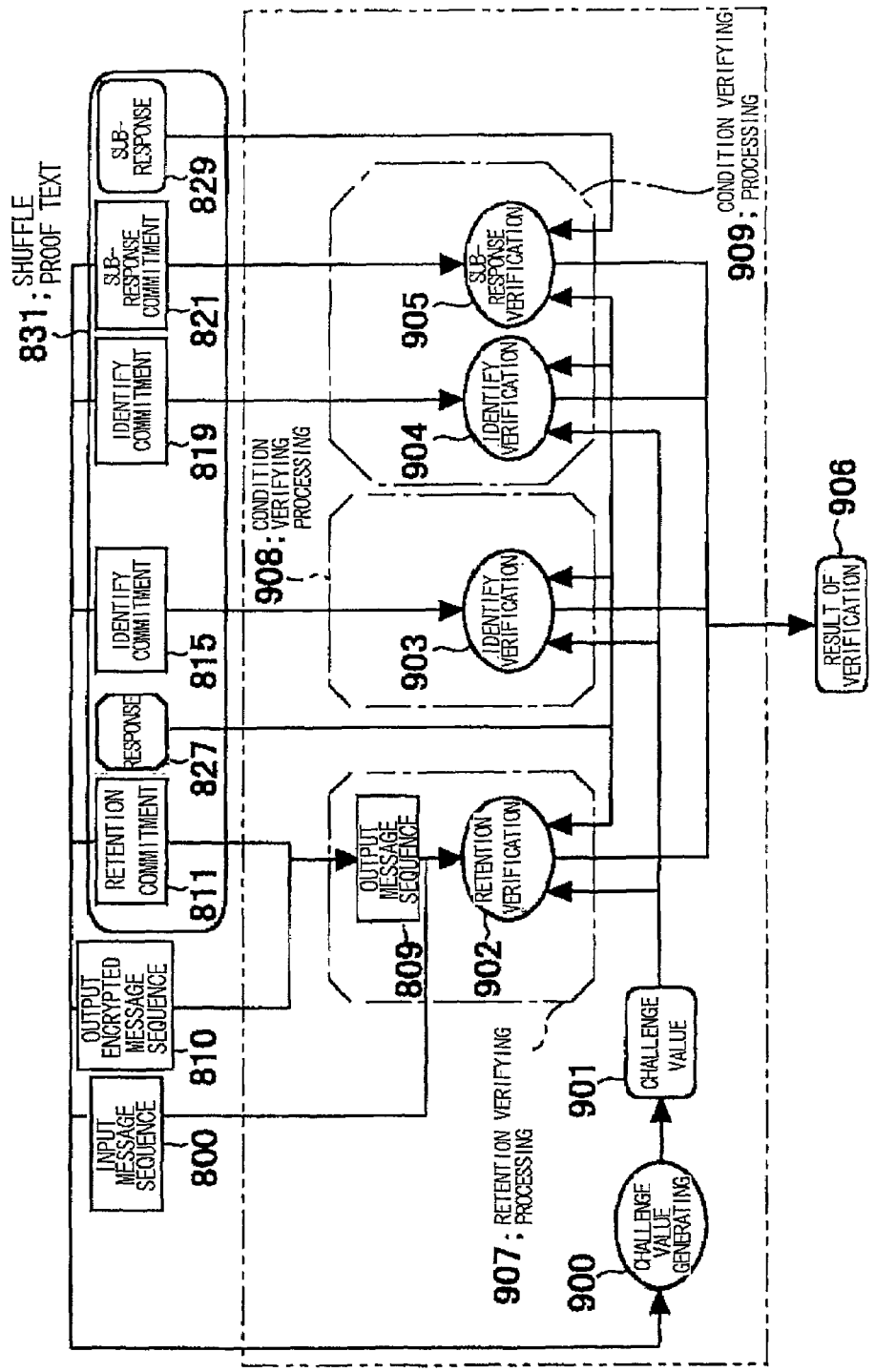
FIG. 9 shows details of the shuffle verifying device of the Embodiment 3 of the present invention.

As an Embodiment (3) of the present invention, the shuffle method with proof and the corresponding verifying method are explained with reference to FIGS. 8 and 9. It is assumed that $\lceil=0, 1$, and that there are two sets of the public keys, namely $\eta[-1, \lceil], \eta[0, \lceil]; \lceil=0, 1$, both having the same secret key.

As the shuffle information 801, the shuffle matrix 802, element coefficients 803, 805, coefficient basis 804, 806 and the sub-equation coefficient 807 are prepared as follows:

The shuffle matrix, used in the preferred embodiment, differs in size from those of the Embodiment (1) and (2), and is a n+2 rows by n+1 column matrix.

The permutation matrix, constituting this shuffle matrix 802, is A[i, j]; i, j=1, . . . , n, with the re-encryption secret random number being 2×n components of A[−1, j], A[0, j]; j=1, . . . , n, with the knowledge hiding factor being n+2 components of A[μ, 0]; μ=−1, . . . , n. These components are generated in a similar manner to Embodiment (1).

As for the element function 803 r'[−1], r'[0], element coefficients 805 ρ, ρ', ρ", coefficient basis 804 v, coefficient basis 806 u, sub-equation coefficient 807 $\lambda[\mu]$; μ=0, . . . ,n, a number on $F_q$ other than 1, 0 is generated for r'[−1], r'[0], ρ, ρ', ρ", $\lambda[\mu]$; μ=0, . . . , n, whilst an element of $F^*_p$ of the number of orders q is generated for the coefficient basis u, v, by the technique similar to that of Embodiment (1).

$$r'[-1] \in_R F_q, \neq 0, 1$$

$$r'[0], \in_R F_q, \neq 0, 1$$

$$\rho \in_R F_q, \neq 0, 1$$

$$\rho' \in_R F_q, \neq 0, 1$$

$$\rho'' \in_R F_q, \neq 0, 1$$

$$v \in_R F^*_p, \neq 0, 1, s.t. \ v^q = 1/F^*_p$$

$$\lambda[\mu] \in_R F_q, \neq 0, 1 \mu = 0, \ldots, n$$

$$u \in_R F^*_p, \neq 0, 1, s.t. \ u^q = 1/F^*_p$$

From the input message sequence $\eta[i, 0], \eta[i, 1]$; i=1, . . . , n and the public key $\eta[-1, \lceil], \eta[0, \lceil]; \lceil=0, 1$, the input message sequence 800 $g[\mu, \lceil]; \mu=-1, \ldots, n; \lceil=0, 1$ is set to $$g[-1, \lceil] = \eta[-1, \lceil]\lceil=0, 1$$

$$g[0, \lceil] = \eta[0, \lceil]\lceil=0, 1$$

$$g[i, \lceil] = \eta[i, \lceil]/F^*_p i=1, \ldots, n, \lceil=0, 1$$

In the following, the shuffle method with proof is used.

By the shuffle matrix operation in the transformation information retention commitment generating processing 832, the shuffle matrix 802 is made to act on the input message sequence 800 as now explained to generate an output message sequence 809 $g''[\mu, \lceil]; \mu=0, \ldots, n; \lceil=0, 1$ as $$g''[\mu, \lceil] = \prod_{v=-1}^{n} g[v, \lceil]^{A[v, \mu]}/F^*_p \mu = 0, \ldots, n, \lceil=0, 1$$

where g"[i, $\lceil$]; i=1, . . . , n; $\lceil=0, 1$ is the output encrypted message sequences 810, and g"[0, $\lceil$]; $\lceil=0, 1$ is the transformation information retention commitment 811.

By the identity coefficient computation 812, 816 in the transformation condition commitment generating processing 833, 834, the identity coefficients 817 $\psi[i], \phi[i], \phi[0], \rho, \rho', \rho''$; i=1, . . . , n and the identity coefficients 813 $\phi[v], r'[0], r'[-1]; v=0, \ldots, n$ are computed 818, 812, using the element coefficients 803, 805 r'[−1], r'[0], ρ, ρ', ρ" and the shuffle matrix 802:

$$\rho = \rho$$

$$\rho' = \rho'$$

$$\rho'' = \rho''$$

$$\psi[i] = \sum_{j=1}^{n}(3A[j, 0] + \rho''\lambda[j])A[j, i]/F_q i=1, \ldots, n$$

$$\phi[i] = \sum_{j=1}^{n}(3A[j, 0]A[j, 0]A[j, i] + 2\rho''\lambda[j]A[j, 0]A[j, i]) + \rho'A[0, i] + \rho A[-1, i]/F_q i=1, \ldots, n$$

$$\phi[0] = \sum_{j=1}^{n}(A[j, 0]A[j, 0]A[j, 0] + \rho''\lambda[j]A[j, 0]A[j, 0]) + \rho''\lambda[0] + \rho'A[0, 0] + \rho A[-1, 0]/F_q$$

$$r'[-1] = r'[-1]$$

$$r'[0] = r'[0]$$

$$\Phi[0] = \sum_{j=1}^{n} A[j, 0]A[j, 0] + r'[0]A[0, 0] + r'[-1]A[-1, 0]/F_q$$

$$\Phi[i] = 2\sum_{j=1}^{n} A[j, 0]A[j, i] + r'[0]A[0, i] + r'[-1]A[-1, i]/F_q i=1, \ldots, n$$

Moreover, using the coefficient basis 804 v, the identity coefficients 813, 817 r'[−1], r'[0], $\Phi[0], \phi[0], \rho, \rho', \rho''$ are committed 819, by the hiding Processing 814, 818, to $$\omega = v^{\phi[0]}/F^*_p$$

$$v'' = v^{\rho''}/F^*_p$$

$$v' = v^{\rho'}/F^*_p$$

$$\omega' = v^\rho/F^*_p$$

$\Phi[i], \ldots \phi[i], \ldots$ might be hidden as $v^{\hat{}} \phi[i], \ldots v^{\hat{}} \Phi[i], \ldots$ also and committed 815 to $$V = v^{r'[-1]}/F^*_p$$

$$V' = v^{r'[0]}/F^*_p$$

$$\Omega = v^{\phi[0]}/F^*_p.$$

Moreover, using the coefficient basis 806 u, the sub-equation coefficient 807 $\lambda[\mu]; \mu=0, \ldots, n$ is committed 821, 820 to $$u[0] = u^{\lambda[0]}/F^*_p$$

$$u[i] = u^{\lambda[i]}/F^*_p i=1, \ldots n.$$

From the foregoing, $\Phi[i], V', V, \Omega, \psi[i], \phi[i], \omega, v'', v', \omega', v, u, u[0], u[i]; i=1, \ldots, n$ is to be the transformation condition commitment 822.

The commitment 823 is to be the transformation information retention commitment 811 and the transformation condition commitment 822.

By the response generating processing 835, with the input message sequence 800, output encrypted message sequences 810 and the commitment 823 as the argument of the challenge value generating function 824, the challenge value 825 is generated as $$c[0]=1$$

$$c[i]=\text{Hash }[i](g[\mu, [], g''[\nu, [], u[\nu], u, \phi[j], \psi[j], \omega, \omega', \nu', \nu'', \nu, \Phi[j], \Omega, V', V; \mu=-1, \ldots, n; \nu=0, \ldots, n; j=1, \ldots n; \lceil=0, 1, 2) i=1, \ldots, n$$

and, from this challenge value 825, the response 827 is generated 826 as $$r[\mu]=\Sigma_{\nu=0}{}^n A[\mu, \nu]c[\nu]/F_q\mu=1, \ldots, n$$

using the shuffle matrix 802.

By the sub-equation coefficient 807 $\lambda[\mu]$; $\mu=0, \ldots, n$ and by the response 827, the sub-response 829 is generated 828 as $$r'=\lambda[0]+\Sigma_{i=1}{}^n\lambda[i]r[i]r[i]r[i]/F_q.$$

The above commitment 823, response 827 and the sub-response 829 are output as the shuffle Proof message 831 and an output encrypted message sequences 810 is output as the result of the shuffle.

The verifying method is now explained with reference to FIG. 9.

By the shuffle verifying method, the input message sequence 800 g[$\mu$, []; $\mu=-1, \ldots, n$; $\lceil=0, 1$ an output encrypted message sequence 810 g''[i, []; i=1, \ldots, n; $\lceil=0$, 1 the transformation information retention commitment 811 g''[0, []; $\lceil=0, 1$ of the commitment 823 in the shuffle proof message 831 and the transformation condition commitments 815, 819, 821 $\Phi[i]$, V', V, $\Omega$, $\psi[i]$, $\phi[i]$, $\omega$, v'', v', $\omega'$, v, u, u[0], u[i]; i=1, \ldots, n are substituted into a challenge value generating function 900 to generate the challenge value 901 as $$c[0]=1$$

$$c[i]=\text{Hash }[i](g[\mu, [], g''[\nu, [], u[\nu], u, \phi[j], \psi[j], \omega, \omega', \nu', \nu'', \nu, \Phi[j], \Omega, V', V; \mu=-1, \ldots, n; \nu=0, \ldots, n; j=1, \ldots, n; \lceil=0, 1, 2)i=1, \ldots n.$$

By the transformation information retention verifying processing 907, it is verified 902 that the verifying equation $$\Pi_{\mu=-1}{}^n g[\mu, []^{r[\mu]}=\Pi_{\mu=0}{}^n g''[\mu, []^{c[\mu]}/F^*_p \lceil=0, 1$$

holds, by employing the challenge value 901, using the input message sequence 800, transformation information retention commitment 811, an output message sequence 809 as an output encrypted message sequences 810, and the response 827.

By the transformation condition verifying processing 908, 909, it is verified 904 that the verifying equation (identity)

$$v'''^{\prime}v^{r[0]}\omega^{r[-1]}v^{\wedge}\{\Sigma_{i=1}{}^n r[i]r[i]r[i]\}=\omega v^{\wedge}\{\Sigma_{i=1}{}^n (c[i]c[i]c[i]+\psi[i]c[i]c[i]+\phi[i]c[i])\}/F^*_p$$

holds, while it is verified 905 that the verifying equation $$u^{r'}=u[0]\Pi_{i=1}{}^n u[i]^{r[i]r[i]}/F^*_p$$

holds, and also it is verified 903 that the verifying equation $$V^{r[0]}V^{r[-1]}v^{\wedge}\{\Sigma_{i=1}{}^n r[i]r[i]\}=\Omega v^{\wedge}\{\Sigma_{i=1}{}^n (c[i]c[i]+\Phi[i]c[i])\}/F^*_p$$

holds, using the challenge value 901, response 827 sub-response 829 and the transformation condition commitments 815, 819 and 821.

If all of the above verifying equations hold, the proof text is accepted.

The above-described shuffle method with proof has the effect of assuring that the shuffle matrix transformation for the input message sequence has been carried out by the "permutation matrix", at least having the shuffle matrix belonging to the permutation matrix. This means that the shuffle has been carried out, with the present embodiment being the shuffle with proof.

Meanwhile, the processing and the function of the transformation information retention commitment processing 832, the transformation condition commitment generating processing 833, 834 and the response generating processing 835 of the shuffle device with proof are realized by a program executed on the computer. Also, the processing and the function of the transformation information retention verifying processing 907 and the transformation condition verifying processing 908, 909 of the shuffle device with proof are realized by a program executed on the computer. In this case the present invention can be executed by loading the program to the main memory of the computer from a recording medium having recorded the program, such as a CD-ROM, DVD (digital versatile disc), floppy disc, magnetic tape medium or a semiconductor memory, and by executing the so-loaded program.

EMBODIMENT 4

Figure 10:
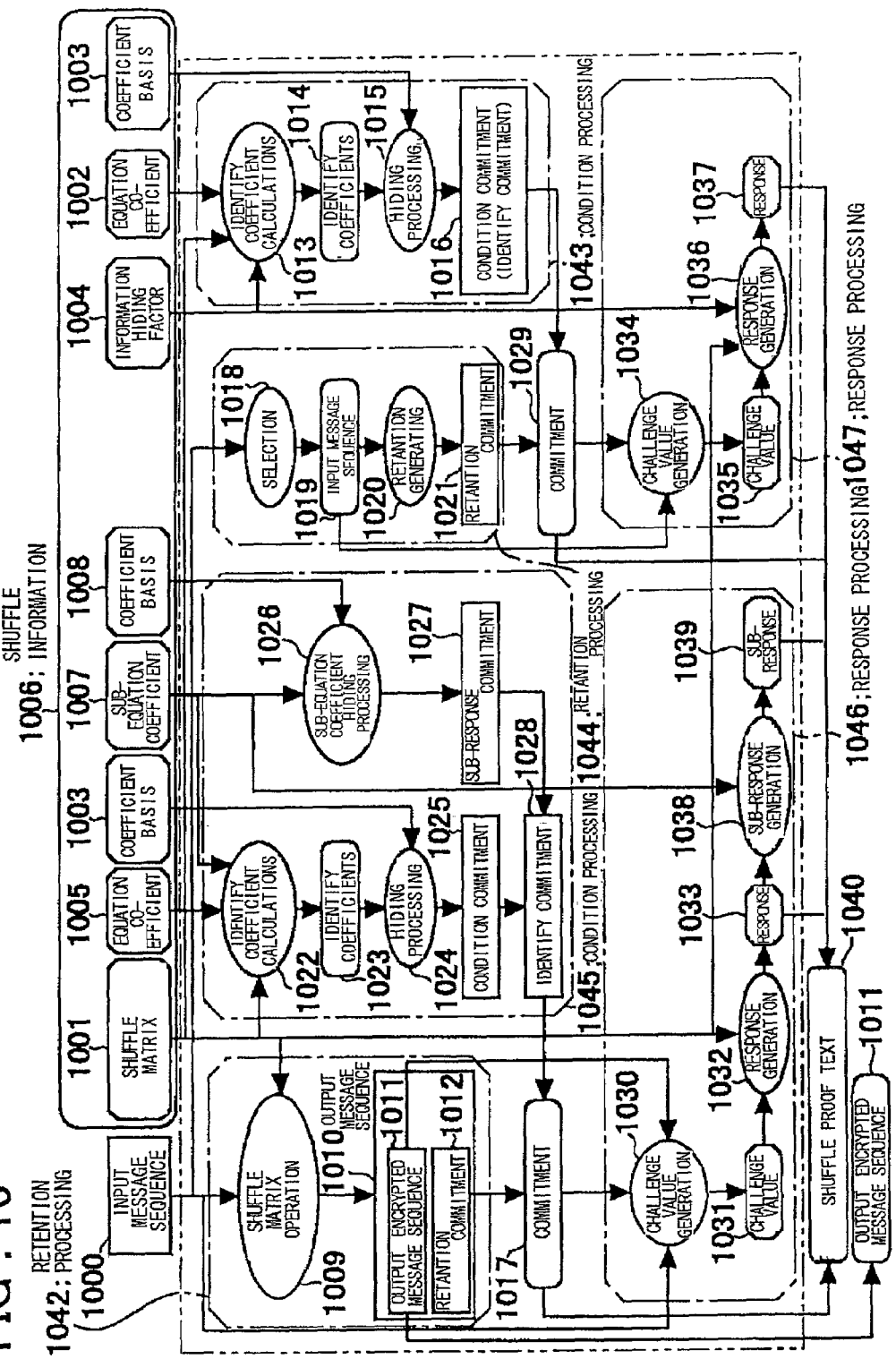
FIG. 10 shows details of the device for shuffle with proof of Embodiment 4 of the present invention.
Figure 11:
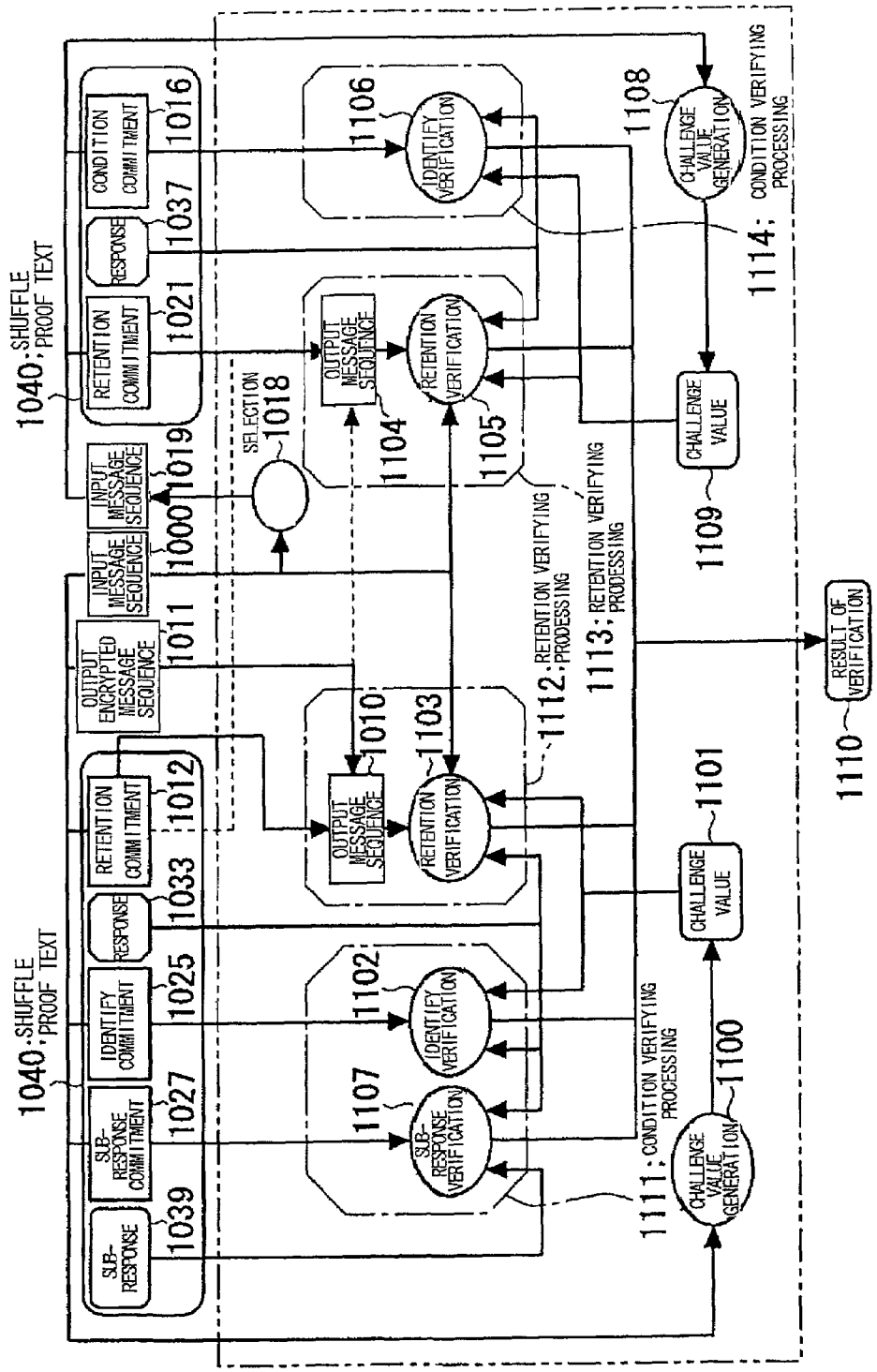
FIG. 11 shows details of the shuffle verifying device of the Embodiment 4 of the present invention.

Referring to FIGS. 10 and 11, the shuffle method with proof and the corresponding verifying method of Embodiment (4) of the present invention are now explained. In the following, it is assumed that $\lceil=0, 1$, while the public key is one set of $\eta[0, []; \lceil=0, 1$.

As the shuffle information 1006, the shuffle matrix 1001, a second information-hiding factor 1004, element coefficients 1002, 1005, coefficient basis 1003, 1008 and sub-equation coefficients 1007 are prepared as follows:

The shuffle matrix 1001 is generated as in Embodiment (1) described above and is represented by $A[\mu, \nu]$; $\mu, \nu=0, \ldots, n$.

The second information hiding factor 1004 $A[\nu, 0]$; $\nu=0, \ldots, n$ is generated in a similar manner.

As for the element coefficient 1005 $\rho'$, $\rho''$, element coefficient 1002 $r'[0]$, coefficient basis 1003 v, coefficient basis 1008 u, and a sub-equation coefficient 1007 $\lambda[\mu]$; $\mu=0, \ldots, n$, a number on $F_q$ other than 1, 0 is generated for $r'[0]$, $\rho'$, $\rho''$, $\lambda[\mu]$; $\mu=0, \ldots, n$ and an element on $F_p$ of a number of orders of q is generated for the coefficient basis u, v.

$$\rho' \in_R F_q, \neq 0, 1$$

$$\rho'' \in_R F_q, \neq 0, 1$$

$$r'[0], \in_R F_q, \neq 0, 1$$

$$v \in_R F^*_p, \neq 0, 1, \text{ s.t. } v^q=1/F^*_p$$

$$\lambda[\mu] \in_R F_q, \neq 0, 1\mu=0, \ldots, n$$

$$u \in_R F^*_p, \neq 0, 1, \text{ s.t. } u^q=1/F^*_p$$

From the input encrypted message sequence $\eta[i, 0]$, $\eta[i, 1]$; i=1, \ldots, n and the public key $\eta[0, []; \lceil=0, 1$, the input message sequence 1000 g[$\mu$[]; $\mu=0, \ldots, n$; $\lceil=0, 1$ is represented by $g[0, \lceil\,]=\eta[0, \lceil\,][0, 1$ $g[i, \lceil\,]=\eta[i, \lceil\,]i=1, \ldots, n, \lceil=0, 1.$ In the following, the shuffle method with proof is used.

By the shuffle matrix operation 1009 in the transformation information retention commitment generating processing 1042, the shuffle matrix 1001 is made to act on the input message sequence 1000 in the following manner to generate an output message sequence 1010 $g''[\mu, \lceil\,]; \mu=0, \ldots, n; \lceil=0, 1$ as $g''[\mu, \lceil\,]=\prod_{\nu=0}^{n} g[\nu, \lceil\,]^{A[\nu, \mu]}/F^*_p \mu=0, \ldots, n, \lceil=0, 1.$ Here, $g''[i, \lceil\,]; i=1, \ldots, n; \lceil=0, 1$ and the output message sequence 1011, $g''[0, \lceil\,]; \lceil=0, 1$ are set to the first transformation information retention commitment 1012.

By the second transformation information retention commitment generating processing 1044, selection is made 1018 from the input message sequence 1000 to represent the second input message sequence 1019 as $g[\mu, \lceil'\,]$. Here, $\lceil'=0$.

The second transformation information retention commitment 1021 $G''[0, \lceil'\,]$ is generated 1020 as $G''[0, \lceil'\,]=\prod_{\nu=0}^{n} g[\nu, \lceil'\,]^{B[\nu, 0]}/F^*_p \lceil=0 \text{ or } 1.$ By the identity coefficient calculations 1022 in the transformation condition commitment generating processing 1045, the identity coefficients 1023 $\psi[i], \phi[i], \phi[0], \rho', \rho''$; $i=1, \ldots, n$ is generated, using the element coefficient 1005 $\rho', \rho''$ and the shuffle matrix 1001, by $\rho'=\rho'$ $\rho''=\rho''$ $\psi[i]=\Sigma_{j=1}^{n}(3A[j, 0]+\rho''\lambda[j])A[j, i]/F_q i=1, \ldots, n$ $\phi[i]=\Sigma_{j=1}^{n}(3A[j, 0]A[j, 0]A[j, i]+2\rho''\lambda[j]A[j, 0]A[j, i])+\rho'A[0, i]/F_q i=1, \ldots, n$ $\phi[0]=\Sigma_{j=1}^{n}(A[j, 0]A[j, 0]A[j, 0]+\rho''\lambda[j]A[j, 0]A[j, 0])+\rho''\lambda[0]+\rho'A[0, 0]/F_q.$ Using the coefficient basis 1003 v, the identity coefficients 1023 $\phi[0], \rho', \rho''$ is committed 1025, by the hiding processing 1024, by $\omega=v^{\phi[0]}/F^*_p$ $v''=v^{\rho''}/F^*_p$ $v'=v^{\rho'}/F^*_p.$ $\phi[i], \ldots$ might be hidden as $v^\wedge \phi[i], \ldots$ also. Moreover, using the coefficient basis 1008 u, the sub-equation coefficients 1007 $\lambda[\mu]; \mu=0, \ldots, n$ are committed 1027 by $u[0]=u^{\lambda[0]}/F^*_p$ $u[i]=u^{\lambda[i]}/F^*_p i=1, \ldots, n.$ By the identity coefficient calculation 1013 in the transformation condition commitment generating processing 1043, and using the element coefficient 1002 r'[0], shuffle matrix 1001 and the second information hiding factor 1004, the identity coefficients 1014 $\Phi[\nu], r'[0]; \nu=0, \ldots, n$ are generated as $r'[0]=r'[0]$ $\Phi[0]=\Sigma_{j=1}^{n} B[j, 0]B[j, 0]+r'[0]B[0, 0]/F_q$ $\Phi[i]=2\Sigma_{j=1}^{n} B[j, 0]A[j, i]+r'[0]A[0, i]/F_q i=1, \ldots, n.$ Also, using the coefficient basis 1003 v, and by the hiding processing 1015, the identity coefficients 1014 r'[0], $\Phi[0]$ are committed 1016 by $V'=v^{r'[0]}/F^*_p$ $\Omega=v^{\Phi[0]}/F^*_p.$ $\Phi[i], \ldots$ might be hidden as $v^\wedge \Phi2[i], \ldots$ also. By the above, the first transformation condition commitment 1028 is expressed to $\psi[i], \Phi[i], \omega, v'', v', v, u, u[0], u[i]; i=1, \ldots, n$. The second transformation condition commitment 1016 is represented by $\Phi[i], V', \Omega, v; i=1, \ldots n.$ The first commitment 1017 is represented by the first transformation information retention commitment 1012 and the fist transformation condition commitment 1028, whilst the second commitment 1029 is represented as the second transformation information retention commitment 1021 and the second transformation condition commitment 1016.

By the response generating processing 1046, the first challenge value 1031 is generated as $c[0]=1$ $c[i]=\text{Hash}[i](g[\nu, \lceil\,], g''[\nu, \lceil\,], u[\nu], u, \phi[j], \psi[j], \omega, v', v'', v; \nu=0, \ldots, n; j=1, \ldots, n; \lceil=0, 1)i=1, \ldots, n,$ with the above input message sequence 1000, output encrypted message sequence 1011 and with the first commitment 1017 as an argument of a challenge value generating function 1030. From this challenge value 1031, and using the shuffle matrix 1001, the first response 1033 is generated 1033 is generated 1032 as $r[\mu]=\Sigma_{\nu=0}^{n} A[\mu, \nu]c[\nu]/F_q \mu=0, \ldots, n.$ The, the sub-response 1039 is generated 1038 as $r'=\lambda[0]+\Sigma_{i=1}^{n}\lambda[i]r[i]r[i]/F_q$ from the sub-equation coefficient 1007 $\lambda[\mu]; \mu=0, \ldots n$ and the response 1033.

By the response generating processing 1047, the second challenge value 1035 is generated as $C[0]=1$ $C[i]=\text{Hash}[i](g[\nu, \lceil'\,], G''[0, \lceil'\,], g''[j, \lceil'\,], \Phi[j], \Omega, V'; \nu=0, \ldots, n; j=1, \ldots, n; \lceil'=0)i=1, \ldots, n$ with the second input message sequence 1019, output encrypted message sequence 1011 and the second commitment 1029 and with the second challenge value 1035 as an argument of the challenge value generating function 1034. From this challenge value 1035, and using the shuffle matrix 1001 and the second information hiding factor 1004, the second response 1037 is generated 1036 as $R[\mu]=B[\mu, 0]+\Sigma_{i=1}^{n} A[\mu, i]C[i]/F_q \mu=0, \ldots n.$ The aforementioned commitments 1017 and 1029, the responses 1033, 1037 and the sub-response 1039 are output as shuffle proof 1040 to output an output encrypted message sequence 1011 as the result of the shuffle.

The verifying method is explained with reference to FIG. 11.

By the shuffle verifying method, the input message sequence 1000, output encrypted message sequence 1011 and the first commitments 1012, 1025 and 1027 of the shuffle proof message 1040 are substituted into the challenge value generating function 1100 to generate a first challenge value 1101 as $c[0]=1$ $c[i]$=Hash[i](input message sequence, output encrypted message sequence and first commitment), $i=1, \ldots, n$.

Then, a second input message sequence 1019, second commitments 1016, 1021 of the shuffle processing message 1040 and the output encrypted message sequence 1011 are substituted into the challenge value generating function 1108 to generate a second challenge value 1109 as $C[0]=1$ $C[i]$=Hash[i](second input message sequence, output encrypted message sequence and second commitment) $i=1, \ldots, n$.

By the transformation information retention verifying processing 1112, it is verified 1103 that the verifying equation $$\prod_{\mu=0}^{n} g[\mu, \lceil]^{r[\mu]} \prod_{\mu=0}^{n} g''[\mu, \lceil]^{c[\mu]}/F^*_p \lceil =0, 1$$

holds, using the first challenge value 1101, input message sequence 1000, first transformation information retention commitment 1012, output encrypted message sequence 1011 and the first response 1033.

By the transformation information retention verifying processing 1113, and using the second challenge value 1109, second input message sequence 1019, second transformation information retention commitment 1021, output encrypted message sequence 1011 and the second response 1037, it is certified 1105 that the second knowledge verifying equation $$\prod_{\mu=0}^{n} g[\mu, \lceil J^{R[\mu]} = G''[0, \lceil'] \prod_{i=1}^{n} g''[i, \lceil']^{C[i]}/F^*_p \lceil '=0$$

holds.

By the transformation condition verifying processing 1111 and using the first challenge value 1101, first response 1033 and the first transformation condition commitment 1025, it is verified that a verifying equation 1102

$$v'''^{r[0]} v^{\wedge}\{\Sigma_{i=1}^n r[i]r[i]r[i]\} = \omega v^{\wedge}\{\Sigma_{i=1}^n (c[i]c[i]c[i] + \psi[i]c[i]c[i] + \phi[i]c[i])\}/F^*_p,$$

sub-response 1039, sub-response commitment 1027, first response 1033 and the verifying equation 1107

$$u^{r'} = u[0] \prod_{i=1}^n u[i]^{r[i]r[i]}/F^*_p$$

hold.

By the transformation condition verifying processing 1114, second challenge value 1109, second response 1037 and the second transformation condition commitment 1016, it is verified that the verifying equation 1106

$$V^{r[0]} v^{\wedge}\{\Sigma_{i=1}^n R[i]R[i]\} = \Omega v^{\wedge}\{\Sigma_{i=1}^n (C[i]C[i] + \Phi[i]C[i])\}/F^*_p$$

holds.

If all of the above verifying equations hold, the proof message (text) is accepted 1110.

The above shuffle method with proof is effective in assuring that the shuffle matrix transformation for the input message sequence has been carried out by a "permutation matrix" having at least a shuffle matrix belonging to a permutation matrix. This means that the shuffle has been carried out. So, the present embodiment is a shuffle with proof.

Meanwhile, the processing and the function of the transformation information retention commitment processing 1042, transformation condition commitment generating processing 1043, 1045 and the response generating processing 1046, 1047 are realized by a program executed on a computer. Moreover, the processing and the function of the transformation information retention commitment processing 1112, 1113 and the transformation condition verifying processing 1111, 1114 of the shuffle verifying device are realized by a program executed on a computer. In this case, the present invention can be carried out by loading the program on a main memory of a computer from a recording medium having the program recorded thereon, such as a floppy disk medium, a hard disk medium, a magnetic tape medium or a semiconductor memory, and by executing the so-loaded program.

EMBODIMENT 5

Figure 12:
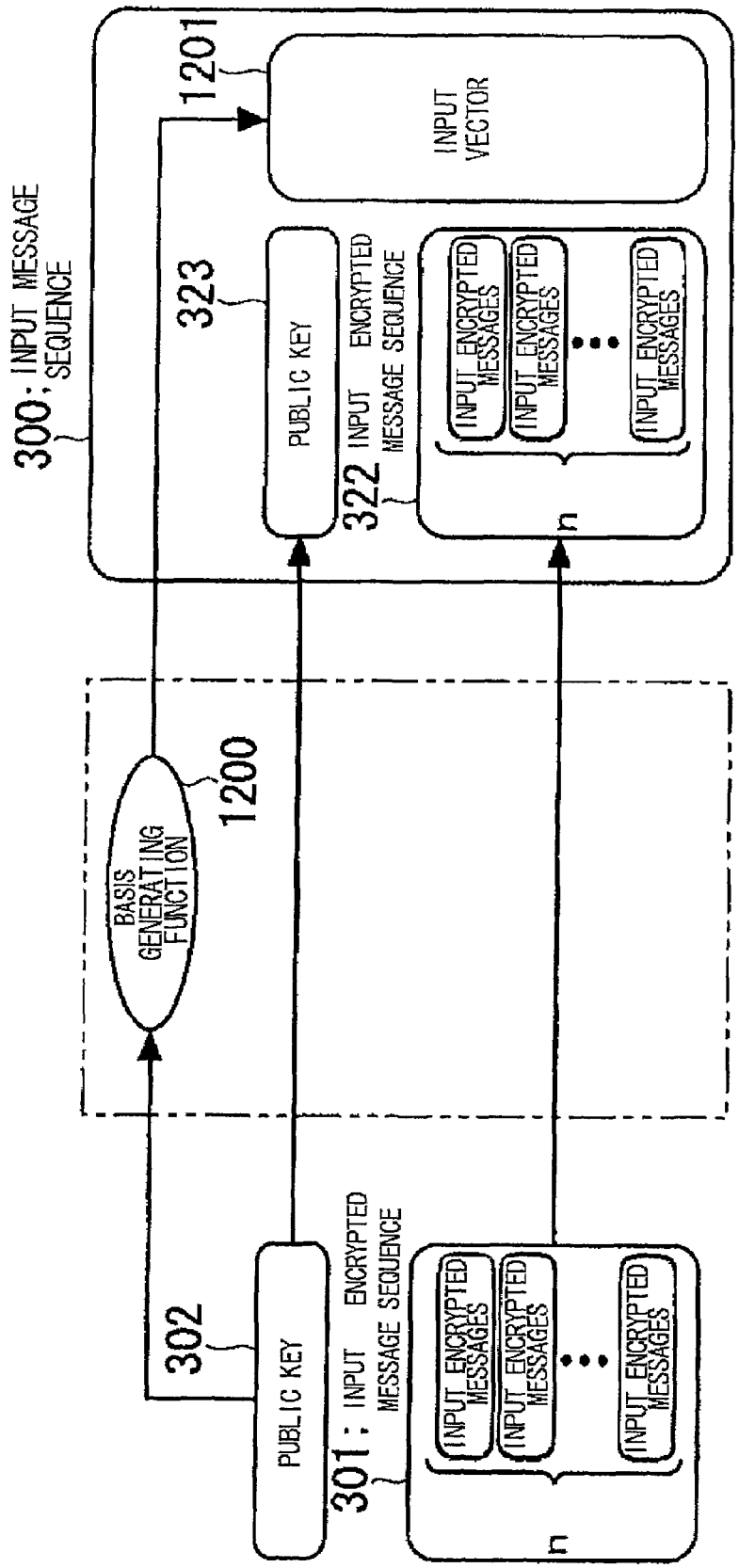
FIG. 12 shows details of an input message sequence-generating device of Embodiment 5 of the present invention.

The input message sequence generating method according to Embodiment (5) of the present invention is now explained by referring to FIG. 12. It is noted that $\lceil$ assumes the values of 0, 1 or 2.

The secret key x corresponding to the public key 302 g[0, 0] and g[0, 1] is owned in a distributed manner by t provers.

With the secret key $x[\hat{}]$; $\hat{} = 1, \ldots, t$, the public key of each prover is g[0, 0], g[0, 1, $\hat{}$]=g[0, 0]$^{x[\hat{}]}$; $\hat{}=1, \ldots, t$ and the entire public key is g[0,0], g[0, 1]=$\prod_{k=1}^{t} g[0, 1, \hat{}]$.

The input encrypted message sequence 301 η[i, 0], η[i, 1]; i=1, . . . , n and the public key 302 η[0, 0], η[0, 1] are input, an input vector 1201 is generated by the basis generating function 1200 by the public key 302 and the ElGamal domain parameters p, q, with respect to the basis generating function 1200, and the input message sequence 300 g[μ, $\lceil$]; μ=0, . . . , n; $\lceil$=0, 1, 2 is represented by g[0, $\lceil$]=η[0, $\lceil$][0, 1 g[i, $\lceil J$]=η[i, [J/F^*_p$i=1, \ldots, n, \lceil=0, 1$ g[μ, 2]=Hash'[μ](p, q, η[0, 0], g[0, 1, $\hat{}$]; $\hat{}=1, \ldots, t$) μ0, . . . n.

When the input message sequence generating method of the present embodiment is applied to Embodiments 1 to 4, the gamut of the value of $\lceil$ is all changed from 0, 1 to 0, 1, 2. The newly-introduced component of $\lceil$=2, which is neither an input message sequence nor a public key, represents a component of the input message sequence not envisaged by a person who produced an input message sequence, and acts for imposing limitations on the response that can be generated by the prover, thus preventing the person who prepared the input message sequence and the person who produced the shuffle proof message (text) from acting together in falsifying the re-encryption proof text.

When the input message sequence generating method of the present embodiment is to be applied to Embodiment 3, the input message sequence is expanded to g[−1, $\lceil$] to give g[−1, $\lceil$]=η[−1, $\lceil$][=0, 1 g[0, $\lceil$]=η[0, $\lceil$][=0, 1 g[i, $\lceil J$]=η[i, [J/F^*_p$i=1, \ldots, n, \lceil=0, 1$ g[μ, 2]=Hash '[μ](p, q, η[0, 0], g[0, 1, $\hat{}$]; $\hat{}=1, \ldots, t$) μ=−1, . . . , n from the public key g[−1, 0], g[−11], η[0, 0], η[0,1].

When the input message sequence generating method of the present embodiment is to be applied to Embodiment 4, $\lceil$'=2 and the second transformation information retention commitment is changed by the second information hiding factor to $$G''[02]=\Pi_{v=-1}{}^n g[v, 2]^{A'[v, 0]}/F^*_p$$

$$G''[i2]=\Pi_{v=-1}{}^n g[v, 2]^{A[v, i]}/F^*_p \; i=1, \ldots, n.$$

Moreover, in the shuffle method with proof or the shuffle verifying method, the second challenge value is changed to $$C[0]=1$$

$$C[i]=\text{Hash}[i](g[v, 2], G''[v, 2], \Phi[j], \Omega, V';\; v=0, \ldots, n; j=1, \ldots, n; \lceil=0, 1)i=1, \ldots, n$$

with the second input message sequence $g[\mu, \lceil']; \lceil=2$ and the second commitment as an argument of the challenge value generating function.

In addition, the second knowledge verifying equation in the transformation information retention verification processing is changed to $$\Pi_{\mu=0}{}^n g[\mu, 2]^{r[\mu]} = \Pi_{\mu=0}{}^n G''[\mu, \lceil']^{c[\mu]}/F^*_p.$$

EMBODIMENT 6

Figure 13:
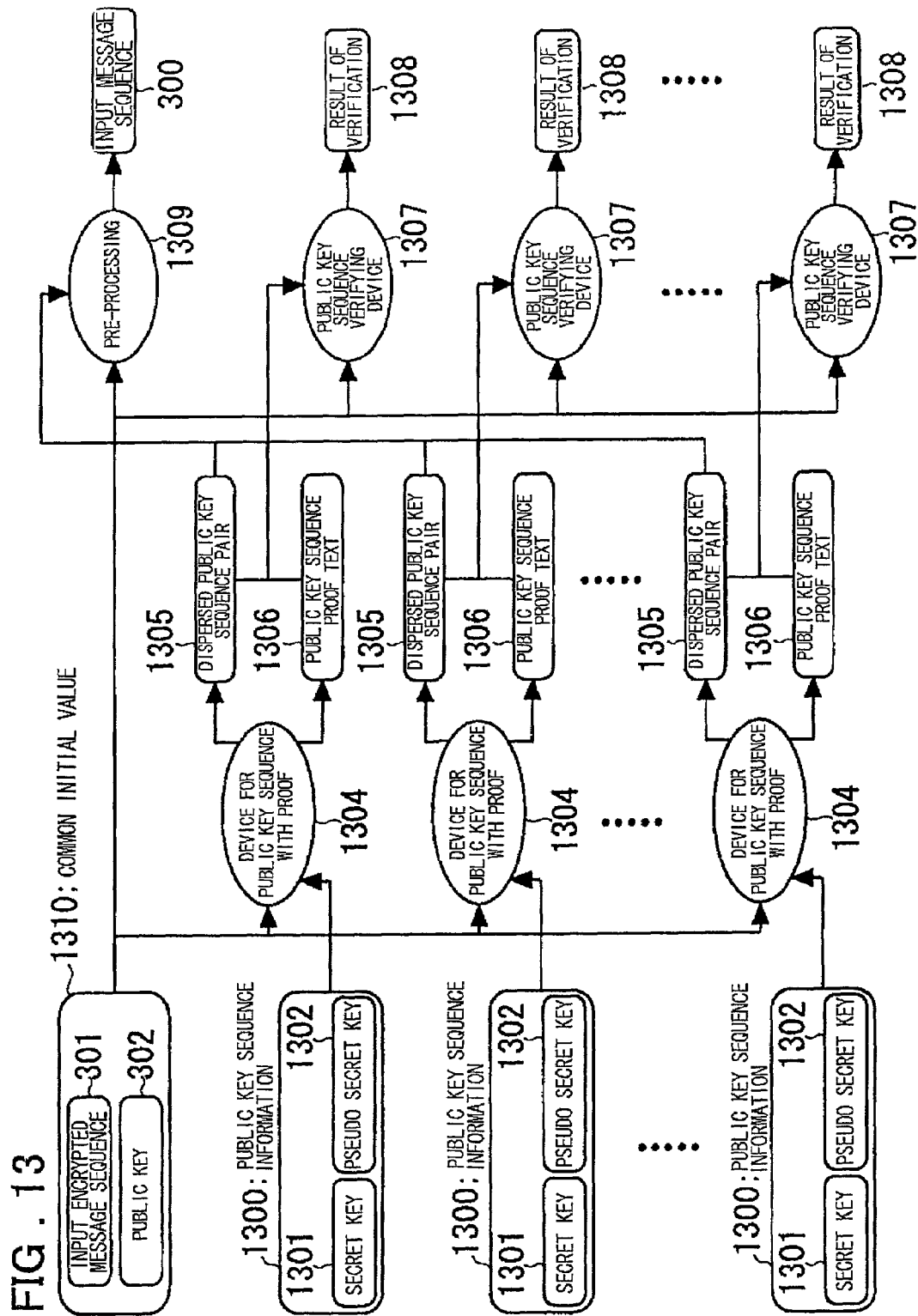
FIG. 13 shows details of an input message sequence-generating device of Embodiment 6 of the present invention.
Figure 14:
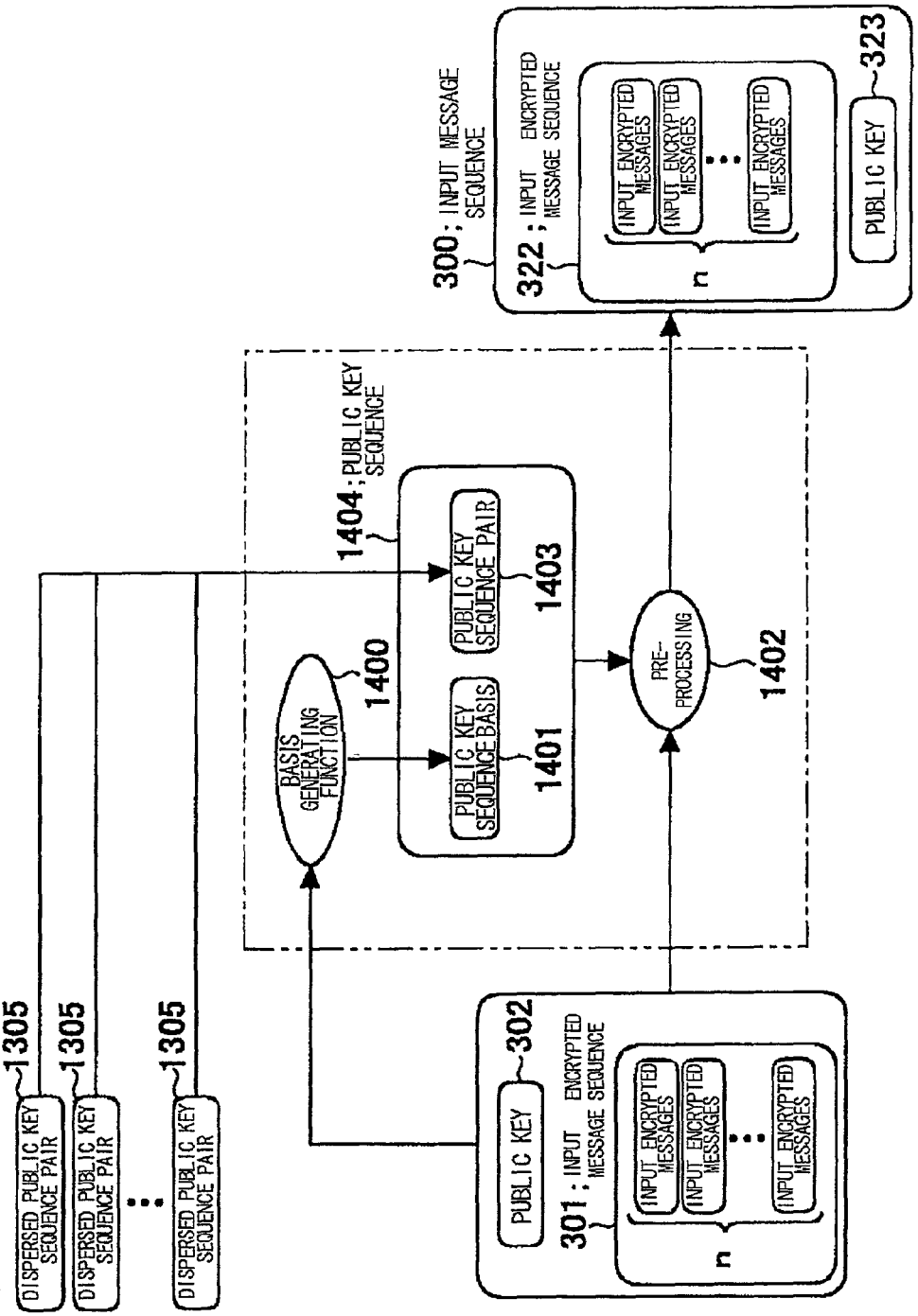
FIG. 14 shows details of a pre-processing device in the Embodiment 6 of the present invention.

Referring to FIGS. 13 and 14, the input message sequence generating method according to Embodiment 6 of the present invention is explained. It is noted that $\lceil$ assumes the value of 0, 1.

The secret key is owned in a distributed manner by t provers, as in embodiment 5. By a method for a public key sequence method with proof 1304, each prover $\hat{}$; $\hat{}=1, \ldots, t$ inputs a secret key 1301$x[\hat{}]$ and a pseudo-secret key 1302$\alpha[\hat{}]$ as a public key sequence information 1300, with the input encrypted message sequence 301 $\eta[i, 0], \eta[i, 1]; i=1, \ldots, n$ and the public key 302 $\eta[0,0], \eta[0,1]$ as a common initial value 1310, to acquire a dispersed public key sequence pair 1305 $g'[\mu, 1, \hat{}]; \mu=0, \ldots, n$ and the public key sequence proof message (text) 1306.

If, by the public key sequence verifying method 1307, the authenticity of the dispersed public key sequence pair 1305 has been verified from the dispersed public key sequence pair 1305 output by each prover, public key sequence proving text and the common initial value 1310, the dispersed public key sequence pairs 1305 of the provers $g'[\mu, 1, \hat{}]; \mu=0, \ldots, n; \hat{}=1, \ldots, t$ are combined to change the public key sequence pair 1404 $3g'[\mu, 1, \hat{}]; \mu=0, \ldots, n$ to $g'[\mu, 1] = \Pi_{\hat{}=1}{}^t g'[\mu,$ ba 1, $\hat{}]/F^*_p \mu=0, \ldots, n$, where exchange is made such that $g'[0, 1]=\eta[0, 1]$.

From the input message sequence 301 $\eta[i, 0], \eta[i, 1]; i=1, \ldots, n$ as the common initial value and from the public key 302 $\eta[0, 0], \eta[0, 1]$, a public key sequence basis 1401 $g'[\mu 0]; \mu=0, \ldots, n$ is generated 1400 as $$g'[0,0]=\eta[0,0]$$

$g'[i, 0]=\text{Hash}'[i](\eta[0,0], \eta[0, 1, \hat{j}, \eta[j, [j; \hat{}=1, \ldots, t; \lceil=0, 1; j=1, \ldots, n;)i=1, \ldots, n$ where $g'[0, 0]$ is exchanged as in the public key sequence pair 1403.

The public key sequence basis 1401 and the public key sequence pair 1403 are combined to form a public key sequence 1404 $g'[\mu, \lceil]; \mu=0, \ldots, n, \lceil=0, 1.$ From the public key sequence 1404, input encrypted message sequence 301 and the public key 302, the input message sequence 300 $g[\mu, \lceil]; \mu=0, \ldots, n; \lceil=0, 1$ is set to $$g[0, \lceil]=\eta[0, \lceil]\lceil=0, 1$$

$$g[i, \lceil]=\eta[i, \lceil]g'[i, \lceil]/F^*_p \; i=1, \ldots, n, \lceil=0, 1$$

(at pre-processing 1402).

When the input message sequence generating method of the present embodiment is applied to Embodiment 3, a public key sequence $g'[\mu, \lceil]; \mu=-1, \ldots, n; \lceil=0, 1$ is generated for the input encrypted message sequence $\eta[i, \lceil]; i=1, \ldots, n; \lceil=0, 1$ and the public key $\eta[0, \lceil]; \lceil=0, 1$, where $g'[0, \lceil]; \lceil=0, 1$ is equal to the public key. The input message sequence $g[\mu, \lceil]; \mu=-1, \ldots, n; \lceil=0, 1$ is set to $$g[-1, \lceil]=\eta[0, \lceil]\lceil=0, 1$$

$$g[i, \lceil]=\eta[i, \lceil]g'[i, \lceil]/F^*_p \; i=0, \ldots, n, \lceil=0, 1.$$

In the present embodiment, since the newly generated public key sequence is not envisaged even by a person who prepared an input message sequence, the components of an input message sequence obtained on multiplying them by the input encrypted message cannot be envisaged. So, the operation of imposing limitations on a response that can be generated by a prover is produced to prevent the person who prepared an input encrypted message and the person who prepared a shuffle proof text (message) acting together in falsification of the shuffle proof text.

The processing and the function of the public key sequence method with proof 1304, pre-processor 1309 and the public key sequence verifying device 1307 are realized by a program executed on a computer. The present invention can be executed by loading the program on a main memory of a computer and running the loaded program from a recording medium having the program recorded thereon (such as one of a CD-ROM, a DVD (digital versatile disc), a floppy disk medium, a hard disk medium, a magnetic tape medium or a semiconductor memory).

EMBODIMENT 7

The input message sequence generating method according to Embodiment 7 of the present invention is explained with reference to FIGS. 15 to 18. It is noted that $\lceil$ assumes the values of 0, 1 and, as in the previous Embodiment 5, the secret key 1502x is owned in a scattered manner by t provers.

Each prover $\hat{}$; $\hat{}=1, \ldots, t$ inputs the secret key 1502 $x[\hat{}]$ and a pseudo secret key 1503 $\alpha[\hat{}]$ as the public key sequence information 1501, by the Public key sequence method with proof 1504, with the ElGamal area variable set to a common initial value 1500, to acquire the scattered public key sequence pairs 1505 $g'[\mu, 1, \hat{}]; \mu=0, \ldots,$ and the public key sequence proof text (message) 1506.

If, by the public key verifying method 1507, the scattered public key sequence pair 1505 has been proved to be authentic from the scattered public key sequence pair 1505 output by each prover, public key sequence proof text 1506 and from the common initial value 1500, the scattered public key sequence pairs owned by the provers 1505 $g'[\mu, 1, \hat{}]; \mu=0, \ldots, n; \hat{}=1, \ldots, t$ are combined to set (change) the Public key sequence pair 1509 $g'[\mu, 1, \hat{}]; \mu=0, \ldots, n$ to $$g'[\mu, 1]=\Pi_{\hat{}=1}{}^t g'[\mu, 1, \hat{}]/F^*_p \mu=0, \ldots, n.$$

From the common initial value 1500, the public key sequence basis $g'[\mu, 0]; \mu=0, \ldots, n$ is generated as $$g'[\mu, 0]=\text{Hash}'[\mu](p, q)\mu=0, \ldots, n.$$

Figure 16:
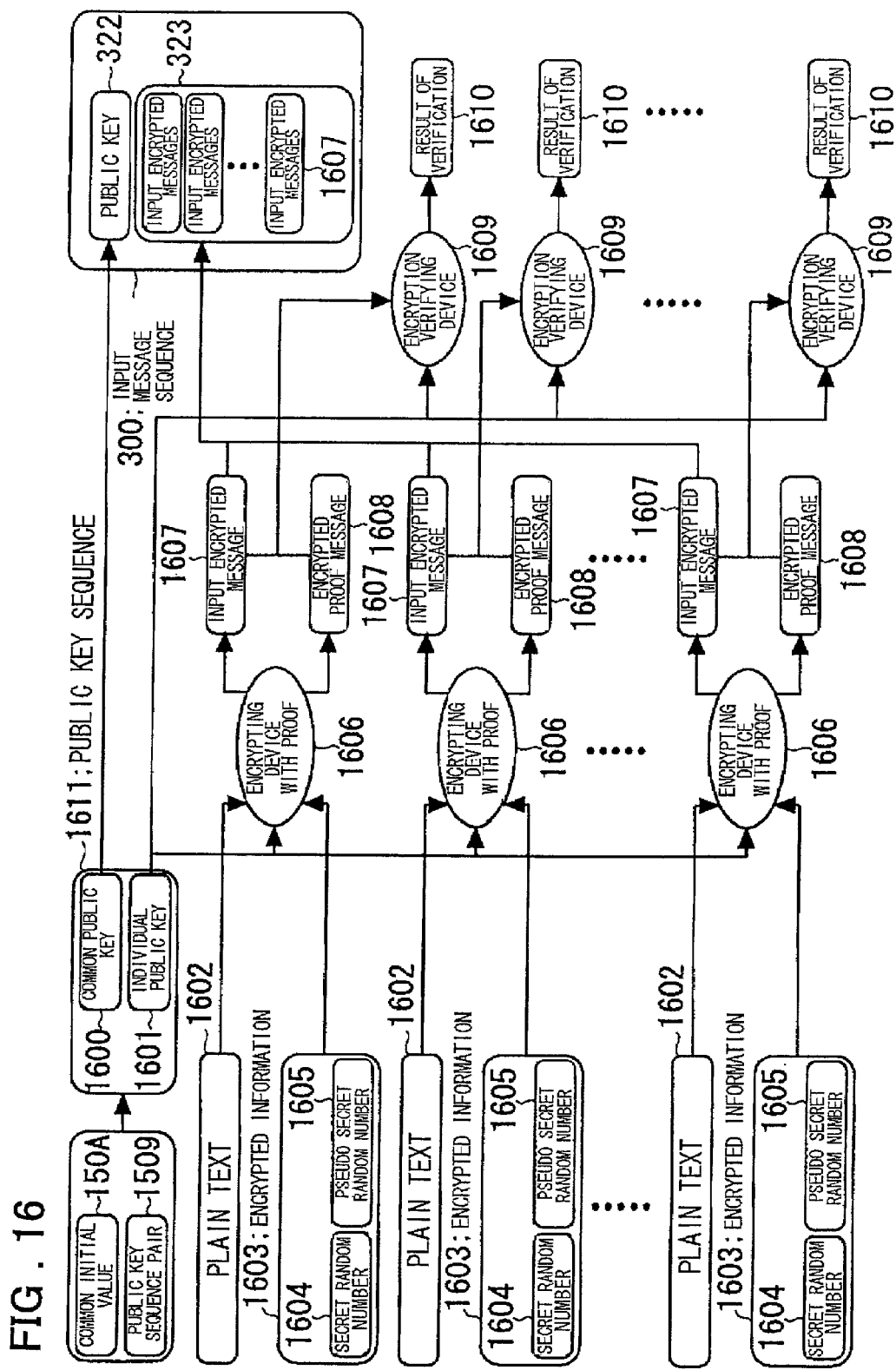
FIG. 16 shows details of an input message sequence-generating device of the Embodiment 7 of the present invention.
Figure 17:
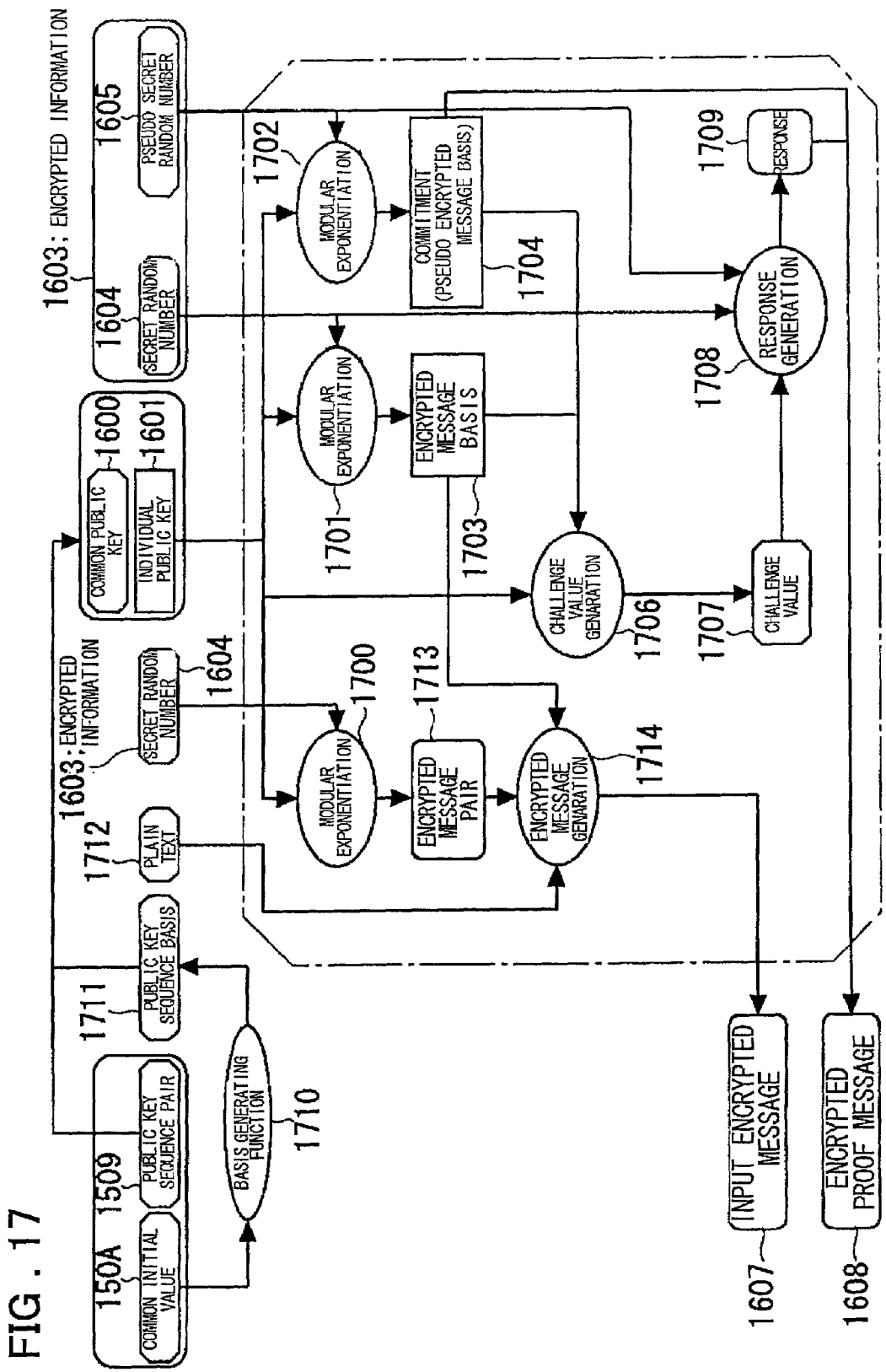
FIG. 17 shows details of the device for shuffle with proof of the Embodiment 7 of the present invention.
Figure 18:
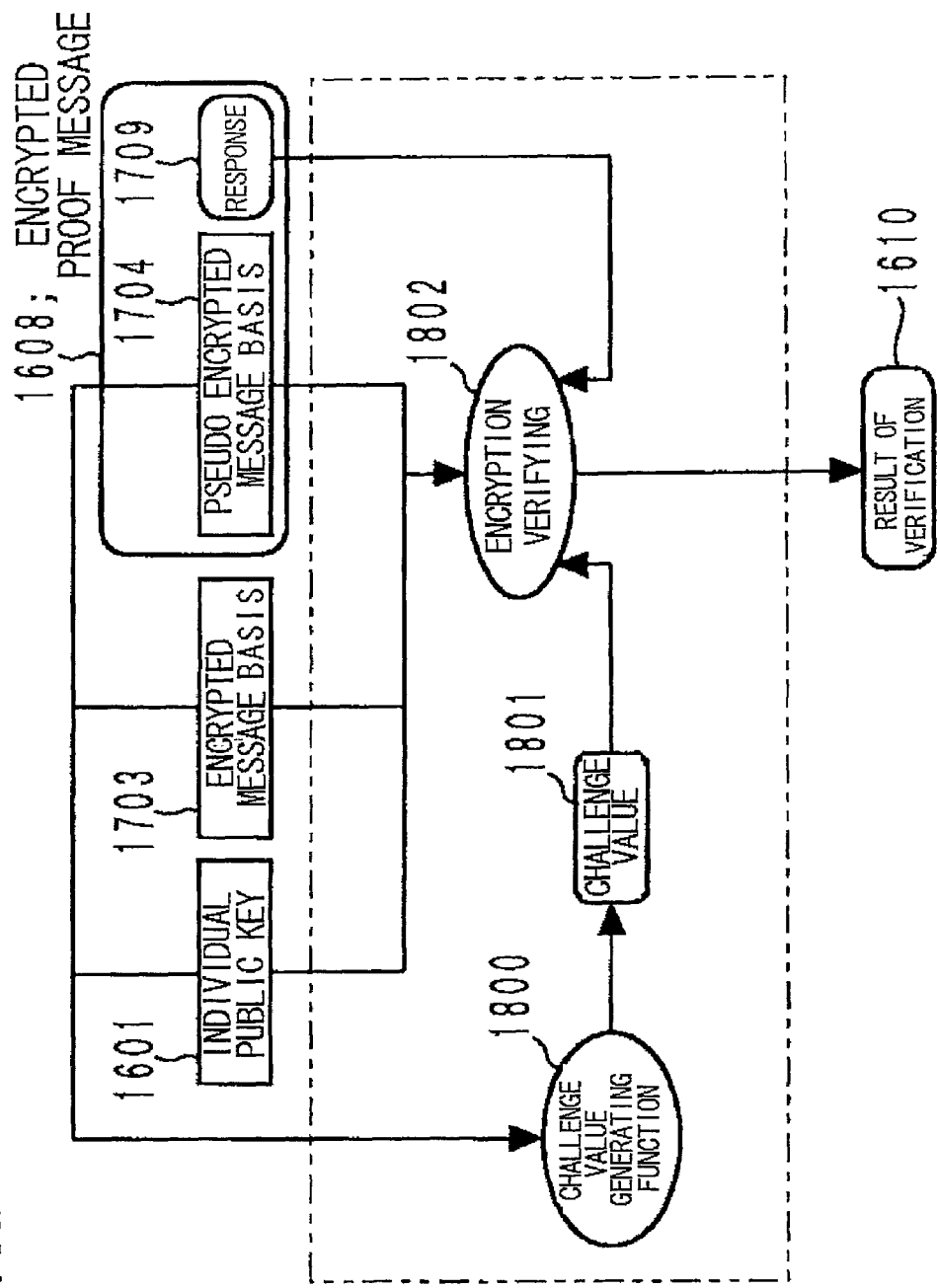
FIG. 18 shows details of the shuffle verifying device of the Embodiment 7 of the present invention.

The common initial value 150A basis and the public key sequence pair 1509 are combined to give a public key sequence 1611 $g'[\mu[]; \mu=0, \ldots, n, \lceil=0, 1.$ (FIG. 16)

Each person generating an input encrypted message $i=1, \ldots, n$ generates an input encrypted message 1607 $\eta[i, \lceil]; \lceil=0, 1$, from the plain text 1602m [i], private public key 1601 $g'[i, \lceil]; \lceil=0, 1$ a secret random number 1604s [i] and from a pseudo secret random number 1605s'[i], by the encryption method with proof 1606, as $$\eta[i, 0]=g'[i, 0]^{s[i]}/F^*_p$$

$$\eta[i, 1]=m[i]g'[i, 1]^{s[i]}/F^*_p.$$

The commitment (pseudo encrypted message basis 1704), challenge value 1707 and the response 1709 are generated in the order of $$\eta[i, 2]=g'[i, 0]^{s'[i]}/F^*_p$$

$$c'[i]=\text{Hash}[0](\eta[i, 0], \eta[i, 1], \eta[i,2])$$

$$\theta'[i]=c'[i]s[i]+s'[i]/F^*_q$$

with the pseudo encrypted message basis 1704 and the response 1709 being set to an encrypted proof message 1608.

By the encryption verifying device, $$c'[i]=\text{Hash}[0](\eta[i, 0], \eta[i, 1], \eta[i, 2])$$

and the challenge value 1801 are found for all of the input encrypted messages 1607 and the encrypted proof messages 1608 and, using the response 1709, it is verified 1610 that the verifying equation 1802

$$\eta[i, 0]^{\theta'[i]}=\eta[i, 1]^{c'[i]}\eta[i, 2]/F^*_p$$

holds. If the authenticity of all of the input encrypted messages 1607 is verified, the input message sequence 300 is set to $$g[0, []]=g'[0, []]$$

$$g[i, []]=\eta[i, []]i=1, \ldots, n$$

from the input encrypted message 323, $\eta[i, []]; [=0, 1$ and from the co-owned public key 1600 $g'[0, []]; [=0, 1$.

If the input message sequence-generating method of the present embodiment is applied to the above-described Embodiment 3, the following:

$$g[-1[]]=g'[-1, []]$$

$$g[0, []]=g'[0, []]$$

$$g[i, []]=\eta[i, []]i=1, \ldots, n$$

is set.

In the present embodiment, since the initially generated public key sequence cannot be envisaged even by a person who prepared the input encrypted message, the components of the input encrypted message shown to have been encrypted based on this public key sequence cannot be envisaged. This imposes limitations on the response that can be generated by the prover to prevent the person who prepared the input encrypted message and the person who prepared the shuffle proof text (message) from acting in concert to falsify the shuffle proof text.

Figure 15:
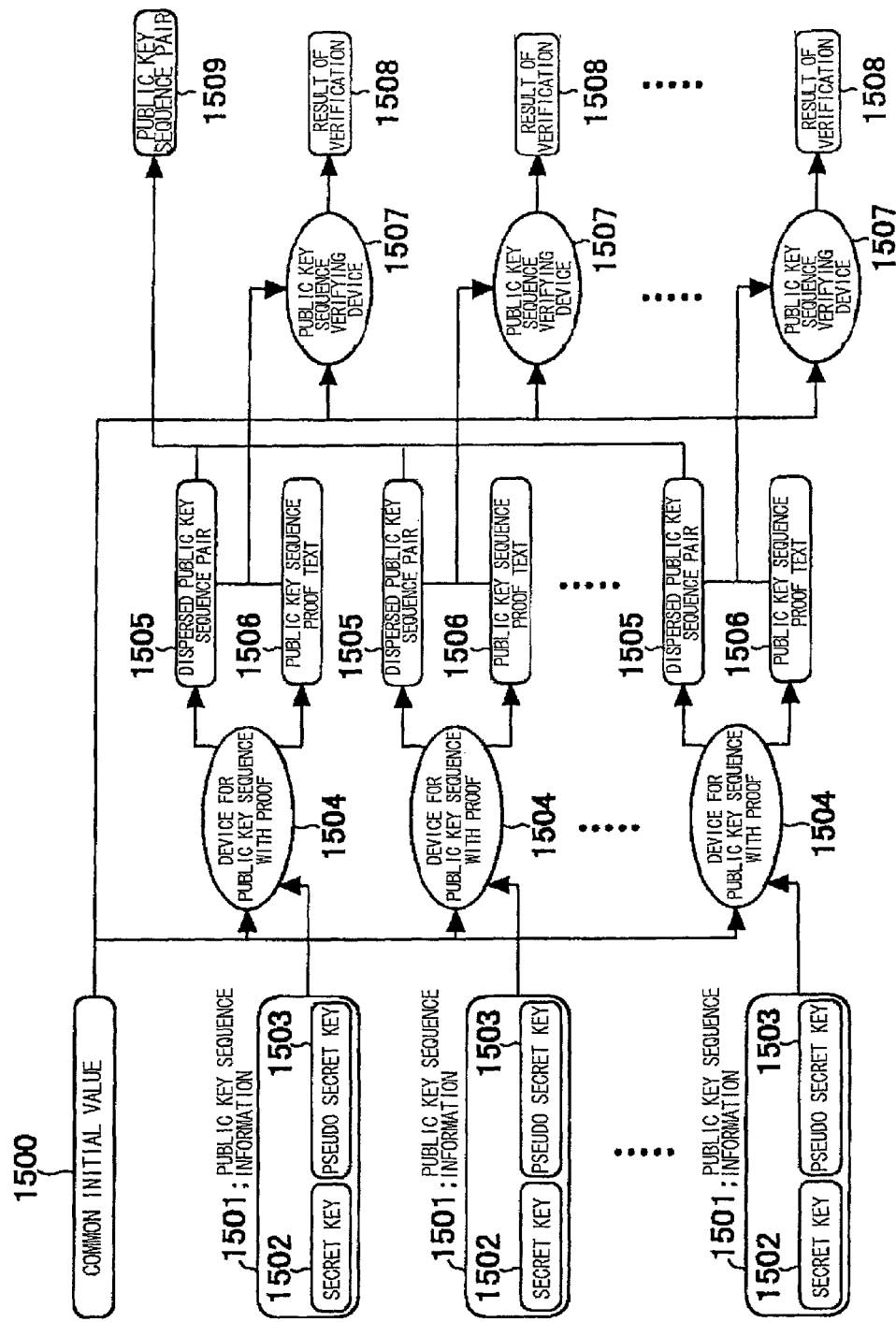
FIG. 15 shows details of an input message sequence-generating device of Embodiment 7 of the present invention.

Meanwhile, the processing and the function of a public key sequence device with proof 1504 and a public key sequence verifying device 1507 as shown in FIG. 15 are realized by a program run on a computer. The processing and the function of an encrypting device with proof 1606 and an encryption verifying device 1609 are realized by a program run on a computer. In this case, the program is loaded on a main memory of a computer from a recording medium having the program recorded thereon, such as a CD-ROM, a DVD (digital versatile disk), a floppy disk medium, a hard disk medium, a magnetic tape medium or a semiconductor memory, and run to execute the present invention.

EMBODIMENT 8

Figure 19:
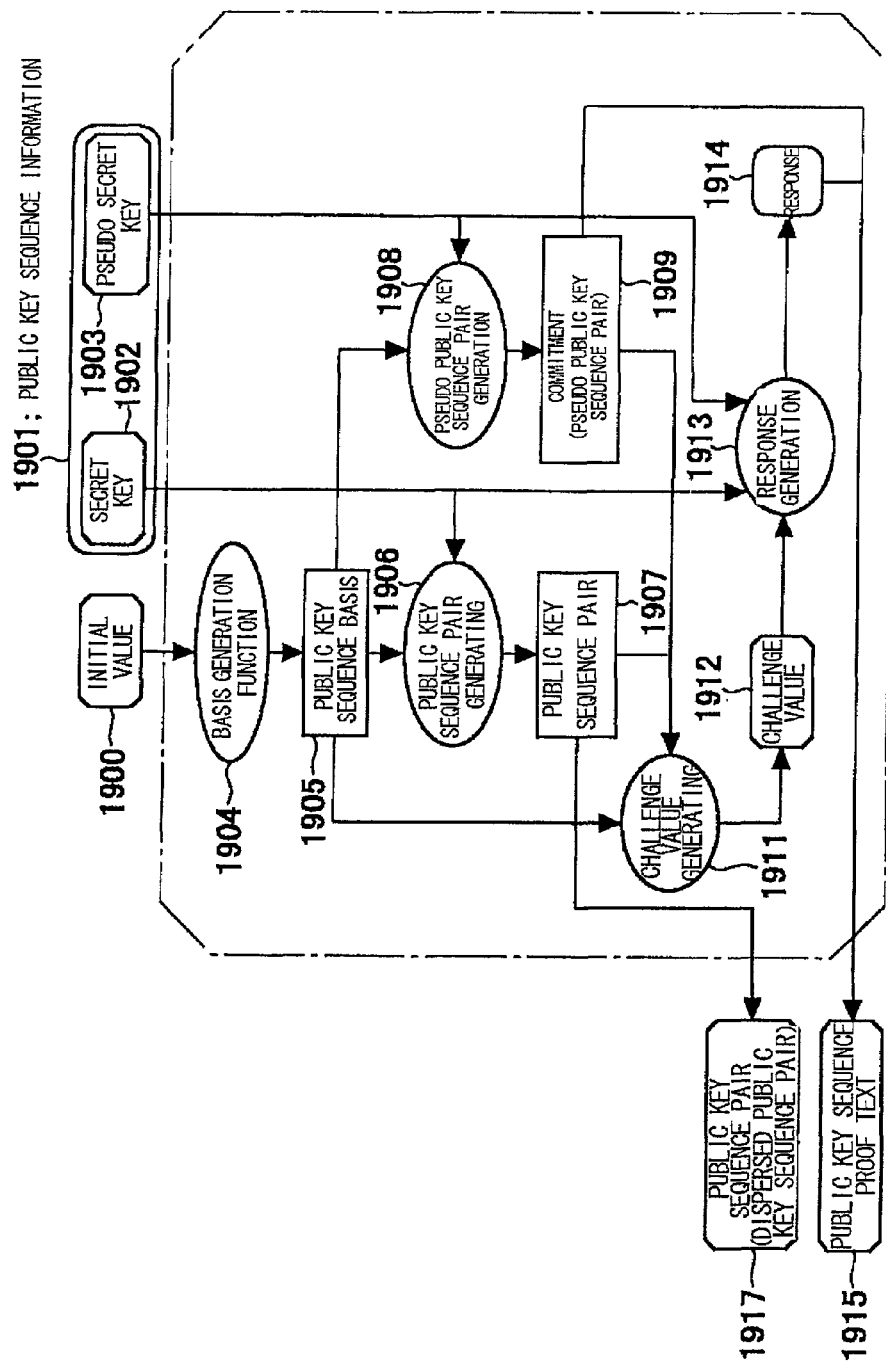
FIG. 19 shows details of a device for shuffle with proof in the Embodiments 6 and 7 of the present invention.
Figure 20:
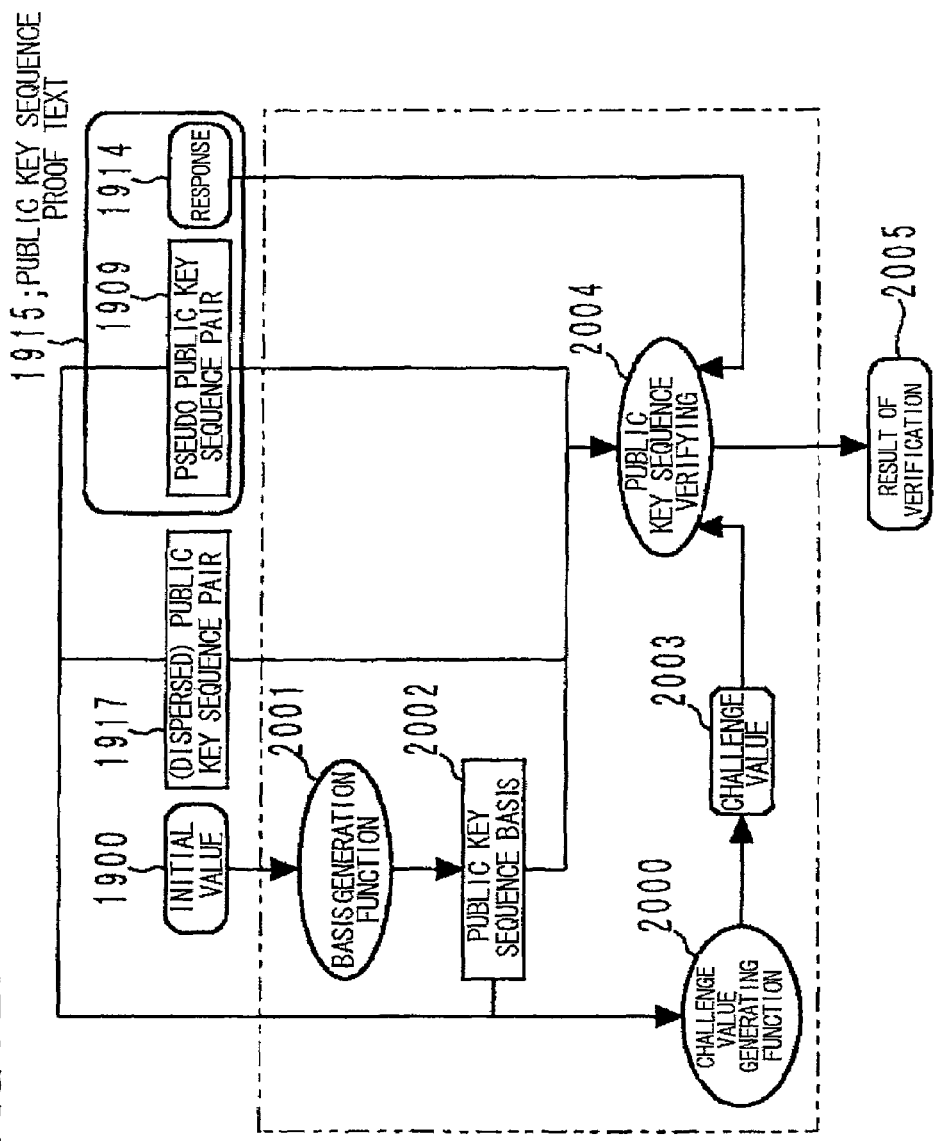
FIG. 20 shows details of a device for shuffle in the Embodiments 6 and 7 of the present invention.

The method for public key sequence with proof, according to Embodiment 8 of the present invention is explained with reference to FIGS. 19 and 20.

A common initial value e, a secret key 1902x and a pseudo secret key 1903 α, are input as the public key sequence information 1901.

From a common initial value 1900, a public key sequence basis 1905 $g'[\mu, 0]; \mu=0, \ldots, n$ is generated 1904 as $$g'[\mu, 0]=\text{Hash}'[\mu](e)\mu=0, \ldots, n.$$

From this, and by the secret key 1902x and the pseudo secret key 1903 α, the (dispersed) public key sequence pair 1907 $g'[\mu, 1]; \mu=0, \ldots, n$ is generated 1906 as $$g'[\mu, 1]=g'[\mu, 0]^x/F^*_p\mu=0, \ldots, n$$

whilst the pseudo public key sequence pair 1909 is generated 1908 as $$g'[\mu, 2]=g'[\mu, 0]^\alpha/F^*_p\mu=0, \ldots, n.$$

A challenge value 1912 and a response 1914 are sequentially generated as $$c''=\text{Hash}[0](g'[\mu, 0], g'[\mu, 2]; \mu=0, \ldots, n)$$

$$\theta=c''x+\alpha/F_q$$

with the pseudo public key sequence pair 1909 and a response 1914 constituting a public key sequence proof text 1915.

By the public key sequence verifying method, a challenge value 2003 is generated 2000 as $$c''=\text{Hash}[0](g'[\mu, 0], g'[\mu, 2]; \mu=0, \ldots, n) \text{ and,}$$
using a response 1914, a verifying equation $$g'[\mu, 0]^\theta=g'[\mu, 0]^{c''}g'[\mu, 2]/F^*_p\mu=0, \ldots, n$$

is verified 2004.

In the present embodiment, since no one can envisage the initially generated public key sequence basis, no one can envisage the components of the public key sequence prepared based thereon.

Meanwhile, the processing and the function of a public key sequence device with proof and a public key sequence verifying device are realized by a program run on a computer. In this case, the program is loaded on a main memory of a computer from a recording medium having the program recorded thereon, such as a CD-ROM, a DVD (digital versatile disk), a floppy disk medium, a hard disk medium, a magnetic tape medium or a semiconductor memory, and run to execute the present invention.

EMBODIMENT 9

As Embodiment 9 of the present invention, decoding with proof is explained. As in Embodiment 5, described above, the secret key x is owned in a scattered fashion by t provers.

$\hat{}; \hat{}=1, \ldots$, t'th prover inputs the result of partial decoding by a $\hat{}-1$st prover and partially decodes it. The result of partial decoding by the $\hat{}$th prover constitutes a decoded text. It is noted that the result of partial decoding by the 0th prover means the output of the above-mentioned ultimate shuffle.

The partial decoding with proof, performed by the ^th prover (partial decoding and submission of the corresponding proof text) is explained.

By a pseudo random number generator, a number $\beta[\hat{}]$ on $F_q$ other than 1, 0 is prepared.

$$\beta[\hat{}] \in_R F_q, \neq 0, 1.$$

The own public key $g[0, 0]$, $g'[0, 1, \hat{}]$ is set to $g[0,0]$, $g[0, 1]$, and the input encrypted message sequence is set to $g[i, []]$; $i=1, \ldots, n$, $\hat{} = 0, 1$. From the own public key and the secret key $x[\hat{}]$, the partial decoding basis $G[\mu, 0, \hat{}]$; $\mu = 0, \ldots, n$ and the pseudo partial decoding basis $G[\mu, 1, \hat{}]$; $\mu = 0, \ldots, n$ are generated as $$G[\mu, 0, \hat{}] = g[\mu, 0]^{x[\hat{}]}/F^*_p \mu = 0, \ldots, n$$

$$G[\mu, 1, \hat{}] = g[\mu, 0]^{\beta[\hat{}]}/F^*_p \mu = 0, \ldots, n.$$ As commitments, $g[\mu, [\hat{}]]$; $\mu = 0, \ldots, n$, $[\hat{}] = 0, 1$, $\hat{} = 0, \ldots,$ $t$ is output.

Although $g[0, 1, \hat{}] = g[0, 0]^{x[\hat{}]} G[0, 0, \hat{}]$ is overlapped with the public key, the same key is computed.

A challenge value is generated as $$c[\hat{}] = \text{Hash}[0](g[\mu, 0], G[\mu, [\hat{}], \hat{}]; \mu = 0, \ldots, n; [\hat{}] = 0, 1)$$ and, using this challenge value, a response $r[\hat{}]$ is generated as $r[\hat{}] = \beta[\hat{}] + c[\hat{}] x[\hat{}]/F_q$ and output. The partial decoding basis, pseudo partial decoding basis and the response are output as proof text for the partial decoding with proof.

The partial decoding is output as $$g[i, 0] \to g[i, 0] i = 1, \ldots, n$$

$$g[i, 1] \to g[i, 1]/G[i, 0, \hat{}]/F^*_p i = 1, \ldots, n.$$

In the verifying processing, a challenge value is generated from the input encrypted message sequence and the proof text, as $$c[\hat{}] = \text{Hash}[0](g[\mu, 0], G[\mu, [\hat{}], \hat{}]; \mu = 0, \ldots, n; [\hat{}] = 0, 1)$$

and, using the response in the proof text, input encrypted message sequence, partial decoding basis and pseudo partial decoding basis, $$g[\mu, 0]^{r[\hat{}]} = G[\mu, 0, \hat{}]^{c[\hat{}]} G[\mu, 1, \hat{}]/F^*_p \mu = 0, \ldots, n$$

is confirmed. It is then verified that the partial decoding has been made using this $G[\mu, 0, \hat{}]$ before acceptance.

The results of the foregoing for all of t provers are made into the decoded text.

[Authenticity]

The authenticity of the above-described embodiment is now explained.

[Completeness]

That the input message sequence, the output message sequence comprised of an output encrypted message sequence and a transformation information retention commitment, the accompanying response and challenge value meet the verifying equation of the transformation information retention verifying processing may be understood from $$\prod_{\mu=1}^{n+m} g[\mu, []]^{r[\mu]} = \prod_{\mu=1}^{n+m} g[\mu, []]^{\{\Sigma_{v=1}^{n+m'} A[\mu, v]c[v]\}}/F^*_p = \prod_{v=1}^{n+m'} (\prod_{\mu=1}^{n+m} g[\mu, []]^{A[\mu, v]})^{c[v]}/F^*_p = \prod_{v=1}^{n+m'} g''[v, []]^{c[v]}/F^*_p.$$

That the sub-equation coefficients (generator) committed, the accompanying response and the sub-response meet the verifying equation may be seen from $$u^{r'} = u^{\{\lambda[0] + \Sigma_{i=1}^{n} \lambda[i] r[i] r[i]\}}/F^*_p = u^{\lambda[0]} \prod_{i=1}^{n} (u^{\lambda[i]})^{r[i] r[i]}/F^*_p = u[0] \prod_{i=1}^{n} u[i]^{r[i] r[i]}/F^*_p.$$

That the coefficients of an identity output by the transformation condition commitment generating processing, the accompanying response and the sub-response meet the verifying equation of the knowledge verifying processing can be seen by the following:

That the coefficients of the identity of Embodiment 1 hold can be seen from $$v^{r[0]} \prod_{i=1}^{n} v^{r[i] r[i]}/F^*_p = (v^{r[0]})^{r[0]} v^{\{\Sigma_{i=1}^{n} \Sigma_{\mu=0}^{n} \Sigma_{v=0}^{n} A[i, \mu] A[i, v] c[\mu] c[v]\}}/F^*_p = v^{\{r'[0] \Sigma_{\mu=0}^{n} [0, \mu] c[\mu] + 2\Sigma_{i=1}^{n} \Sigma_{j=1}^{n} A[i, 0] A[i, j] c[j] + \Sigma_{i=1}^{n} A[i, 0] A[i, 0] + \Sigma_{i=1}^{n} \Sigma_{j=1}^{n} \Sigma_{k=1}^{n} A[i, j] A[i, k] c[j] c[k]\}}/F^*_p = v^{\{\Sigma_{i=1}^{n} \phi[i] c[i] + \phi[0]\} + \Sigma_{i=1}^{n} c[i] c[i]\}}/F^*_p = \omega v^{\{\Sigma_{i=1}^{n} (c[i] c[i] + \phi[i] c[i])\}}/F^*_p.$$

In the foregoing, the fact that $A[i, j]$ is a permutation matrix is used.

As for the coefficients of the identity of Embodiment 2, described above, the index part for v of $$v'''v^{r[0]} \prod_{i=1}^{n} v^{r[i] r[i]}/F^*_p$$

is $$\Sigma_{i=1}^{n} r[i] r[i] r[i] + \Sigma_{i=1}^{n} \rho'' \lambda[i] r[i] r[i] + \rho' r[0]/F^*_p = \Sigma_{h=1}^{n} \Sigma_{i=1}^{n} \Sigma_{j=1}^{n} \Sigma_{k=1}^{n} A[h, i] A[h, j] A[h, k] c[i] c[j] c[k] + \Sigma_{h=1}^{n} \Sigma_{i=1}^{n} \Sigma_{j=1}^{n} (3A[h, 0] A[h, i] A[h, j] + \rho'' \lambda[h] A[h, i] A[h, j]) c[i] c[j] + \Sigma_{i=1}^{n} \Sigma_{i=1}^{n} (3A[h, 0] A[h, 0] A[h, i] + 2\rho'' \lambda[h] A[h, 0] A[h, i] + \rho' A[0, i]) c[i] + \Sigma_{h=1}^{n} (A[h, 0] A[h, 0] A[h, 0] + \rho'' \lambda[h] A[h, 0] A[h, 0]) + \rho'' \lambda[0] + \rho' A[0, 0]/F_q = \Sigma_{h=1}^{n} (c[h] c[h] c[h] + \psi[h] c[h] c[h] + \phi[i] c[i] + \phi[0]) /F_q$$

which is equal to an index part of $$V^{\{\Sigma_{h=1}^{n} (c[h] c[h] c[h] + \psi[h] c[h] c[h] + \phi[i] c[i])\} \omega[0]}/F_p.$$

For deriving the last equation, the fact that $A[i, j]$ is a permutation matrix has been used (relied on).

The same discussion holds for the aforementioned Embodiments 3 and 4.

That the public key sequence basis, output by the method for public key sequence with proof of the aforementioned Embodiment 8, the public key sequence pair, pseudo public key sequence pair, the accompanying response and the challenge value meet the verifying equation of the verification processing may be seen from $$g'[\mu, 0]^r = g'[\mu, 0]^{c \cdot x + \alpha}/F^*_p = g'[\mu, 0]^x {}^c g'[\mu, 0]^{\alpha}/F^*_p = g'[\mu, 1]^c g'[\mu, 2]/F^*_p.$$

[Soundness]

For finding the response $r[\mu]$; $\mu = 1, \ldots, n+m$ satisfying the verifying equation in the transformation information retention verification processing for a given challenge value $c[v]$; $v = 1, \ldots, n+m'$, it is necessary to know $A[\mu, v]$; $\mu = 1, \ldots, n+m$; $v = 1, \ldots, n+m'$.

It is because finding a response satisfying the verifying equation in the equivalence detection processing without knowing $A[\mu, v]$; $\mu = 1, \ldots, n+m$; $v = 1, \ldots, n+m'$ for given $g[\mu, []]$, $g''[v[]]$; $\mu = 1, \ldots, n+m$; $v = 1, \ldots, n+m'$ is tantamount to solving the discrete logarithmic problem.

The reason is that being unaware of $A[\mu, v]$ means that, as for at least one $g''[v, []]$, the representation having $g[\mu, []]$; $\mu = 1, \ldots, n+m$ as the basis is not known, and that, if a response satisfying the verifying equation for an optional c can be found, the discrete logarithm can be solved by selecting such $c[v]$ as will give $c[\xi] = 1$, $c[v] = 0$; $v = 0, \ldots,$ $\xi - 1, \xi + 1, \ldots, n+m'$.

Also, since the challenge value $c[v]$ has a commitment $g[\mu, []]$, $g''[\mu, []]$ as an argument, the commitment cannot be adjusted after deciding the challenge value (the challenge value generating function requests this property to be had). Therefore, a prover may take the challenge value as a random number given after commitment decision.

If, for any component of g[v, []], its representation having another component as the basis is not known, forming plural responses satisfying the verifying equation is tantamount to solving the problem of discrete logarithm. The reason is that, if the verifying equation holds for different $r[\mu]$ and $r'[\mu]$, non-obvious representation of "1" having $g[\mu, []]$ as the basis may be obtained on dividing both sides by each other, which is equivalent to solving the problem of discrete logarithm.

As for the input message sequence $g[\mu, []]; \mu=1, \ldots, n+m$; $[=0, \ldots$ generated by the input message sequence generating method, since the vector $g[\mu, []]; \mu=1, \ldots, n+m$ for any $[$ is evidently generated by the Hash function or by the operation e.g., of multiplying the vector generated by a Hash function, it is felt to be number-theoretically difficult to express one using the other as the basis, vice versa.

From the foregoing, a prover cannot calculate except generating $r[\mu]=\Sigma_{v=1}^{n+m'}A[\mu, v]c[v]/F_q; \mu=1, \ldots, n+m$ using $g''[v, []]=\Pi_{\mu=1}^{n+m}g[\mu, []]^{A[\mu,v]}/F^*_p; v=1, \ldots, n+m'$ as $r[\mu]$; $\mu=1, \ldots, n+m$ satisfying the verifying equation. Th same applies for a method employing an individual public key.

If the relation $$g''[v, []]=\Pi_{\mu=1}^{n+m}g[\mu, []]^{A[\mu, v]}/F^*_p v=1, \ldots, n+m'$$

is proved for given $[$, as described above, similar proof may be given for other $[$ as follows:

If the verifying equation holds for $g[\mu, []]$, $g''[v, []]$ included in an argument of the challenge value generating function, $$g''[v, []]=\Pi_{\mu=1}^{n+m}g[\mu, []]^{A[\mu, v]}/F^*_p v=1, \ldots, n+m'.$$

The reason is as follows: If the verifying equation holds for a representation $$g''[v, []]=\Pi_{\mu=1}^{n+m}g[\mu, []]^{A'[\mu v]}/F^*_p v=1, \ldots, n+m',$$

then $$=\Pi_{\mu=1}^{n+m}g[\mu, []]^{\{\Sigma_{v=1}^{n+m'}(A[\mu, v]-A'[\mu, v])c[v]\}}=1/F^*_p$$

holds.

However, it is only when $$\Pi_{\mu=1}^{n+m}g[\mu, []]^{A[\mu, v]}=\Pi_{\mu=1}^{n+m}g[\mu, []]^{A'[\mu, v]}/F^*_p v=1, \ldots, n+m'$$

that the above equation holds for $c[v]$ selected at random.

In the above-described Embodiment 2, if, given u, $u[\mu]$; $\mu=0, \ldots, n$, obtained on committing the quasi-element (generator) coefficients by the transformation condition commitment generating processing, the response $r[i]$; $i=1, \ldots, n$ and the sub-response $r'$ meet the verifying equation, the sub-response $r'$ is unique, such that the sub-response $r'$ is represented by the above equation by $$r'=\lambda[0]+\Sigma_{i=1}^{n}\lambda[i]r[i]r[i]/F_q$$

satisfying the verifying equation.

By expanding the index part of v of the left side of the verifying equation of the identity of Embodiment 2, we obtain:

$$\Sigma_{h=1}^{n}\Sigma_{i=1}^{n}\Sigma_{j=1}^{n}\Sigma_{k=1}^{n}A[h, i]A[h, j]A[h, k]c[i]c[j]c[k]+\Sigma_{h=1}^{n}\Sigma_{i=1}^{n}\Sigma_{j=1}^{n}(3A[h, 0]A[h, i]A[h, j]+\rho''\lambda[h]A[h, i]A[h, j])c[i]c[j]+\Sigma_{i=1}^{n}(\Sigma_{h=1}^{n}(3A[h, 0]A[h, 0]A[h, i]+2\rho''\lambda[h]A[h, 0]A[h, i])+\rho'A[0, i])c[i]+\Sigma_{h=1}^{n}(A[h, 0]A[h, 0]A[h, 0]+\rho''\lambda[h]A[h, 0]A[h, 0])+\rho''\lambda[0]+\rho'A[0, 0]/F_q.$$

The index part of v of the right side is $$\Sigma_{i=1}^{n}(c[i]c[i]c[i]+\psi[i]c[i]c[i]+\phi[i]c[i])+\phi[0]/F^*_q.$$

Therefore, if the verifying equation is to hold for any $c[\mu]$; $\mu=0, \ldots, n$, the coefficients of $c[\mu]c[v]c[\xi]$; $\mu, v, \xi=0, \ldots, n$ must be the same. Otherwise, the possibility of the verifying equation retention for an arbitrarily given $c[\mu]$ may be disregarded.

This assures $$\Sigma_{h=1}^{n}A[h, i]A[h, j]A[h, k]=\delta'[i, j, k]/F_q i, j, k=1, \ldots, n$$

$$\Sigma_{h=1}^{n}(3A[h, 0]A[h, i]A[h, j]+\rho''\lambda[h]A[h, i]A[h, j])=\delta[i, j]\psi[i]/F_q i, j=1, \ldots, n$$

$$\Sigma_{h=1}^{n}(3A[h, 0]A[h, 0]A[h, i]+2\rho''\lambda[h]A[h, 0]A[h, i])+\rho'A[0, i]=\phi[i]/F_q i=1, \ldots, n$$

$$\Sigma_{h=1}^{n}(A[h, 0]A[h, 0]A[h, 0]+\rho''\lambda[h]A[h, 0]A[h, 0])+\rho''\lambda[0]+\rho'A[0, 0]=\phi[0]/F_q$$

using the relation that for $\delta[i, j]=1$ i=j

=0 and others and for $\delta'[i, j, k]=1$ i=j=k

=0 and others. From this, the following may be found for $A[i, j]$; $i, j=1, \ldots, n$.

An n-dimensional vector $A[h, j]A[h, k]$; h=1, \ldots, n having a h'th element $A[h, j]A[h, k]$ for given j, k; j≠k and an n-dimensional vector $A[h, i]$; h=1, \ldots, n having a h'th element $A[h, i]$ for given i are considered. It is assumed that n vectors $A[h,i]$; i=1, \ldots, n span (lie in) a n-dimensional space, that is, the entire vectors may be represented by linear combination of $A[h, i]$; i=1, \ldots, n. Then, from the above equation, the vector $A[h, j]A[h, k]$; h=1, \ldots, n has an inner product of 0 with respect to the entire vectors $A[h, i]$, the following equation holds:

$$A[h, j]A[h, k]=0/F_q h=1, \ldots, n.$$

It is seen from above that, among the n vectors $A[h, i]$; h=1, \ldots, n; i=1, \ldots, n, only one is a vector the respective h generators of which are not zero.

It is also seen from above that $A[h, i]A[h, j]A[h, k]\neq 0$ for i=j=k and hence the vector $A[h, i]$; h=1, \ldots, n has at least one non-zero element. Therefore, the entire vectors $A[h, i]$; h=1, \ldots, n have only one non-zero element which, from the above equation, is $1^{1/3}$.

It is now shown that n vectors $A[h, i]$; h=1, \ldots, n; i=1, \ldots, n span (are in) a n-dimensional space.

Using n scalars $\kappa[i]$; i=1, \ldots, n, the vector $a[h]$; h=1, \ldots, n is represented by $$a[h]=\Sigma_{i=1}^{n}\kappa[i]A[h, i]h=1, \ldots, n /F_q.$$

If it is shown that $\kappa[i]=0$ for $a[h]=/F_q$, it can be shown that n vectors $A[h, i]$; h=1, \ldots, n; i=1, \ldots, n lie in the n-dimensional space. If, with $a[h]=0 /F_q$, both sides of the above equation are multiplied by a n-dimensional vector $A[h, i]A[h, i]$ whose h'th element is $A[h, i]A[h, i]$, $$0=\kappa[i]/F_q i=1, \ldots, n$$

from the above two equations. It has been shown from above that $A[i, j]$ is a permutation matrix or a quasi-permutation matrix obtained on multiplying certain generators of the permutation matrix with $1^{1/3}$.

By expanding an index part of v of the left side of the verifying equation of an equation of Embodiment 1, we obtain $r[0]r[0]+\Sigma_{i=1}{}^n r[i]r[i]/F_q = \Sigma_{i=1}{}^n \Sigma_{j=1}{}^n \Sigma_{k=1}{}^n A[i, j]A[i, k]c[j]c[k] + \Sigma_{j=1}{}^n (\Sigma_{i=1}{}^n 2A[i, 0]A[i, j] + r'[0]A[0, j])c[j] + \Sigma_{i=1}{}^n A[i, 0]A[i, 0] + r'[0]A[0, 0]/F_q$.

The index part of v on the right side is $\Sigma_{i=1}{}^n (c[i]c[i] + \phi[i]c[i]) + \phi[0]/F_q$.

So, in order for the verifying equation to hold for any $c[\mu]$; $\mu = 0, \ldots n$, the coefficients of $c[\mu]cv$; $\mu, v = 0, \ldots, n$ must be the same. The possibility that the verifying equation holds for arbitrarily given responses otherwise can be neglected. This assures $\Sigma_{h=1}{}^n A[h, i]A[h, j] = \delta[i, j]/F_q$ $\phi[i] = \Sigma_{h=1}{}^n 2A[h, 0]A[h, i] + r'[0]A[0, i]/F_q$ $\phi[0] = \Sigma_{i=1}{}^n A[i, 0]A[i, 0] + r'[0]A[0, 0]/F_q$ and hence the possibility that the verifying equation holds can be neglected if $A[i, j]$; $i, j = 1, \ldots, n$ is not an orthonormal matrix.

For the above-described Embodiments 3 and 4, similar discussion holds, such that $A[i, j]$; $i, j = 1, \ldots, n$ is a permutation matrix and simultaneously an orthonormal matrix. This indicates that the matrix is a permutation matrix.

[Witness Indistinguishability]

It is shown that, in the shuffle proof text, the shuffle information is hidden number-theoretically.

As a result of the shuffle, such values as $r[\mu]$, $r'$, $\phi[i]$, $\psi[i], \omega, v', v'', v, u, u[i]$ $R[\mu], \Phi[i], V', \Omega, v,$ become apparent in addition to $g''[v]$, $m''[\mu]$. These afford the information pertinent to shuffle. However, if the identity coefficients are committed and hidden so that the number of unknowns pertinent to the shuffle matrix processing is larger than the number of conditions other than the results of the exponential calculations, solution becomes impossible unless the problem of discrete logarithm is solved to increase the number of the conditions. However, certain minor adjustments may be needed since the solution may become possible depending on the manner of appearance in the conditions of the unknowns without dependency on the number of variables.

The meritorious effects of the present invent ion are summarized as follows.

According to the present invention, as described above, the computational resources for shuffle with proof may be decreased as compared to that in the prior-art technique.

In particular, it may be contemplated that a number of practical applications of verifying processing cannot be computed beforehand. So, if the computational resources for verification is compared, $320n+2n$ times of modular exponentiation processing operations are needed for a safety variable of 160, in the prior-art technique (1), whilst 8 (n log n−n+1) modular exponentiation processing operations are needed in the prior-art technique (2). According to the present invention, $7n+14$ times of modular exponentiation processing operations suffice, such that, for n>4, the volume of the modular exponentiation processing operations is smaller than the case of any prior-art techniques.

Moreover, according to the present invention, the modular exponentiation processed in the course of the verification is not the individual modular exponentiation processing operations, but the processing for finding the product of the modular exponentiation processing operations, and hence calculations may be carried out with a smaller computational resources than in case of individual modular exponentiation processing operations. So, a prospect for a higher processing speed may result.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed generators, matters and/or items may fall under the modifications aforementioned.

What is claimed is:

1. A method for shuffle with proof in which an input message sequence, which is comprised of encrypted messages and one or more public-keys, and shuffle information are input, and in which an encrypted output message sequence obtained by processing permutation of said encrypted messages and re-encryption by said public key or keys, and a shuffle proof text as a proof text for said processing, are output, the method comprising:

(a) a transformation information retention commitment generating step of generating an output encrypted message sequence from an input message sequence and generating a commitment pertinent to retention of the transformation information from said input message sequence to said output encrypted message sequence, termed as "transformation information retention commitment";

(b) a transformation condition commitment generating step of generating a commitment pertinent to a condition to be met by said transformation, termed as "transformation condition commitment"; and (c) a response generating step of generating a response from said shuffle information and challenge value;

wherein:

(d) said transformation information retention commitment, said transformation condition commitment and the response are output as said shuffle proof text;

(e) said shuffle information includes the manner of permuting the input encrypted message, variables used for permuting and random numbers; and wherein:

said transformation information retention commitment generating step (a) generates said output encrypted message sequence and the transformation information retention commitment as represented values which represented by representing index-tuple with respect to a basis, where representing index-tuple is comprised of variables used for re-encryption, values corresponding to the permutation and random numbers and basis is the input message sequence;

said transformation condition commitment generating step (b) generates coefficients of an identity, as a polynomial of responses and challenge values, stating the condition to be met by the transformation from said input message sequence to said output encrypted message sequence from the shuffle information, said transformation condition commitment being coefficients of said identity or said coefficients partly or entirely committed;

said response generating step (c) generating said response from said shuffle information and the challenge values;

said representation associating the represented value with respect to the basis, it being computationally difficult to compute the representation of the given value with respect to the randomly given basis;

said challenge values being plural components decided at random after determining the input message sequence, output encrypted message sequence and the commitments in their entirety, or plural components output by a challenge value generating function receiving inputs of the input message sequence, the output encrypted message sequence and the entire commitments, said challenge value generating function outputting plural components from a given input and being such a function that it is computationally difficult to find the input from the output or to determine an input taking the relation between output components into account; and wherein said identity at said transformation condition commitment generating step connotes the relation that the square sum of certain terms of said polynomial and the square sum of certain elements of said challenge value are equal to each other irrespective of the challenge value, where each component of the response is made up of a polynomial of the challenge value.

2. A method for shuffle with proof in which an input message sequence, which is comprised of encrypted messages and one or more public-keys, and shuffle information are input, and in which an encrypted output message sequence obtained by processing permutation of said encrypted messages and re-encryption by said public key or keys, and a shuffle proof text as a proof text for said processing, are output, the method comprising:

(a) a transformation information retention commitment generating step of generating an output encrypted message sequence from an input message sequence and generating a commitment pertinent to retention of the transformation information from said input message sequence to said output encrypted message sequence, termed as "transformation information retention commitment";

(b) a transformation condition commitment generating step of generating a commitment pertinent to a condition to be met by said transformation, termed as "transformation condition commitment"; and (c) a response generating step of generating a response from said shuffle information and challenge value;

(d) said transformation information retention commitment, said transformation condition commitment and the response are output as said shuffle proof text; and (e) said shuffle information includes the manner of permuting the input encrypted message, variables used for permuting and random numbers;

wherein said transformation information retention commitment generating step (a) generates said output encrypted message sequence and the transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment generating step (b) generates coefficients of an identity, as a polynomial of responses and challenge values, stating the condition to be met by the transformation from said input message sequence to said output encrypted message sequence from the shuffle information, said transformation condition commitment being coefficients of said identity or said coefficients partly or entirely committed;

said response generating step (c) generating said response from said shuffle information and the challenge values;

said representation associating the represented value with respect to the basis, it being computationally difficult to compute the representation of the given value with respect to the randomly given basis;

said challenge values being plural components decided at random after determining the input message sequence, output encrypted message sequence and the commitments in their entirety, or plural components output by a challenge value generating function receiving inputs of the input message sequence, the output encrypted message sequence and the entire commitments, said challenge value generating function outputting plural components from a given input and being such a function that it is computationally difficult to find the input from the output or to determine an input taking the relation between output components into account; and wherein:

said identity at said transformation condition commitment generating step connotes the relation that the cubic sum of certain terms of said polynomial and the cubic sum of certain elements of said challenge value are equal to each other irrespective of the challenge value, where each component of the response is made up of a polynomial of the challenge value.

3. A method for shuffle with proof in which an input message sequence, which is comprised of encrypted messages and one or more public-keys, and shuffle information are input, and in which an encrypted output message sequence obtained by processing permutation of said encrypted messages and re-encryption by said public key or keys, and a shuffle proof text as a proof text for said processing, are output, the method comprising:

(a) a transformation information retention commitment generating step of generating an output encrypted message sequence from an input message sequence and generating a commitment pertinent to retention of the transformation information from said input message sequence to said output encrypted message sequence, termed as "transformation information retention commitment";

(b) a transformation condition commitment generating step of generating a commitment pertinent to a condition to be met by said transformation, termed as "transformation condition commitment"; and (c) a response generating step of generating a response from said shuffle information and challenge value;

wherein (d) said transformation information retention commitment, said transformation condition commitment and the response are output as said shuffle proof text; and wherein (e) said shuffle information includes the manner of permuting the input encrypted message, variables used for permuting and random numbers;

said transformation information retention commitment generating step (a) generates said output encrypted message sequence and the transformation information retention commitment as represented values which is represented by representing index-tuple with respect to a basis, where representing index-tuple is comprised of the variables used for re-encryption, values corresponding to the permutation and random numbers and basis is the input message sequence;

said transformation condition commitment generating step (b) including a plurality of first and second transformation condition commitment generating steps either one or both thereof, said first transformation condition commitment generating step generating coefficients of an identity polynomial of responses and challenge values, stating the condition to be met by the transformation from said input message sequence to said to said output encrypted message sequence from the shuffle information, with the coefficients of said identity or the coefficients partly or entirely committed being regarded as said transformation condition commitment, said second transformation condition commitment generating step generating coefficients of an identity, as a polynomial of the response, sub-response and the challenge value, stating the condition to be met by the transformation from said input message sequence to said output encrypted message sequence from said shuffle information, and also generating the coefficients of said identity or those coefficients partly or entirely committed, and sub-equation coefficients or these coefficients partly or entirely committed as transformation condition commitment;

said response generating step (c) generating said response and a plurality of sub-responses responsive to said transformation condition commitment generating processing;

said shuffle proving text comprehending a plurality of said transformation condition commitments, sub-responses associated with these commitments, said response and said transformation information retention commitment; and wherein a plurality of identities at said transformation condition commitment generating step or steps include two, first and second, identities, i.e.:

the first identity connoting the relation that the square sum of certain terms of said polynomial and the square sum of certain elements of said challenge value are equal to each other irrespective of the challenge value, where each component of the response is made up of a polynomial of the challenge value; and the second identity connoting the relation that the cubic sum of certain terms of said polynomial and the cubic sum of certain elements of said challenge value are equal to each other irrespective of the challenge value where each component of the response is made up of a polynomial of the challenge value.

4. An apparatus for shuffle with proof in which input message sequence, which is including a plurality of input encrypted messages and one or more public keys, and the shuffle information including the manner of permuting the input encrypted messages, variables used for re-encryption and random numbers is input, and an output encrypted message sequence obtained on permutation of said encrypted message and re-encryption by said public key and a shuffle proof text are output, said apparatus comprising:

(a) a transformation information retention commitment generating unit for generating the output encrypted message sequences from said input message sequence and for generating a commitment pertinent to retention of the transformation information from said input message sequence to said output encrypted message sequences, termed as "transformation information retention commitment";

(b) a transformation condition commitment generating unit for generating a commitment pertinent to a condition to be met by said transformation, termed as "transformation condition commitment";

(c) a response generating unit for generating a response from said shuffle information and challenge value;

(d) said transformation information retention commitment, said transformation condition commitment and the response are output as said shuffle proof text;

wherein:

said transformation information retention commitment generating unit includes means for generating said output encrypted message sequence and said transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment generating unit generating coefficients of an identity, as a polynomial of the response and the challenge value, stating the condition to be met by the transformation from said input message sequence to said output encrypted message sequence from said shuffle information and outputting the coefficients of said identity, or partly or entirely of said coefficients committed, as said transformation condition commitment;

said response generating unit including means for generating said response from challenge value, said challenge value being either plural components determined at random after the shuffle information, said input message sequence, the output encrypted message sequence and the commitment are determined in their entirety, or plural components output by a challenge value generating function fed as inputs with said input message sequence, output encrypted message sequence and with the entire commitments; and wherein:

said identity at said transformation condition commitment generating step connotes the relation that the square sum of certain terms of said polynomial and the square sum of certain elements of said challenge value are equal to each other irrespective of the challenge value, where each component of the response is made up of a polynomial of the challenge value.

5. An apparatus for shuffle with proof in which input message sequence, which is including a plurality of input encrypted messages and one or more public keys, and the shuffle information including the manner of permuting the input encrypted messages, variables used for re-encryption and random numbers is input, and an output encrypted message sequence obtained on permutation of said encrypted message and re-encryption by said public key and a shuffle proof text are output, said apparatus comprising:

(a) a transformation retention commitment generating unit for generating the output encrypted message sequences from said input message sequence and for generating a commitment pertinent to retention of the transformation information from said input message sequence to said output encrypted message sequences, termed as "transformation information retention commitment";

(b) a transformation condition commitment generating unit for generating a commitment pertinent to a condition to be met by said transformation, termed as "transformation condition commitment"; and (c) a response generating unit for generating a response from said shuffle information and challenge value; wherein (d) said transformation information retention commitment, said transformation condition commitment and the response are output as said shuffle proof text;

said transformation information retention commitment generating unit includes means for generating said output encrypted message sequence and said transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment generating unit generating coefficients of an identity, as a polynomial of the response and the challenge value, stating the condition to be met by the transformation from said input message sequence to said output encrypted message sequence from said shuffle information and outputting the coefficients of said identity, or partly or entirely of said coefficients committed, as said transformation condition commitment;

said response generating unit including means for generating said response from challenge value, said challenge value being either plural components determined at random after the shuffle information, said input message sequence, the output encrypted message sequence and the commitment are determined in their entirety, or plural components output by a challenge value generating function fed as inputs with said input message sequence, output encrypted message sequence and with the entire commitments; and said identity at said transformation condition commitment generating step connotes the relation that the cubic sum of certain terms of said polynomial and the cubic sum of certain elements of said challenge value are equal to each other irrespective of the challenge value, where each component of the response is made up of a polynomial of the challenge value.

6. An apparatus for shuffle with proof in which input message sequence, which is including a plurality of input encrypted messages and one or more public keys, and the shuffle information including the manner of permuting the input encrypted messages, variables used for re-encryption and random numbers is input, and an output encrypted message sequence obtained on permutation of said encrypted message and re-encryption by said public key and a shuffle proof text are output, said apparatus comprising:

(a) a transformation information retention commitment generating unit for generating the output encrypted message sequences from said input message and for generating a commitment pertinent to retention of the transformation information from said input message sequence to said output encrypted message sequences, termed as "transformation information retention commitment";

(b) a transformation condition commitment generating unit for generating a commitment pertinent to a condition to be met by said transformation, termed as "transformation condition commitment"; and (c) a response generating unit for generating a response from said shuffle information and challenge value; wherein (d) said transformation information retention commitment, said transformation condition commitment and the response are output as said shuffle proof text;

said transformation information retention commitment generating unit includes means for generating said output encrypted message sequence and the transformation information retention commitment as represented values which is represented by representing-tuple with respect to a basis, where representing index-tuple is comprised of the variables used for re-encryption, values corresponding to the permutation and random numbers and basis is the input message sequence;

said transformation condition commitment generating unit being present in a plurality of numbers including one or both of first and second transformation condition commitment generating units;

said first transformation condition commitment generating unit generating coefficients of an identity, as a polynomial of the response and challenge value, stating the condition to be met by the transformation from said input message sequence to said output encrypted message sequence from the shuffle information, with the coefficients of said identity or the coefficients partly or entirely committed being regarded as said transformation condition commitment;

said second transformation condition commitment generating unit generating coefficients of an identity, as a polynomial of the response, sub-response and the challenge value, stating the condition to be met by the transformation from said input message sequence to said output encrypted message sequence from said shuffle information, and also generating the coefficients of said identity or these coefficients partly or entirely committed, and sub-equation coefficients or these coefficients partly or entirely committed as a transformation condition commitment;

said response generating unit generating said response and a plurality of sub-responses responsive to said response and the plurality of said transformation condition commitment generating units;

said shuffle proving text comprehending a plurality of said transformation condition commitments, sub-responses associated with said commitments, said response and said transformation information retention commitment; wherein a plurality of identities at said transformation condition commitment generating unit include two, first and second, identities:

said first identity connoting the relation that the square sum of certain terms of said polynomial and the square sum of certain elements of said challenge value are equal to each other irrespective of the challenge value, where each component of the response is made up of a polynomial of the challenge value; and said second identity connoting that the cubic sum of certain terms of said polynomial and the cubic sum of certain generators of said challenge value are equal to each other irrespective of the challenge value.

7. A storage medium storing a machine readable program so formulated that a computer, as a shuffle apparatus, in which an input message sequence, which is including a plurality of input encrypted messages and one or more public keys, and the shuffle information, including the manner of permuting the input encrypted message, variables used for re-encryption and random numbers, are input, and in which an encrypted output message sequence obtained on permutation of said encrypted messages and re-encryption by said public key or keys, and a shuffle proof text, are output, is caused to perform processing comprising:

(a) transformation information retention commitment generating processing of generating said output encrypted message sequences from said input message sequence and generating a commitment pertinent to retention of the transformation information from said input message sequence to said output encrypted message sequences, termed as "transformation information retention commitment";

(b) transformation condition commitment generating processing of generating a commitment pertinent to a condition to be met by said transformation, termed as "transformation condition commitment"; and (c) response generating processing of generating a response from said shuffle information and challenge value; and (d) processing of outputting said transformation information retention commitment, transformation condition commitment and said response as said shuffle proof text;

said transformation information retention commitment generating processing generating said output encrypted message sequence and said transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment processing generating coefficients of an identity, as a polynomial of the response and the challenge value, stating the condition to be met by the transformation from said input message sequence to said output encrypted message sequence from said shuffle information and outputting the coefficients of said identity or said coefficients partly or entirely committed, as said transformation condition commitment; and said response generating processing generating said response from plural components determined at random after the shuffle information, said input message sequence, the output encrypted message sequence and the commitment are determined in their entirety, or from challenge value which is plural components output by a challenge value generating function fed as inputs with said input message sequence, output encrypted message sequence and the entire commitments;

said identity at said transformation condition commitment generating processing connoting the relation that the square sum of certain terms of said polynomial and the square sum of certain elements of said challenge value are equal to each other irrespective of the challenge value, where each component of the response is made up of a polynomial of the challenge value.

8. A storage medium storing a machine readable program so formulated that a computer, as a shuffle apparatus, in which an input message sequence, which is including a plurality of input encrypted messages and one or more public keys, and the shuffle information, including the manner of permuting the input encrypted message, variables used for re-encryption and random numbers, are input, and in which an encrypted output messages sequence obtained on permutation of said encrypted messages and re-encryption by said public key or keys, and a shuffle proof text, are output, is caused to perform processing comprising:

(a) transformation information retention commitment generating processing of generating said output encrypted message sequences from said input message sequence and generating a commitment pertinent to retention of the transformation information from said input message sequence to said output encrypted message sequences, termed as "transformation information retention commitment";

(b) transformation condition commitment generating processing of generating a commitment pertinent to a condition to be met by said transformation, termed as "transformation condition commitment"; and (c) response generating processing of generating a response from said shuffle information and challenge value; and (d) processing of outputting said transformation information retention commitment, transformation condition commitment and said response as said shuffle proof text;

said transformation information retention commitment generating processing generating said output encrypted message sequence and said transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment processing generating coefficients of an identity, as a polynomial of the response and the challenge value, stating the condition to be met by the transformation from said input message sequence to said output encrypted message sequence from said shuffle information and outputting the coefficients of said identity or said coefficients partly or entirely committed, as said transformation condition commitment; and said response generating processing generating said response from plural components determined at random after the shuffle information, said input message sequence, the output encrypted message sequence and the commitment are determined in their entirety, or from challenge value which is plural components output by a challenge value generating function fed as inputs with said input message sequence, output encrypted message sequence and the entire commitments;

said identity at said transformation condition commitment generating processing connoting the relation that the cubic sum of certain terms of said polynomial and the cubic sum of certain elements of said challenge value are equal to each other irrespective of the challenge value, where each component of the response is made up of a polynomial of the challenge value.

9. A storage medium storing a machine readable program so formulated that a computer, as a shuffle apparatus, in which an input message sequence, which is including a plurality of input encrypted messages and one or more public keys, and the shuffle information, including the manner of permuting the input encrypted message, variables used for re-encryption and random numbers, are input, and in which an encrypted output messages sequence obtained on permutation of said encrypted messages and re-encryption by said public key or keys, and a shuffle proof text, are output, is caused to perform processing comprising:

(a) transformation information retention commitment generating processing of generating said output encrypted message sequences from said input message sequence and generating a commitment pertinent to retention of the transformation information from said input message sequence to said output encrypted message sequences, termed as "transformation information retention commitment";

(b) transformation condition commitment generating processing of generating a commitment pertinent to a condition to be met by said transformation, termed as "transformation condition commitment"; and (c) response generating processing of generating a response from said shuffle information and challenge value; and (d) processing of outputting said transformation information retention commitment, transformation condition commitment and said response as said shuffle proof text;

said transformation information retention commitment generating processing generating said output encrypted message sequence and said transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment generating processing being performed in a plurality of numbers including first and second processings, either one or both thereof, the first transformation condition commitment generating processing generating coefficients of an identity as a polynomial of responses and challenge values, stating the condition to be met by the transformation from said input message sequence to said output encrypted message sequence from the shuffle information, with the coefficients of said identity or these coefficients partly or entirely committed being said transformation condition commitment; and the second transformation condition commitment generating processing generating coefficients of an identity, as a polynomial of the response, sub-response and the challenge value, stating the condition to be met by the transformation from said input message sequence to said output encrypted message sequence from said shuffle information, and also generating the coefficients of said identity or these coefficients partly or entirely committed, and sub-equation coefficients or these coefficients partly or entirely committed, as transformation condition commitment;

said response generating processing generating said response and a plurality of sub-responses according to said response and said plurality of transformation condition commitment generating processings; and outputting a plurality of said transformation condition commitments, sub-response associated with these commitments, said response and said transformation information retention commitment, as said shuffle proving text a plurality of identities at said transformation condition commitment generating processings including two identities:

i.e., a first that is an identity connoting the relation that the square sum of certain terms of said polynomial and the square sum of certain elements of said challenge value are equal to each other irrespective of the challenge value, where each component of the response is made up of a polynomial of the challenge value, and a second identity connoting the relation that the cubic sum of certain terms of said polynomial and the cubic sum of certain elements of said challenge value are equal to each other irrespective of the challenge value where each component of the response is made up of a polynomial of the challenge value.

10. A method for shuffle with proof in which an input message sequence, which is comprised of encrypted messages and one or more public-keys, and shuffle information are input, and in which an encrypted output message sequence obtained by processing permutation of said encrypted messages and re-encryption by said public key or keys, and a shuffle proof text as a proof text for said processing, are output, the method comprising:

(a) a transformation information retention commitment generating step of generating an output encrypted message sequence from an input message sequence and generating a commitment pertinent to retention of the transformation information from said input message sequence to said output encrypted message sequence, termed as "transformation information retention commitment";

(b) a transformation condition commitment generating step of generating a commitment pertinent to a condition to be met by said transformation, termed as "transformation condition commitment"; and (c) a response generating step of generating a response from said shuffle information and challenge value;

(d) said transformation information retention commitment, said transformation condition commitment and the response are output as said shuffle proof text; and (e) said shuffle information includes the manner of permuting the input encrypted message, variables used for permuting and random numbers;

wherein:

said transformation information retention commitment generating step (a) generates said output encrypted message sequence and the transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment generating step (b) generates coefficients of an identity, as a polynomial of responses and challenge values, stating the condition to be met by the transformation from said input message sequence to said output encrypted message sequence from the shuffle information, said transformation condition commitment being coefficients of said identity or said coefficients partly or entirely committed;

said response generating step (c) generating said response from said shuffle information and the challenge values;

said representation associating the represented value with respect to the basis, it being computationally difficult to compute the representation of the given value with respect to the randomly given basis;

said challenge values being plural components decided at random after determining the input message sequence, output encrypted message sequence and the commitments in their entirety, or plural components output by a challenge value generating function receiving inputs of the input message sequence, the output encrypted message sequence and the entire commitments;

said challenge value generating function outputting plural components from a given input and being such a function that it is computationally difficult to find the input from the output or to determine an input taking the relation between output components into account:

said transformation condition commitment generating step (b) generates coefficients of an identity, as a polynomial of said response, sub-response and the challenge value, stating the condition to be met by the transformation from said input message sequence to said output encrypted message sequence from said shuffle information, and generating, as transformation condition commitments, the coefficients of said identity or those coefficients partly or entirely committed, and sub-equation coefficients or these coefficients partly or entirely committed;

said sub-response being not used in the transformation information retention verification processing in the shuffle verification, said sub-response being a polynomial of the response and the challenge value, with the coefficients of said polynomial being sub-equation coefficients;

said response generating step generating two responses, that is response and sub-response, using the shuffle information from said challenge value;

said shuffle proof text comprehending said transformation information retention commitment, transformation condition commitment, said response and the sub-response; and said identity at said transformation condition commitment generating step connotes the relation that the square sum of certain terms of said polynomial and the square sum of certain elements of said challenge value are equal to each other irrespective of the challenge value, where each component of the response is made up of a polynomial of the challenge value.

11. A method for shuffle with proof in which an input message sequence, which is comprised of encrypted messages and one or more public-keys, and shuffle information are input, and in which an encrypted output message sequence obtained by processing permutation of said encrypted messages and re-encryption by said public key or keys, and a shuffle proof text as a proof text for said processing, are output, the method comprising:

(a) a transformation information retention commitment generating step of generating an output encrypted message sequence from an input message sequence and generating a commitment pertinent to retention of the transformation information from said input message sequence to said output encrypted message sequence, termed as "transformation information retention commitment";

(b) a transformation condition commitment generating step of generating a commitment pertinent to a condition to be met by said transformation, termed as "transformation condition commitment"; and (c) a response generating step of generating a response from said shuffle information and challenge value;

(d) said transformation information retention commitment, said transformation condition commitment and the response are output as said shuffle proof text; and (e) said shuffle information includes the manner of permuting the input encrypted message, variables used for permuting and random numbers;

wherein:

said transformation information retention commitment generating step (a) generates said output encrypted message sequence and the transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment generating step (b) generates coefficients of an identity, as a polynomial of responses and challenge values, stating the condition to be met by the transformation from said input message sequence to said output encrypted message sequence from the shuffle information, said transformation condition commitment being coefficients of said identity or said coefficients partly or entirely committed;

said response generating step (c) generating said response from said shuffle information and the challenge values;

said representation associating the represented value with respect to the basis, it being computationally difficult to compute the representation of the given value with respect to the randomly given basis;

said challenge values being plural components decided at random after determining the input message sequence, output encrypted message sequence and the commitments in their entirety, or plural components output by a challenge value generating function receiving inputs of the input message sequence, the output encrypted message sequence and the entire commitments;

said challenge value generating function outputting plural components from a given input and being such a function that it is computationally difficult to find the input from the output or to determine an input taking the relation between output components into account:

said transformation condition commitment generating step (b) generates coefficients of an identity, as a polynomial of said response, sub-response and the challenge value, stating the condition to be met by the transformation from said input message sequence to said output encrypted message sequence from said shuffle information, and generating, as transformation condition commitments, the coefficients of said identity or those coefficients partly or entirely committed, and sub-equation coefficients or these coefficients partly or entirely committed;

said sub-response being not used in the transformation information retention verification processing in the shuffle verification, said sub-response being a polynomial of the response and the challenge value, with the coefficients of said polynomial being sub-equation coefficients;

said response generating step generating two responses, that is response and sub-response, using the shuffle information from said challenge value;

said shuffle proof text comprehending said transformation information retention commitment, transformation condition commitment, said response and the sub-response; and said identity at said transformation condition commitment generating step connotes the relation that the cubic sum of certain terms of said polynomial and the cubic sum of certain elements of said challenge value are equal to each other irrespective of the challenge value, where each component of the response is made up of a polynomial of the challenge value.

12. A shuffle verifying method in which an input message sequence, an output encrypted message sequence and a shuffle proof text are input, and a result of verification indicating acceptance or non-acceptance is output, the method comprising:
(a) a transformation information retention verifying step of verifying the retention of the transformation information on transformation from an input message sequence to an output encrypted message sequence from the input message sequence, output encrypted message sequence, transformation information retention commitment pertinent to retention of the transformation information from said input message sequence to said output encrypted message sequence, a response and challenge value; and
(b) a transformation condition verifying step of verifying the condition to be met by transformation from said input message sequence to said output encrypted message sequence, by the transformation condition commitment pertinent to the condition to be met by said transformation, said response and the challenge value; wherein
(c) acceptance is output as the result of the shuffle verification if both the verification of the transformation information retention verifying step and the verification of the transformation condition verifying step are accepted, and non-acceptance is output otherwise;
wherein:
said transformation information retention commitment generating step (a) comprehends a plurality of transformation information retention commitment generating steps each of which generates said output encrypted message sequence and the transformation information retention commitment as represented values represented by variables used for re-encryption, values used for permutation and random numbers, with respect to the basis of said input message sequence,
said transformation information retention commitment generating steps omitting, at second and subsequent steps thereof, generation of outputs of the second and subsequent transformation information retention commitment generating processing operations common to that of the first transformation information retention commitment generating step; and
wherein:
said transformation condition commitment generating step (b) comprehends a plurality of first and second transformation condition commitment generating steps, either one or both thereof;
said first transformation condition commitment generating step generating coefficients of an identity as a polynomial of the response and the challenge value, stating the condition to be met by the transformation from said input message sequence to said output encrypted message sequence from the shuffle information, and setting the coefficients of said identity or those coefficients partly or entirely committed as said transformation condition commitment; and
said second transforming condition commitment generating step generating coefficients of an identity as a polynomial of the response, sub-response and the challenge value, stating the condition to be met by the transformation from said input message sequence to said output encrypted message sequence from the shuffle information, and generating the coefficients of said identity or those coefficients partly or entirely committed and the sub-equation coefficients or these coefficients partly or entirely committed, as said transformation condition commitment;
said response generating step (c) generating a plurality of responses responsive to said transformation information retention commitment generating steps and generating a plurality of sub-responses responsive to said transformation information retention commitment generating steps;
said shuffle proof text including said responses, a plurality of transformation information retention commitments, a plurality of transformation condition commitments and corresponding sub-responses;
wherein:
a plurality of identities at said transformation condition commitment generating step or steps include two, first and second, identities, i.e.:
the first identity connoting the relation that the square sum of certain terms of said polynomial and the square sum of certain elements of said challenge value are equal to each other irrespective of the challenge value, where each component of the response is made up of a polynomial of the challenge value; and
the second identity connoting the relation that the cubic sum of certain terms of said polynomial and the cubic sum of certain elements of said challenge value are equal to each other irrespective of the challenge value where each component of the response is made up of a polynomial of the challenge value.

13. An apparatus for shuffle with proof in which input message sequence, which is including a plurality of input encrypted messages and one or more public keys, and the shuffle information including the manner of permuting the input encrypted messages, variables used for re-encryption and random numbers is input, and an output encrypted message sequence obtained on permutation of said encrypted message and re-encryption by said public key and a shuffle proof text are output, said apparatus comprising:
(a) a transformation information retention commitment generating unit for generating the output encrypted message sequences from said input message sequence and for generating a commitment pertinent to retention of the transformation information from said input message sequence to said output encrypted message sequences, termed as "transformation information retention commitment";
(b) a transformation condition commitment generating unit for generating a commitment pertinent to a condition to be met by said transformation, termed as "transformation condition commitment"; and
(c) a response generating unit for generating a response from said shuffle information and challenge value;
wherein
(d) said transformation information retention commitment, said transformation condition commitment and the response are output as said shuffle proof text;
wherein:
said transformation information retention commitment generating unit includes means for generating said output encrypted message sequence and said transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment generating unit generating coefficients of an identity, as a polynomial of the response and the challenge value, stating the condition to be met by the transformation from said input message sequence to said output encrypted message sequence from said shuffle information and outputting the coefficients of said identity, or partly or entirely of said coefficients committed, as said transformation condition commitment;

said response generating unit including means for generating said response from challenge value;

said challenge value being either plural components determined at random after the shuffle information, said input message sequence, the output encrypted message sequence and the commitment are determined in their entirety, or plural components output by a challenge value generating function fed as inputs with said input message sequence, output encrypted message sequence and with the entire commitments;

wherein said transformation condition commitment generating unit includes means for stating the condition to be met by the transformation from said input message sequence to said output encrypted message sequence, and for generating coefficients of an identity as a polynomial of said response, said sub-response and the challenge value from said shuffle; and means for generating the coefficients of said identity or said coefficients partly or entirely committed, and sub-equation coefficients or these coefficients partly or entirely committed, as transformation condition commitment;

said sub-response is a polynomial of the response and the challenge value, the coefficients of said polynomial being sub-equation coefficients;

said response generating unit including means for generating two responses, that is response and sub-response, from said challenge value, using the shuffle information;

said shuffle proof text being made up of said transformation information retention commitment, said transformation condition commitment, said response and the sub-response; and said identity at said transformation condition commitment generating step connotes the relation that the square sum of certain terms of said polynomial and the square sum of certain elements of said challenge value are equal to each other irrespective of the challenge value, where each component of the response is made up of a polynomial of the challenge value.

14. An apparatus for shuffle with proof in which input message sequence, which is including a plurality of input encrypted messages and one or more public keys, and the shuffle information including the manner of permuting the input encrypted messages, variables used for re-encryption and random numbers is input, and an output encrypted message sequence obtained on permutation of said encrypted message and re-encryption by said public key and a shuffle proof text are output, said apparatus comprising:

(a) a transformation information retention commitment generating unit for generating the output encrypted message sequences from said input message sequence and for generating a commitment pertinent to retention of the transformation information from said input message sequence to said output encrypted message sequences, termed as "transformation information retention commitment";

(b) a transformation condition commitment generating unit for generating a commitment pertinent to a condition to be met by said transformation, termed as "transformation condition commitment"; and (c) a response generating unit for generating a response from said shuffle information and challenge value;

wherein (d) said transformation information retention commitment, said transformation condition commitment and the response are output as said shuffle proof text; said transformation information retention commitment generating unit includes means for generating said output encrypted message sequence and said transformation information retention commitment as represented values which is represented by representing index-tuple with respect to a basis, where representing index-tuple is comprised of variables used for re-encryption, values corresponding to the permutation and random numbers and basis is the input message sequence;

said transformation condition commitment generating unit generating coefficients of an identity, as a polynomial of the response and the challenge value, stating the condition to be met by the transformation from said input message sequence to said output encrypted message sequence from said shuffle information and outputting the coefficients of said identity, or partly or entirely of said coefficients committed, as said transformation condition commitment;

said response generating unit including means for generating said response from challenge value, said challenge value being either plural components determined at random after the shuffle information, said input message sequence, the output encrypted message sequence and the commitment are determined in their entirety, or plural components output by a challenge value generating function fed as inputs with said input message sequence, output encrypted message sequence and with the entire commitments;

wherein said transformation condition commitment generating unit includes means for stating the condition to be met by the transformation from said input message sequence to said output encrypted message sequence, and for generating coefficients of an identity as a polynomial of said response, said sub-response and the challenge value from said shuffle; and means for generating the coefficients of said identity or said coefficients partly or entirely committed, and sub-equation coefficients or these coefficients partly or entirely committed, as transformation condition commitment;

said sub-response is a polynomial of the response and the challenge value, the coefficients of said polynomial being sub-equation coefficients;

said response generating unit including means for generating two responses, that is response and sub-response, from said challenge value, using the shuffle information;

said shuffle proof text being made up of said transformation information retention commitment, said transformation condition commitment, said response and the sub-response; and said identity at said transformation condition commitment generating step connotes the relation that the cubic sum of certain terms of said polynomial and the cubic sum of certain elements of said challenge value are equal to each other irrespective of the challenge value, where each component of the response is made up of a polynomial of the challenge value.

15. An apparatus for shuffle with proof in which input message sequence, which is including a plurality of input encrypted messages and one or more public keys, and the shuffle information including the manner of permuting the input encrypted messages, variables used for re-encryption and random numbers is input, and an output encrypted message sequence obtained on permutation of said encrypted message and re-encryption by said public key and a shuffle proof text are output, said apparatus comprising:
  (a) a transformation information retention commitment generating unit for generating the output encrypted message sequences from said input message sequence and for generating a commitment pertinent to retention of the transformation information from said input message sequence to said output encrypted message sequences, termed as "transformation information retention commitment";
  (b) a transformation condition commitment generating unit for generating a commitment pertinent to a condition to be met by said transformation, termed as "transformation condition commitment"; and
  (c) a response generating unit for generating a response from said shuffle information and challenge value;
wherein
  (d) said transformation information retention commitment, said transformation condition commitment and the response are output as said shuffle proof text;
said transformation information retention commitment generating unit is present in a plurality of numbers, each of which generates said output encrypted message sequence and the transformation information retention commitment in terms of represented values represented by variables used for re-encryption, values corresponding to permutation and random numbers, with respect to the basis of said input message sequence;
said transformation information retention commitment generating unit omitting generation of outputs of the second and subsequent transformation information retention commitment generating processing operation common to that of a first transformation information retention commitment generating unit;
said transformation condition commitment generating unit is present in a plurality of numbers comprising first and second transformation condition commitment generating units;
said first transformation condition commitment generating unit generating coefficients of an identity as a polynomial of the response and the challenge value, stating the condition to be met by the transformation from said input message sequence to said output encrypted message sequence from the shuffle information, and setting the coefficients of said identity or said coefficients partly or entirely committed as said transformation condition commitment;
said second transformation condition commitment generating unit generating coefficients of an identity as a polynomial of the response, sub-response and the challenge value, stating the condition to be met by the transformation from said input message sequence to said output encrypted message sequence from the shuffle information, and generating the coefficients of said identity or said coefficients partly or entirely committed and the sub-equation coefficients or these coefficients partly or entirely committed, as said transformation condition commitment;
said response generating unit generating a plurality of responses responsive to outputs of said plurality of transformation information retention commitment generating units and generating a plurality of corresponding sub-responses responsive to outputs of said plurality of transformation condition commitment generating units;
said shuffle proof text including said responses, a plurality of transformation information retention commitments, a plurality of transformation condition commitments and corresponding sub-responses; and
wherein
  a plurality of identities at said transformation condition commitment generating unit include two, first and second, identities:
  said first identity connoting the relation that the square sum of certain terms of said polynomial and the square sum of certain elements of said challenge value are equal to each other irrespective of the challenge value, where each component of the response is made up of a polynomial of the challenge value; and
  said second identity connoting that the cubic sum of certain terms of said polynomial and the cubic sum of certain generators of said challenge value are equal to each other irrespective of the challenge value.

16. A storage medium storing a machine readable program so formulated that a computer, as a shuffle apparatus, in which an input message sequence, which is including a plurality of input encrypted messages and one or more public keys, and the shuffle information, including the manner of permuting the input encrypted message, variables used for re-encryption and random numbers, are input, and in which an encrypted output message sequence obtained on permutation of said encrypted messages and re-encryption by said public key or keys, and a shuffle proof text, are output, is caused to perform processing comprising:
  (a) transformation information retention commitment generating processing of generating said output encrypted message sequences from said input message sequence and generating a commitment pertinent to retention of the transformation information from said input message sequence to said output encrypted message sequences, termed as "transformation information retention commitment";
  (b) transformation condition commitment generating processing of generating a commitment pertinent to a condition to be met by said transformation, termed as "transformation condition commitment"; and
  (c) response generating processing of generating a response from said shuffle information and challenge value; and
  (d) processing of outputting said transformation information retention commitment, transformation condition commitment and said response as said shuffle proof text;
said transformation condition commitment generating processing generating coefficients of an identity, as a polynomial of said response, said sub-response and the challenge value, stating the condition to be met by the transformation from said input message sequence to said output encrypted message sequence from said shuffle; and
generating the coefficients of said identity or said coefficients partly or entirely committed, and sub-equation coefficients or these coefficients partly or entirely committed, as a transformation condition commitment;

said sub-response being a polynomial of the response and the challenge value, with the coefficients of said polynomial being sub-equation coefficients;

said response generating processing generating two responses, i.e., response and sub-response, from said challenge value, using the shuffle information; and outputting said transformation information retention commitment, said transformation condition commitment, said response and the sub-response as said shuffle proof text; and said identity at said transformation condition commitment generating processing connoting the relation that the square sum of certain terms of said polynomial and the square sum of certain elements of said challenge value are equal to each other irrespective of the challenge value, where each component of the response is made up of a polynomial of the challenge value.

17. A storage medium storing a machine readable program so formulated that a computer, as a shuffle apparatus, in which an input message sequence, which is including a plurality of input encrypted messages and one or more public keys, and the shuffle information, including the manner of permuting the input encrypted message, variables used for re-encryption and random numbers, are input, and in which an encrypted output message sequence obtained on permutation of said encrypted messages and re-encryption by said public key or keys, and a shuffle proof text, are output, is caused to perform processing comprising:

(a) transformation information retention commitment generating processing of generating said output encrypted message sequences from said input message sequence and generating a commitment pertinent to retention of the transformation information from said input message sequence to said output encrypted message sequences, termed as "transformation information retention commitment";

(b) transformation condition commitment generating processing of generating a commitment pertinent to a condition to be met by said transformation, termed as "transformation condition commitment"; and (c) response generating processing of generating a response from said shuffle information and challenge value; and (d) processing of outputting said transformation information retention commitment, transformation condition commitment and said response as said shuffle proof text;

said transformation condition commitment generating processing generating coefficients of an identity, as a polynomial of said response, said sub-response and the challenge value, stating the condition to be met by the transformation from said input message sequence to said output encrypted message sequence from said shuffle; and generating the coefficients of said identity or said coefficients partly or entirely committed, and sub-equation coefficients or these coefficients partly or entirely committed, as a transformation condition commitment;

said sub-response being a polynomial of the response and the challenge value, with the coefficients of said polynomial being sub-equation coefficients;

said response generating processing generating two responses, i.e., response and sub-response, from said challenge value, using the shuffle information; and outputting said transformation information retention commitment, said transformation condition commitment, said response and the sub-response as said shuffle proof text; and said identity at said transformation condition commitment generating processing connoting the relation that the cubic sum of certain terms of said polynomial and the cubic sum of certain elements of said challenge value are equal to each other irrespective of the challenge value, where each component of the response is made up of a polynomial of the challenge value.

18. A storage medium storing a machine readable program so formulated that a computer, as a shuffle apparatus, in which an input message sequence, which is including a plurality of input encrypted messages and one or more public keys, and the shuffle information, including the manner of permuting the input encrypted message, variables used for re-encryption and random numbers, are input, and in which an encrypted output message sequence obtained on permutation of said encrypted messages and re-encryption by said public key or keys, and a shuffle proof text, are output, is caused to perform processing comprising:

(a) transformation information retention commitment generating processing of generating said output encrypted message sequences from said input message sequence and generating a commitment pertinent to retention of the transformation information from said input message sequence to said output encrypted message sequences, termed as "transformation information retention commitment";

(b) transformation condition commitment generating processing of generating a commitment pertinent to a condition to be met by said transformation, termed as "transformation condition commitment"; and (c) response generating processing of generating a response from said shuffle information and challenge value; and (d) processing of outputting said transformation information retention commitment, transformation condition commitment and said response as said shuffle proof text;

said transformation information retention commitment generating processing comprehending a plurality of transformation information retention commitment generating processings each of which generates represented values represented by said output encrypted message sequence and the transformation information retention commitment with variables used for re-encryption, values used for permutation and random numbers, with respect to the basis of said input message sequence, said transformation information retention commitment generating processing omitting generation of outputs of the second and subsequent transformation information retention commitment generating processings common to that of the first transformation information retention commitment generating processing; and said transformation condition commitment generating step comprehending a plurality of, first and second, transformation information retention commitment generating processings, the first transformation condition commitment generating processing generating coefficients of an identity as a polynomial of the response and the challenge value stating the condition to be met by the transformation from said input message sequence to said output encrypted message sequence from the shuffle information, and setting the coefficients of said identity or said coefficients partly or entirely committed as said transformation condition commitment, and the second transformation condition commitment generating processing generating coefficients of an identity as a polynomial of the response, the sub-response and the challenge value, stating the condition to be met by the transformation from said input message sequence to said output encrypted message sequence from the shuffle information, and generating the coefficients of said identity or the coefficients partly or entirely committed and the sub-equation coefficients or these coefficients partly or entirely committed, as said transformation condition commitment;

said response generating processing generating a plurality of responses according to said transformation information retention commitment generating processings and generating a plurality of corresponding sub-responses according to said transformation information commitment generating processings;

said shuffle proof text including said responses, a plurality of transformation information retention commitments, a plurality of transformation condition commitments and corresponding sub-responses;

a plurality of identities at said transformation condition commitment generating processings including two identities:

i.e., a first that is an identity connoting the relation that the square sum of certain terms of said polynomial and the square sum of certain elements of said challenge value are equal to each other irrespective of the challenge value, where each component of the response is made up of a polynomial of the challenge value, and a second identity connoting the relation that the cubic sum of certain terms of said polynomial and the cubic sum of certain elements of said challenge value are equal to each other irrespective of the challenge value where each component of the response is made up of a polynomial of the challenge value.

* * * * *